(12) United States Patent
Kittner et al.

(10) Patent No.: US 12,235,841 B2
(45) Date of Patent: Feb. 25, 2025

(54) INLINE DATA REDUCTION

(71) Applicant: NEUROBLADE LTD., Tel Aviv (IL)

(72) Inventors: Yaron Kittner, Pardes Hanna-Karkur (IL); Gal Hai, Tel-Aviv (IL)

(73) Assignee: NeuroBlade Ltd., Tel-Aviv (IL)

( * ) Notice: Subject to any disclaimer, the term of this patent is extended or adjusted under 35 U.S.C. 154(b) by 0 days.

(21) Appl. No.: 18/184,110

(22) Filed: Mar. 15, 2023

(65) Prior Publication Data

US 2023/0222126 A1 Jul. 13, 2023

Related U.S. Application Data

(63) Continuation of application No. PCT/IB2023/000018, filed on Jan. 5, 2023.
(Continued)

(51) Int. Cl.
*G06F 16/2453* (2019.01)
*G06F 16/22* (2019.01)
(Continued)

(52) U.S. Cl.
CPC ........ *G06F 16/24542* (2019.01); *G06F 16/22* (2019.01); *G06F 16/2365* (2019.01);
(Continued)

(58) Field of Classification Search
None
See application file for complete search history.

(56) References Cited

U.S. PATENT DOCUMENTS 10,664,474 B1 * 5/2020 Chunduru ......... G06F 16/24544
11,556,545 B2 * 1/2023 Schreter ............ G06F 16/24573
(Continued)

FOREIGN PATENT DOCUMENTS

WO   2019/025864 A2   2/2019
WO   2020/049363 A2   3/2020
(Continued)

OTHER PUBLICATIONS

International Search Report and Written Opinion of the International Search Authority in International Application No. PCT/IB2023/000018 dated Apr. 19, 2023 (9 pages).
(Continued)

*Primary Examiner* — Kim T Nguyen
(74) *Attorney, Agent, or Firm* — FINNEGAN, HENDERSON, FARABOW, GARRETT & DUNNER LLP

(57) ABSTRACT

Disclosed embodiments include a data filter system including an interface and data filter circuitry. The data filter circuitry is configured to receive a data filter initiation signal via the interface, and in response to receipt of the data filter initiation signal, perform at least one operation associated with a data query, wherein the data query implicates a body of data stored in at least one storage unit; wherein performance of the at least one operation associated with the data query results in generation of a filtered data subset from the body of data, including less data than the body of data implicated by the data query; and transfer the filtered data subset to a host processor configured to perform one or more additional operations relative to the data query to generate an output to the data query.

20 Claims, 33 Drawing Sheets

Related U.S. Application Data

(60) Provisional application No. 63/350,579, filed on Jun. 9, 2022, provisional application No. 63/304,975, filed on Jan. 31, 2022, provisional application No. 63/296,645, filed on Jan. 5, 2022.

(51) Int. Cl.
  *G06F 16/23* (2019.01)
  *G06F 16/242* (2019.01)
  *G06F 16/245* (2019.01)
  *G06F 16/2455* (2019.01)
  *G06F 16/248* (2019.01)

(52) U.S. Cl.
  CPC ...... *G06F 16/244* (2019.01); *G06F 16/24535* (2019.01); *G06F 16/24556* (2019.01); *G06F 16/24569* (2019.01); *G06F 16/248* (2019.01)

(56) References Cited

U.S. PATENT DOCUMENTS

| | | | |
|---|---|---|---|
| 11,663,177 B2* | 5/2023 | McPherson | G06F 16/2282 707/609 |
| 2012/0047126 A1 | 2/2012 | Branscome et al. | |
| 2014/0052743 A1 | 2/2014 | Schauer et al. | |
| 2014/0324825 A1* | 10/2014 | Gopinath | G06F 16/248 707/722 |
| 2016/0070751 A1* | 3/2016 | Clifford | G06F 16/2425 707/722 |
| 2019/0188132 A1 | 6/2019 | Yap et al. | |
| 2019/0286852 A1* | 9/2019 | Rubin | H04L 63/126 |
| 2023/0117176 A1* | 4/2023 | Ahmadi | G06F 16/248 707/600 |
| 2023/0214389 A1* | 7/2023 | Trainin | G06F 16/24535 707/718 |
| 2023/0222108 A1* | 7/2023 | Hillel | G06F 16/24569 707/812 |
| 2023/0222123 A1* | 7/2023 | Reviv | G06F 16/22 707/718 |
| 2023/0222126 A1* | 7/2023 | Kittner | G06F 16/248 707/722 |

FOREIGN PATENT DOCUMENTS

| | | |
|---|---|---|
| WO | 2021/028723 A2 | 2/2021 |
| WO | 2022/082115 A1 | 4/2022 |

OTHER PUBLICATIONS

Joint Electron Device Engineering Council (JEDEC) Standard No. 79-4C, DDR SRAM, Jedec Solid State Technology Association, Jan. 2020.

* cited by examiner

OVERALL SYSTEM ARCHITECTURE

SOFTWARE LAYER

HARDWARE LAYER

FIG. 21
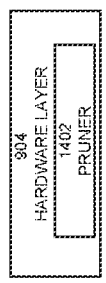
FIG. 22
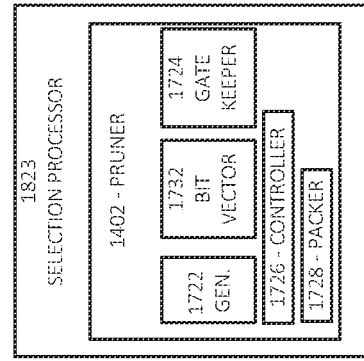
FIG. 23
FIG. 24

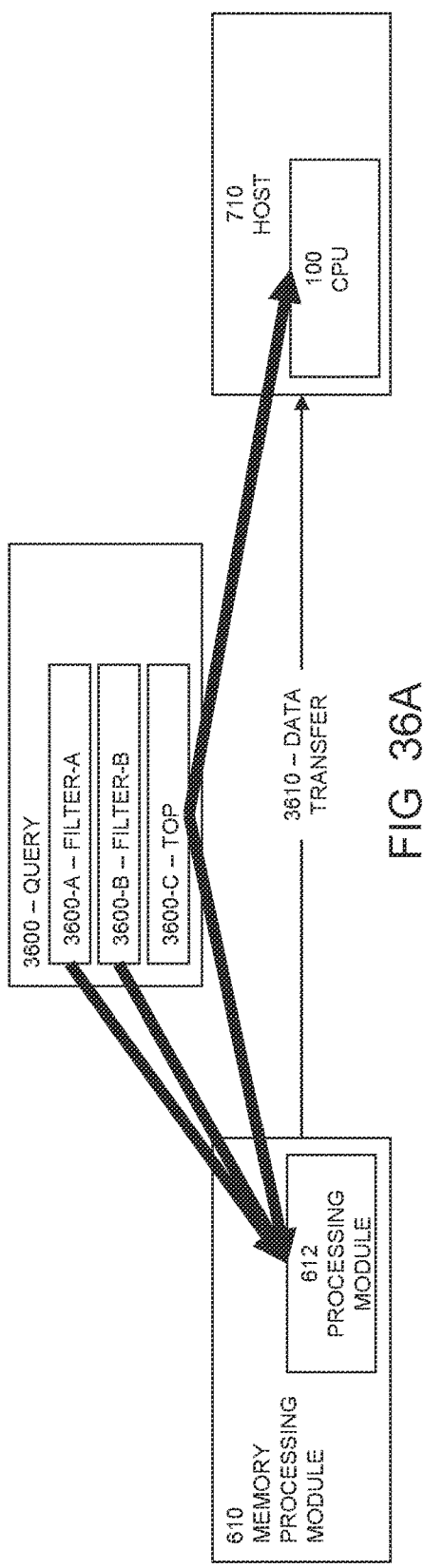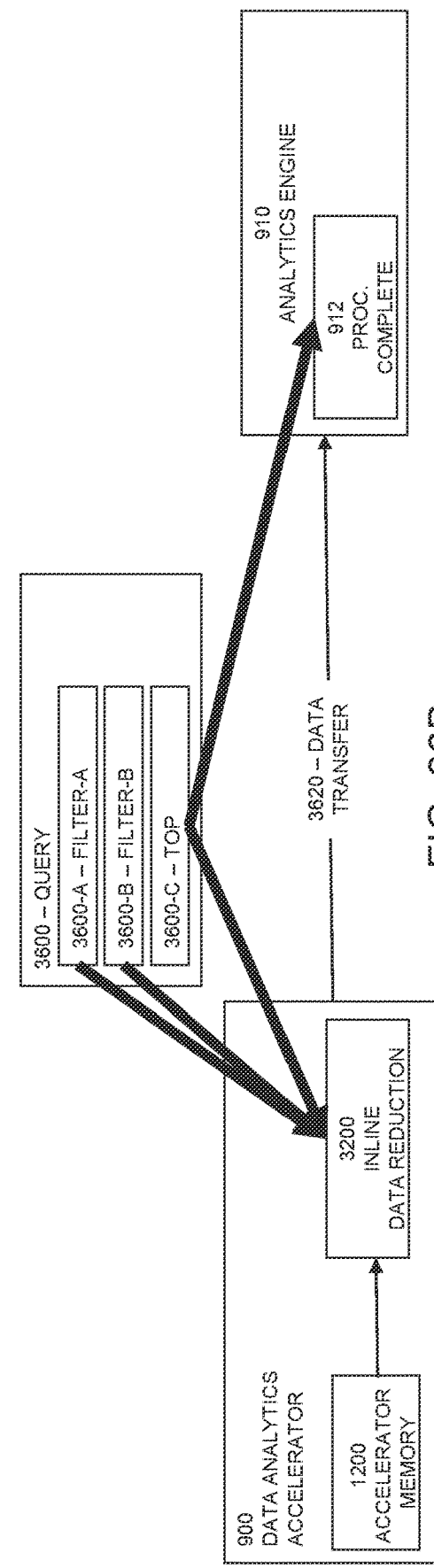
FIG. 36A
FIG. 36B

INLINE DATA REDUCTION

CROSS REFERENCES TO RELATED APPLICATIONS

This application is a continuation of International Application No. PCT/IB2023/000018 filed on Jan. 5, 2023, which claims the benefit of priority of U.S. Provisional Patent Application No. 63/296,645, filed on Jan. 5, 2022; U.S. Provisional Patent Application No. 63/304,975, filed on Jan. 31, 2022; and U.S. Provisional Patent Application No. 63/350,579, filed on Jun. 9, 2022. The foregoing applications are incorporated herein by reference in their entirety.

BACKGROUND

Technical Field

The present disclosure generally relates to improvements to processing systems, and, in particular, to increasing processing speed and reducing power consumption.

Background Information

Details of memory processing modules and related technologies can be found in PCT/IB2018/000995 filed 30 Jul. 2018, PCT/IB2019/001005 filed 6 Sep. 2019, PCT/IB2020/000665 filed 13 Aug. 2020, and PCT/US2021/055472 filed 18 Oct. 2021. Exemplary elements such as XRAM, XDIMM, XSC, and IMPU are available from NeuroBlade Ltd., Tel Aviv, Israel.

SUMMARY

In an embodiment, a system may include a hardware based, programmable data analytics processor configured to reside between a data storage unit and one or more hosts, wherein the programmable data analytics processor includes: a selector module configured to input a first set of data and, based on a selection indicator, output a first subset of the first set of data; a filter and project module configured to input a second set of data and, based on a function, output an updated second set of data; a join and group module configured to combine data from one or more third data sets into a combined data set; and a communications fabric configured to transfer data between any of the selector module, the filter and project module, and the join and group module.

In an embodiment, a system may include a hardware based, programmable data analytics processor configured to reside between a data storage unit and one or more hosts, wherein the programmable data analytics processor includes: a selector module configured to input a first set of data and, based on a selection indicator, output a first subset of the first set of data; a filter and project module configured to input a second set of data and, based on a function, output an updated second set of data; a communications fabric configured to transfer data between any of the modules.

In an embodiment, a system may include a hardware based, programmable data analytics processor configured to reside between a data storage unit and one or more hosts, wherein the programmable data analytics processor includes: a selector module configured to input a first set of data and, based on a selection indicator, output a first subset of the first set of data; a join and group module configured to combine data from one or more third data sets into a combined data set; and a communications fabric configured to transfer data between any of the modules.

In an embodiment, a system may include a hardware based, programmable data analytics processor configured to reside between a data storage unit and one or more hosts, wherein the programmable data analytics processor includes: a filter and project module configured to input a second set of data and, based on a function, output an updated second set of data; a join and group module configured to combine data from one or more third data sets into a combined data set; and a communications fabric configured to transfer data between any of the modules.

In an embodiment, a data pre-processing architecture may comprise: an interface; and a pruning logic configured to receive, via the interface, at least one filter value from a query processor; use the at least one filter value to scan rows or columns of a data table stored in a memory; generate a selection indicator identifying a set of rows or columns of the data table where the at least one filter value resides; and provide to the query processor a filtered output based on the selection indicator.

In an embodiment, a data pre-processing architecture may include an interface and pruning logic, wherein the pruning logic is configured to receive, via the interface, two or more filter values from a query processor; use a first filter value among the two or more filter values to scan a first group of elements of a data set stored in a memory; generate a first selection indicator identifying a first set of elements of the data set where the first filter value resides; use a second filter value among the two or more filter values to scan a second group of elements of the data set; generate a refined selection indicator identifying a second set of elements of the data set where both the first filter value and the second filter value reside, and provide to the query processor a filtered output based on the refined selection indicator.

In an embodiment, an accelerated database management system may include at least one processor including circuitry and a memory, wherein the memory includes instructions that when executed by the circuitry cause the at least one processor to: receive an initial database query; generate a main query based on the initial database query; analyze the main query, and based on the analysis of the main query, generate at least a first sub-query and a second sub-query, wherein the second sub-query differs from the first sub-query; process the first sub-query along a first processing path to provide a first input to an execution module; process the second sub-query along a second processing path, different from the first processing path, to provide a second input to the execution module; and based on the first input and the second input received by the execution module, generate a main query result.

In an embodiment, a data filter system includes an interface and data filter circuitry. The data filter circuitry may be configured to receive a data filter initiation signal via the interface, and in response to receipt of the data filter initiation signal, perform at least one operation associated with a data query, wherein the data query implicates a body of data stored in at least one storage unit; wherein performance of the at least one operation associated with the data query results in generation of a filtered data subset from the body of data, including less data than the body of data implicated by the data query. The data filter circuitry may also be configured to transfer the filtered data subset to a host processor configured to perform one or more additional operations relative to the data query to generate an output to the data query.

Consistent with other disclosed embodiments, non-transitory computer readable storage media may store program instructions, which are executed by at least one processing device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 21 is a representation of the Pruner deployed in the hardware layer.

FIG. 22 is a representation of the Pruner deployed in the selector module.

FIG. 23 is a representation of Pruner components.

FIG. 24 is a representation of Pruner components deployed on the selection processor.

FIG. 36A provides a diagrammatic representation of an inline data reduction system and method, according to exemplary disclosed embodiments.

FIG. 36B provides a diagrammatic representation of another inline data reduction system and method, according to exemplary disclosed embodiments.

DETAILED DESCRIPTION

Example Architecture

Figure 1:
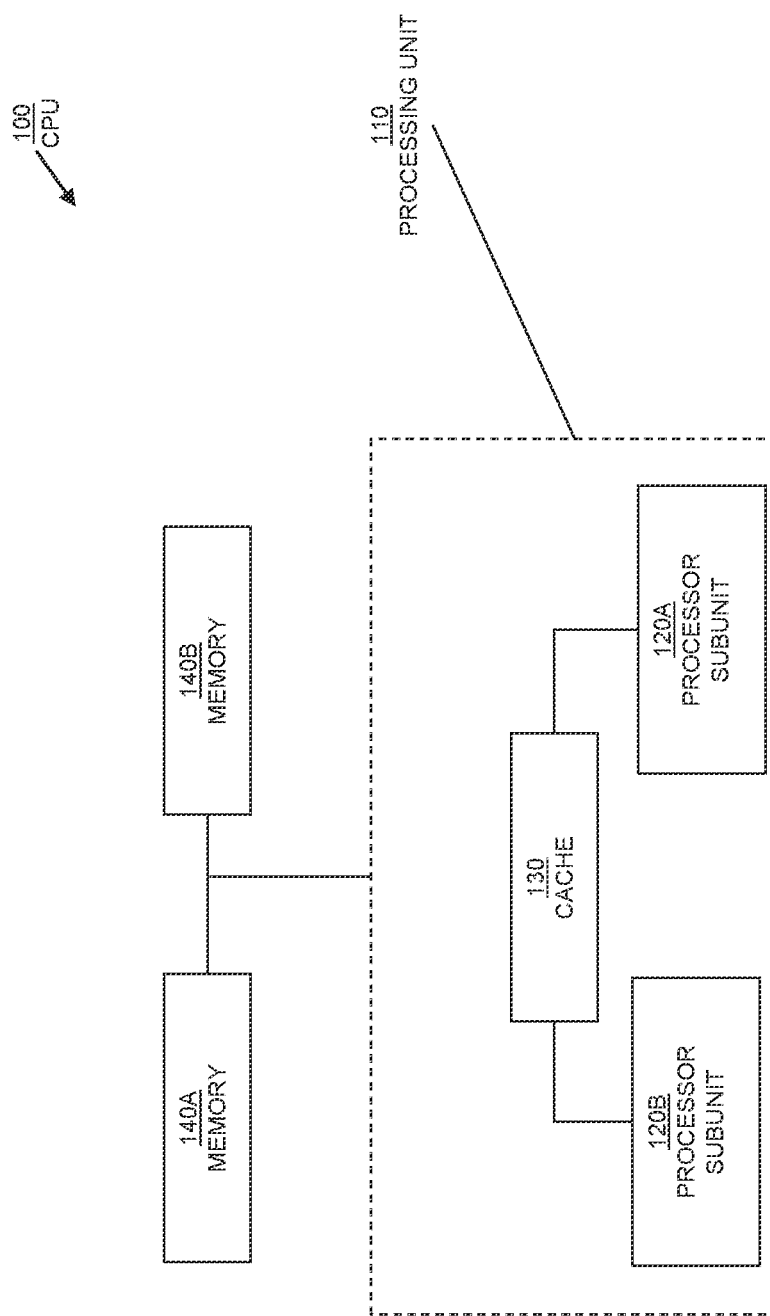
FIG. 1 is an example of a computer (CPU) architecture.

FIG. 1 is an example of a computer (CPU) architecture. A CPU 100 may comprise a processing unit 110 that includes one or more processor subunits, such as processor subunit 120*a* and processor subunit 120*b*. Although not depicted in the current figure, each processor subunit may comprise a plurality of processing elements. Moreover, the processing unit 110 may include one or more levels of on-chip cache. Such cache elements are generally formed on the same semiconductor die as processing unit 110 rather than being connected to processor subunits 120*a* and 120*b* via one or more buses formed in the substrate containing processor subunits 120*a* and 120*b* and the cache elements. An arrangement directly on the same die, rather than being connected via buses, may be used for both first-level (L1) and second-level (L2) caches in processors. Alternatively, in older processors, L2 caches were shared amongst processor subunits using back-side buses between the subunits and the L2 caches. Back-side buses are generally larger than front-side buses, described below. Accordingly, because cache is to be shared with all processor subunits on the die, cache 130 may be formed on the same die as processor subunits 120a and 120b or communicatively coupled to processor subunits 120a and 120b via one or more back-side buses. In both embodiments without buses (e.g., cache is formed directly on-die) as well as embodiments using back-side buses, the caches are shared between processor subunits of the CPU.

Moreover, processing unit 110 may communicate with shared memory 140a and memory 140b. For example, memories 140a and 140b may represent memory banks of shared dynamic random-access memory (DRAM). Although depicted with two banks, memory chips may include between eight and sixteen memory banks. Accordingly, processor subunits 120a and 120b may use shared memories 140a and 140b to store data that is then operated upon by processor subunits 120a and 120b. This arrangement, however, results in the buses between memories 140a and 140b and processing unit 110 acting as a bottleneck when the clock speeds of processing unit 110 exceed data transfer speeds of the buses. This is generally true for processors, resulting in lower effective processing speeds than the stated processing speeds based on clock rate and number of transistors.

Figure 2:
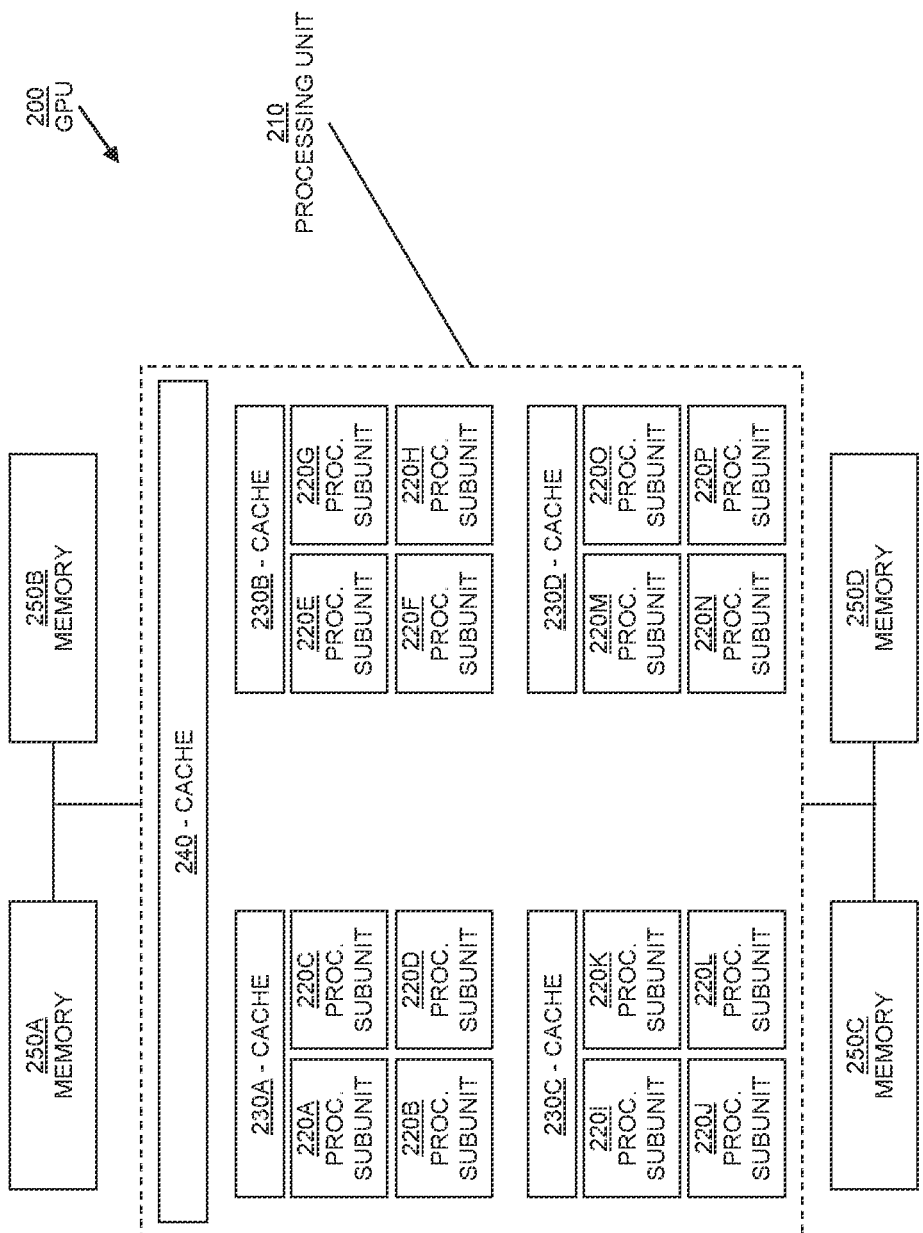
FIG. 2 is an example of a graphics processing unit (GPU) architecture.

FIG. 2 is an example of a graphics processing unit (GPU) architecture. Deficiencies of the CPU architecture similarly persist in GPUs. A GPU 200 may comprise a processing unit 210 that includes one or more processor subunits (e.g., subunits 220a, 220b, 220c, 220d, 220e, 220f, 220g, 220h, 220i, 220j, 220k, 220l, 220m, 220n, 220o, and 220p). Moreover, the processing unit 210 may include one or more levels of on-chip cache and/or register files. Such cache elements are generally formed on the same semiconductor die as processing unit 210. Indeed, in the example of the current figure, cache 210 is formed on the same die as processing unit 210 and shared amongst all of the processor subunits, while caches 230a, 230b, 230c, and 230d are formed on a subset of the processor subunits, respectively, and dedicated thereto.

Moreover, processing unit 210 communicates with shared memories 250a, 250b, 250c, and 250d. For example, memories 250a, 250b, 250c, and 250d may represent memory banks of shared DRAM. Accordingly, the processor subunits of processing unit 210 may use shared memories 250a, 250b, 250c, and 250d to store data that is then operated upon by the processor subunits. This arrangement, however, results in the buses between memories 250a, 250b, 250c, and 250d and processing unit 210 acting as a bottleneck, similar to the bottleneck described above for CPUs.

Figure 3:
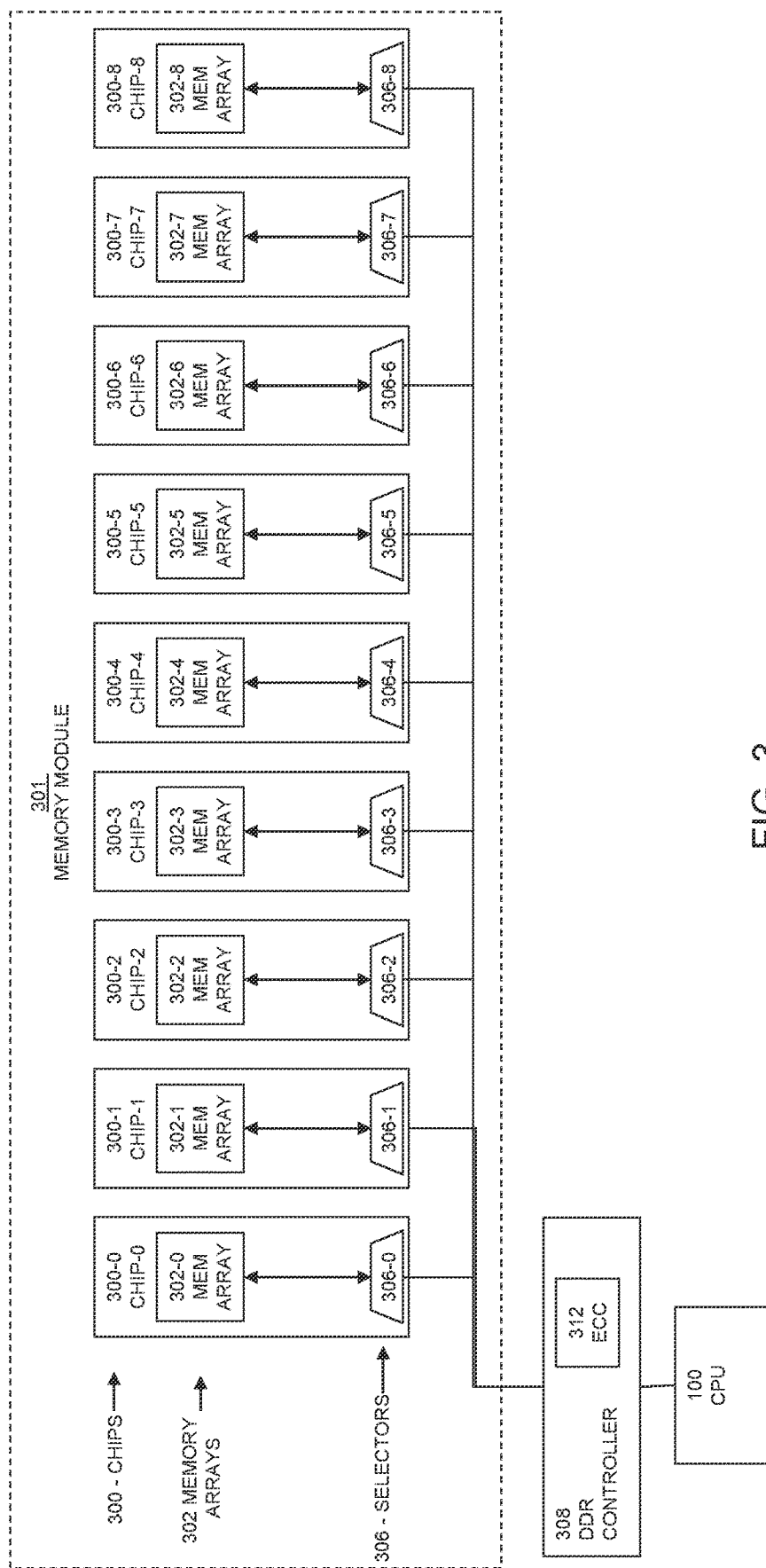
FIG. 3 is a diagrammatic representation of a computer memory with an error correction code (ECC) capability.

FIG. 3 is a diagrammatic representation of a computer memory with an error correction code (ECC) capability. As shown in the current figure, a memory module 301 includes an array of memory chips 300, shown as nine chips (i.e., chip-0, 100-0 through chip-8, 100-8, respectively). Each memory chip has respective memory arrays 302 (e.g., elements labelled 302-0 through 302-8) and corresponding address selectors 306 (shown as respective selector-0 106-0 through selector-8 106-8). Controller 308 is shown as a DDR controller. The DDR controller 308 is operationally connected to CPU 100 (processing unit 110), receiving data from the CPU 100 for writing to memory, and retrieving data from the memory to send to the CPU 100. The DDR controller 308 also includes an error correction code (ECC) module that generates error correction codes that may be used in identifying and correcting errors in data transmissions between CPU 100 and components of memory module 301.

Figure 4:
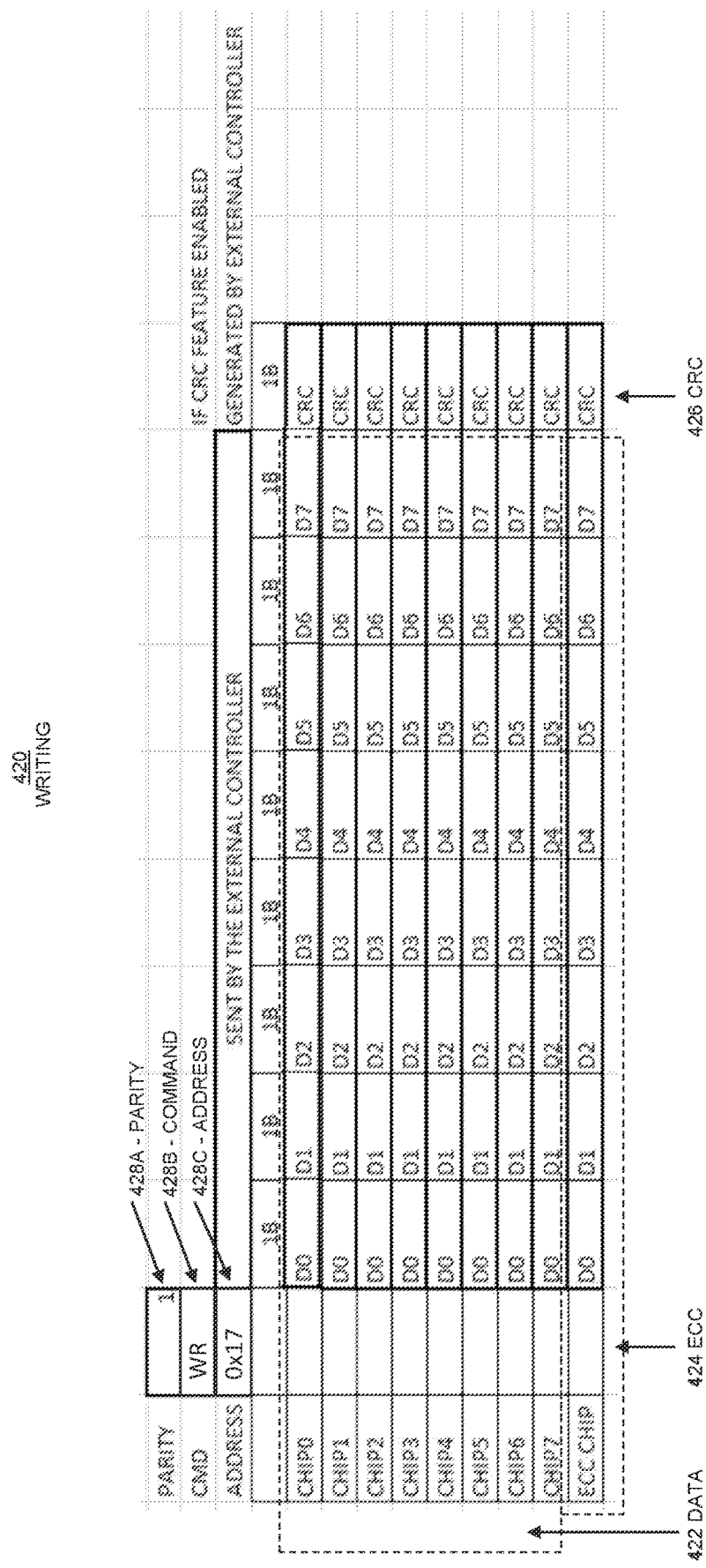
FIG. 4 is a diagrammatic representation of a process for writing data to a memory module.

FIG. 4 is a diagrammatic representation of a process for writing data to the memory module 301. Specifically, the process 420 of writing to the memory module 301 can include writing data 422 in bursts, each burst including 8 bytes for each chip being written to (in the current example, 8 of the memory chips 300, including chip-0, 100-0 to chip-7, 100-7). In some implementations, an original error correction code (ECC) 424 may be calculated in the ECC module 312 in the DDR controller 308. The ECC 424 is calculated across each of the chip's 8 bytes of data, resulting in an additional, original, 1-byte ECC for each byte of the burst across the 8 chips. The 8-byte (8×1-byte) ECC is written with the burst to a ninth memory chip serving as an ECC chip in the memory module 301, such as chip-8, 100-8.

The memory module 301 can activate a cyclic redundancy check (CRC) check for each chip's burst of data, to protect the chip interface. A cyclic redundancy check is an error-detecting code commonly used in digital networks and storage devices to detect accidental changes to raw data. Blocks of data get a short check value attached, based on the remainder of a polynomial division of the block's contents. In this case, an original CRC 426 is calculated by the DDR controller 308 over the 8 bytes of data 422 in a chip's burst (one row in the current figure) and sent with each data burst (each row/to a corresponding chip) as a ninth byte in the chip's burst transmission. When each chip 300 receives data, each chip 300 calculates a new CRC over the data and compares the new CRC to the received original CRC. If the CRCs match, the received data is written to the chip's memory 302. If the CRCs do not match, the received data is discarded, and an alert signal is activated. An alert signal may include an ALERT_N signal.

Additionally, when writing data to a memory module 301, an original parity 428A is normally calculated over the (exemplary) transmitted command 428B and address 428C. Each chip 300 receives the command 428B and address 428C, calculates a new parity, and compares the original parity to the new parity. If the parities match, the received command 428B and address 428C are used to write the corresponding data 422 to the memory module 301. If the parities do not match, the received data 422 is discarded, and an alert signal (e.g., ALERT_N) is activated.

Figure 5:
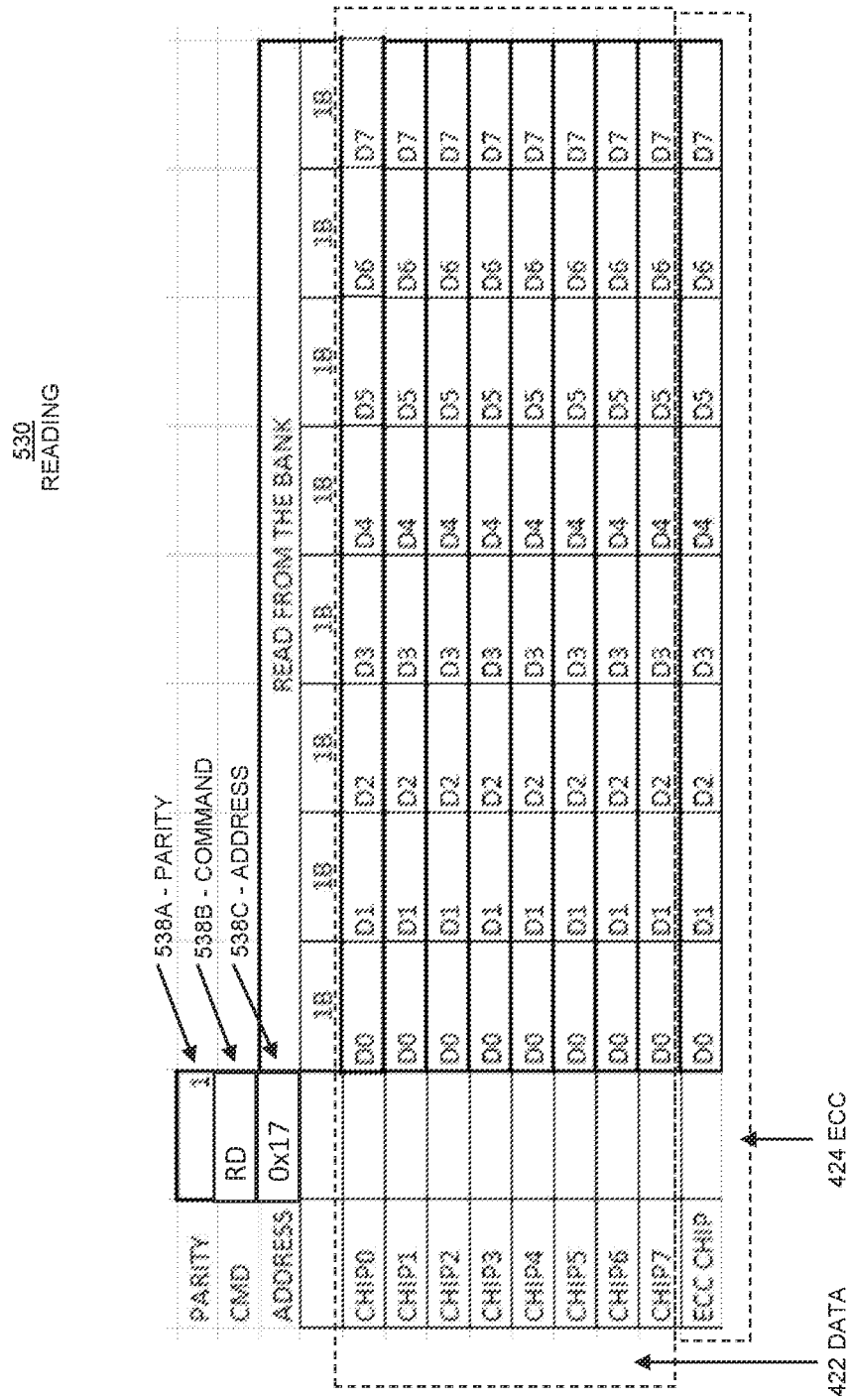
FIG. 5 is a diagrammatic representation of a process for reading from memory.

FIG. 5 is a diagrammatic representation of a process 530 for reading from memory. When reading from the memory module 301, the original ECC 424 is read from the memory and sent with the data 422 to the ECC module 312. The ECC module 312 calculates a new ECC across each of the chips' 8 bytes of data. The new ECC is compared to the original ECC to determine (detect, correct) if an error has occurred in the data (transmission, storage). In addition, when reading data from memory module 301, an original parity 538A is normally calculated over the (exemplary) transmitted command 538B and address 538C (transmitted to the memory module 301 to tell the memory module 301 to read and from which address to read). Each chip 300 receives the command 538B and address 538C, calculates a new parity, and compares the original parity to the new parity. If the parities match, the received command 538B and address 538C are used to read the corresponding data 422 from the memory module 301. If the parities do not match, the received command 538B and address 538C are discarded and an alert signal (e.g., ALERT_N) is activated.

Overview of Memory Processing Modules and Associated Appliances

Figure 6:
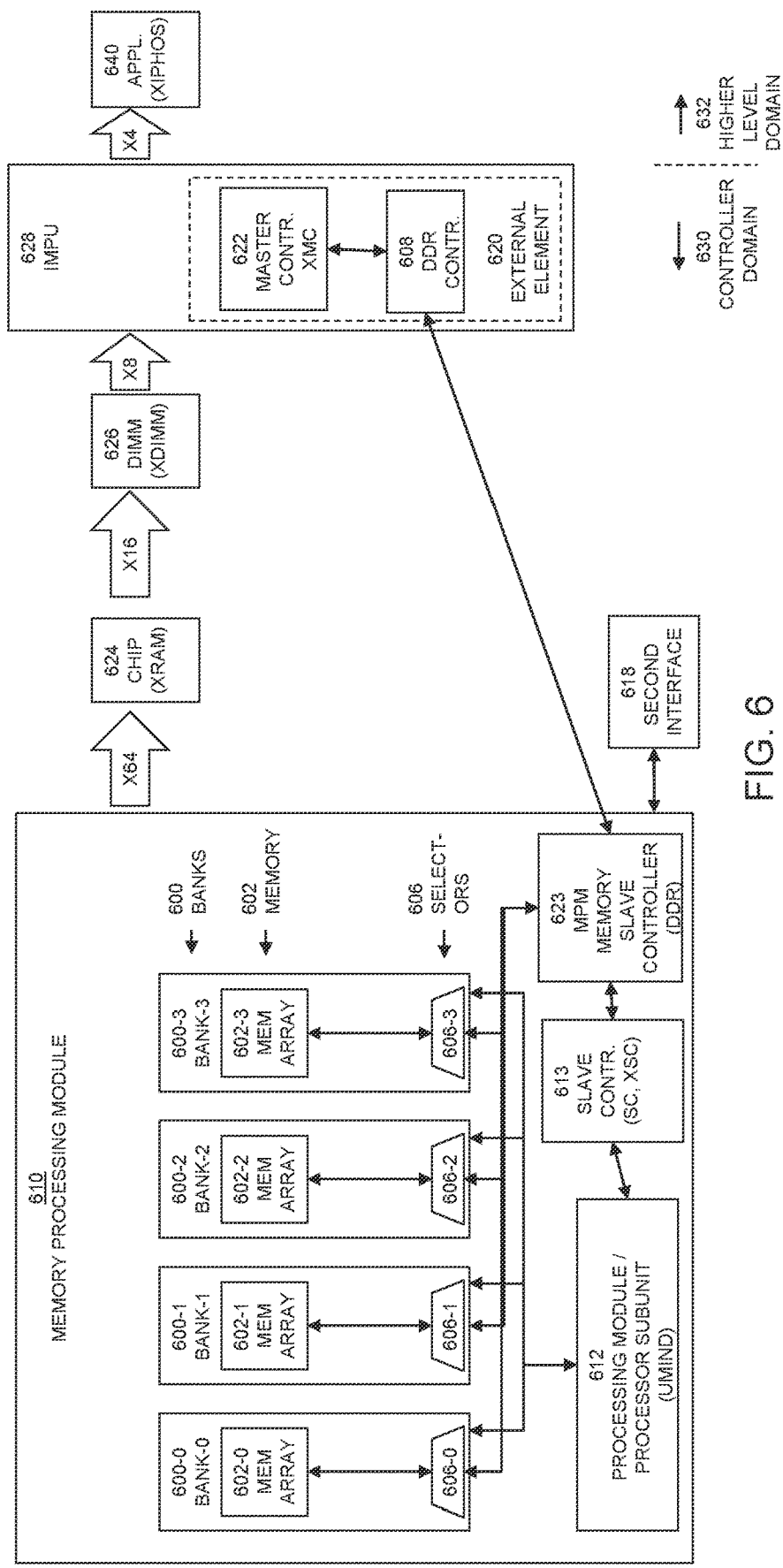
FIG. 6 is a diagrammatic representation of an architecture including memory processing modules.

FIG. 6 is a diagrammatic representation of an architecture including memory processing modules. For example, a memory processing module (MPM) 610, as described above, may be implemented on a chip to include at least one processing element (e.g., a processor subunit) local to associated memory elements formed on the chip. In some cases, an MPM 610 may include a plurality of processing elements spatially distributed on a common substrate among their associated memory elements within the MPM 610.

In the example of FIG. 6, the memory processing module 610 includes a processing module 612 coupled with four, dedicated memory banks 600 (shown as respective bank-0, 600-0 through bank-3, 600-3). Each bank includes a corresponding memory array 602 (shown as respective memory array-0, 602-0 through memory array-3, 602-3) along with selectors 606 (shown as selector-0 606-0 to selector-3 606-3). The memory arrays 602 may include memory elements similar to those described above relative to memory arrays 302. Local processing, including arithmetic operations, other logic-based operations, etc. can be performed by processing module 612 (also referred to in the context of this document as a "processing subunit," "processor subunit," "logic," "micro mind," or "UMIND") using data stored in the memory arrays 602, or provided from other sources, for example, from other of the processing modules 612. In some cases, one or more processing modules 612 of one or more MPMs 610 may include at least one arithmetic logic units (ALU). Processing module 612 is operationally connected to each of the memory banks 600.

A DDR controller 608 may also be operationally connected to each of the memory banks 600, e.g., via an MPM slave controller 623. Alternatively, and/or in addition to the DDR controller 608, a master controller 622 can be operationally connected to each of the memory banks 600, e.g., via the DDR controller 608 and memory controller 623. The DDR controller 608 and the master controller 622 may be implemented in an external element 620. Additionally, and/or alternatively, a second memory interface 618 may be provided for operational communication with the MPM 610.

While the MPM 610 of FIG. 6 pairs one processing module 612 with four, dedicated memory banks 600, more or fewer memory banks can be paired with a corresponding processing module to provide a memory processing module. For example, in some cases, the processing module 612 of MPM 610 may be paired with a single, dedicated memory bank 600. In other cases, the processing module 612 of MPM 610 may be paired with two or more dedicated memory banks 600, four or more dedicated memory banks 600, etc. Various MPMs 610, including those formed together on a common substrate or chip, may include different numbers of memory banks relative to one another. In some cases, an MPM 610 may include one memory bank 600. In other cases, an MPM may include two, four, eight, sixteen, or more memory banks 600. As a result, the number of memory banks 600 per processing module 612 may be the same throughout an entire MPM 610 or across MPMs. One or more MPMs 610 may be included in a chip. In a non-limiting example, included in an XRAM chip 624. Alternatively, at least one processing module 612 may control more memory banks 600 than another processing module 612 included within an MPM 610 or within an alternative or larger structure, such as the XRAM chip 624.

Each MPM 610 may include one processing module 612 or more than one processing module 610. In the example of FIG. 6, one processing module 612 is associated with four dedicated memory banks 600. In other cases, however, one or more memory banks of an MPM may be associated with two or more processing modules 612.

Each memory bank 600 may be configured with any suitable number of memory arrays 602. In some cases, a bank 600 may include only a single array. In other cases, a bank 600 may include two or more memory arrays 602, four or more memory arrays 602, etc. Each of the banks 600 may have the same number of memory arrays 602. Alternatively, different banks 600 may have different numbers of memory arrays 602.

Various numbers of MPMs 610 may be formed together on a single hardware chip. In some cases, a hardware chip may include just one MPM 610. In other cases, however, a single hardware chip may include two, four, eight, sixteen, 32, 64, etc. MPMs 610. In the particular non-limiting example represented in the current figure, 64 MPMs 610 are combined together on a common substrate of a hardware chip to provide the XRAM chip 624, which may also be referred to as a memory processing chip or a computational memory chip. In some embodiments, each MPM 610 may include a slave controller 613 (e.g., an eXtreme/Xele or XSC slave controller (SC)) configured to communicate with a DDR controller 608 (e.g., via MPM slave controller 623), and/or a master controller 622. Alternately, fewer than all of the MPMs onboard an XRAM chip 624 may include a slave controller 613. In some cases, multiple MPMs (e.g., 64 MPMs) 610 may share a single slave controller 613 disposed on XRAM chip 624. Slave controller 613 can communicate data, commands, information, etc. to one or more processing modules 612 on XRAM chip 624 to cause various operations to be performed by the one or more processing modules 612.

One or more XRAM chips 624, which may include a plurality of XRAM chips 624, such as sixteen XRAM chips 624, may be configured together to provide a dual in-line memory module (DIMM) 626. Traditional DIMMs may be referred to as a RAM stick, which may include eight or nine, etc., dynamic random-access memory chips (integrated circuits) constructed as/on a printed circuit board (PCB) and having a 64-bit data path. In contrast to traditional memory, the disclosed memory processing modules 610 include at least one computational component (e.g., processing module 612) coupled with local memory elements (e.g., memory banks 600). As multiple MPMs may be included on an XRAM chip 624, each XRAM chip 624 may include a plurality of processing modules 612 spatially distributed among associated memory banks 600. To acknowledge the inclusion of computational capabilities (together with memory) within the XRAM chip 624, each DIMM 626 including one or more XRAM chips (e.g., sixteen XRAM chips, as in the FIG. 6 example) on a single PCB may be referred to as an XDIMM (or eXtremeDIMM or XeleDIMM). Each XDIMM 626 may include any number of XRAM chips 624, and each XDIMM 624 may have the same or a different number of XRAM chips 624 as other XDIMMs 626. In the FIG. 6 example, each XDIMM 626 includes sixteen XRAM chips 624.

As shown in FIG. 6, the architecture may further include one or more memory processing units, such as an intense memory processing unit (IMPU) 628. Each IMPU 628 may include one or more XDIMMs 626. In the FIG. 6 example, each IMPU 628 includes four XDIMMs 626. In other cases, each IMPU 628 may include the same or a different number of XDIMMs as other IMPUs. The one or more XDIMMs included in IMPU 628 can be packaged together with or otherwise integrated with one or more DDR controllers 608 and/or one or more master controllers 622. For example, in some cases, each XDIMM included in IMPU 628 may include a dedicated DDR controller 608 and/or a dedicated master controller 622. In other cases, multiple XDIMMs included in IMPU 628 may share a DDR controller 608 and/or a master controller 622. In one particular example, IMPU 628 includes four XDIMMs 626 along with four master controllers 622 (each master controller 622 including a DDR controller 608), where each of the master controllers 622 is configured to control one associated XDIMM 626, including the MPMs 610 of the XRAM chips 624 included in the associated XDIMM 626.

The DDR controller 608 and the master controller 622 are examples of controllers in a controller domain 630. A higher-level domain 632 may contain one or more additional devices, user applications, host computers, other devices, protocol layer entities, and the like. The controller domain 630 and related features are described in the sections below. In a case where multiple controllers and/or multiple levels of controllers are used, the controller domain 630 may serve as at least a portion of a multi-layered module domain, which is also further described in the sections below.

In the architecture represented by FIG. 6, one or more IMPUs 628 may be used to provide a memory appliance 640, which may be referred to as an XIPHOS appliance. In the example of FIG. 6, memory appliance 640 includes four IMPUs 628.

The location of processing elements 612 among memory banks 600 within the XRAM chips 624 (which are incorporated into XDIMMs 626 that are incorporated into IMPUs 628 that are incorporated into memory appliance 640) may significantly relieve the bottlenecks associated with CPUs, GPUs, and other processors that operate using a shared memory. For example, a processor subunit 612 may be tasked to perform a series of instructions using data stored in memory banks 600. The proximity of the processing subunit 612 to the memory banks 600 can significantly reduce the time required to perform the prescribed instructions using the relevant data.

Figure 7:
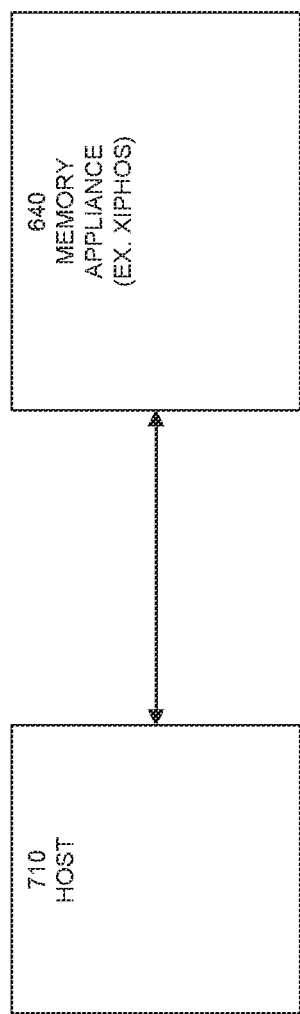
FIG. 7 shows a host provide instructions, data, and/or other input to a memory appliance and read output from the same.

As shown in FIG. 7, a host 710 may provide instructions, data, and/or other input to memory appliance 640 and read output from the same. Rather than requiring the host to access a shared memory and perform calculations/functions relative to data retrieved from the shared memory, in the disclosed embodiments, the memory appliance 640 can perform the processing associated with a received input from host 710 within the memory appliance (e.g., within processing modules 612 of one or more MPMs 610 of one or more XRAM chips 624 of one or more XDIMMs 626 of one or more IMPUs). Such functionality is made possible by the distribution of processing modules 612 among and on the same hardware chips as the memory banks 600 where relevant data needed to perform various calculations/functions/etc. is stored.

The architecture described in FIG. 6 may be configured for execution of code. For example, each processor subunit 612 may individually execute code (defining a set of instructions) apart from other processor subunits in an XRAM chip 624 within memory appliance 640. Accordingly, rather than relying on an operating system to manage multithreading or using multitasking (which is concurrency rather than parallelism), the XRAM chips of the present disclosure may allow for processor subunits to operate fully in parallel.

In addition to a fully parallel implementation, at least some of the instructions assigned to each processor subunit may be overlapping. For example, a plurality of processor subunits 612 on an XRAM chip 624 (or within an XDIMM 626 or IMPU 628) may execute overlapping instructions as, for example, an implementation of an operating system or other management software, while executing non-overlapping instructions in order to perform parallel tasks within the context of the operating system or other management software.

For purposes of various structures discussed in this description, the Joint Electron Device Engineering Council (JEDEC) Standard No. 79-4C defines the DDR4 SDRAM specification, including features, functionalities, AC and DC characteristics, packages, and ball/signal assignments. The latest version at the time of this application is January 2020, available from JEDEC Solid State Technology Association, 3103 North 10th Street, Suite 240 South, Arlington, VA 22201-2107, www.jedec.org, and is incorporated by reference in its entirety herein.

Exemplary elements such as XRAM, XDIMM, XSC, and IMPU are available from NeuroBlade Ltd., Tel Aviv, Israel. Details of memory processing modules and related technologies can be found in PCT/IB2018/000995 filed 30 Jul. 2018, PCT/IB2019/001005 filed 6 Sep. 2019, PCT/IB2020/000665 filed 13 Aug. 2020, and PCT/US2021/055472 filed 18 Oct. 2021. Exemplary implementations using XRAM, XDIMM, XSC, IMPU, etc. elements are not limiting, and based on this description one skilled in the art will be able to design and implement configurations for a variety of applications using alternative elements.

Data Analytics Processor

Figure 8:
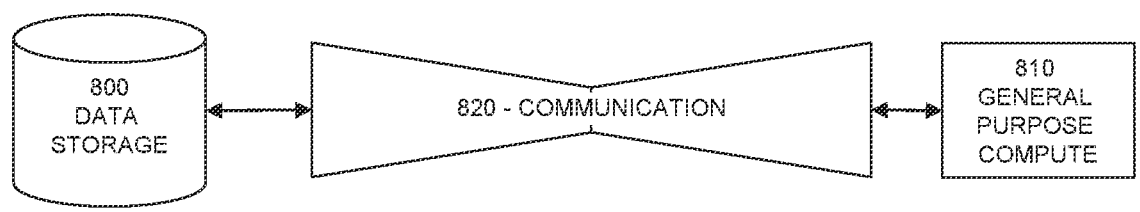
FIG. 8 is an example of implementations of processing systems and, in particular, for data analytics.

FIG. 8 is an example of implementations of processing systems and, in particular, processing systems for data analytics. Many modern applications are limited by data communication 820 between storage 800 and processing (shown as general-purpose compute 810). Current solutions include adding levels of data cache and re-layout of hardware components. For example, current solutions for data analytics applications have limitations including: (1) Network bandwidth (BW) between storage and processing, (2) network bandwidth between CPUs, (3) memory size of CPUs, (4) inefficient data processing methods, and (5) access rate to CPU memory.

In addition, data analytics solutions have significant challenges in scaling up. For example, when trying to add more processing power or memory, more processing nodes are required, therefore more network bandwidth between processors and between processors and storage is required, leading to network congestion.

Figure 9:
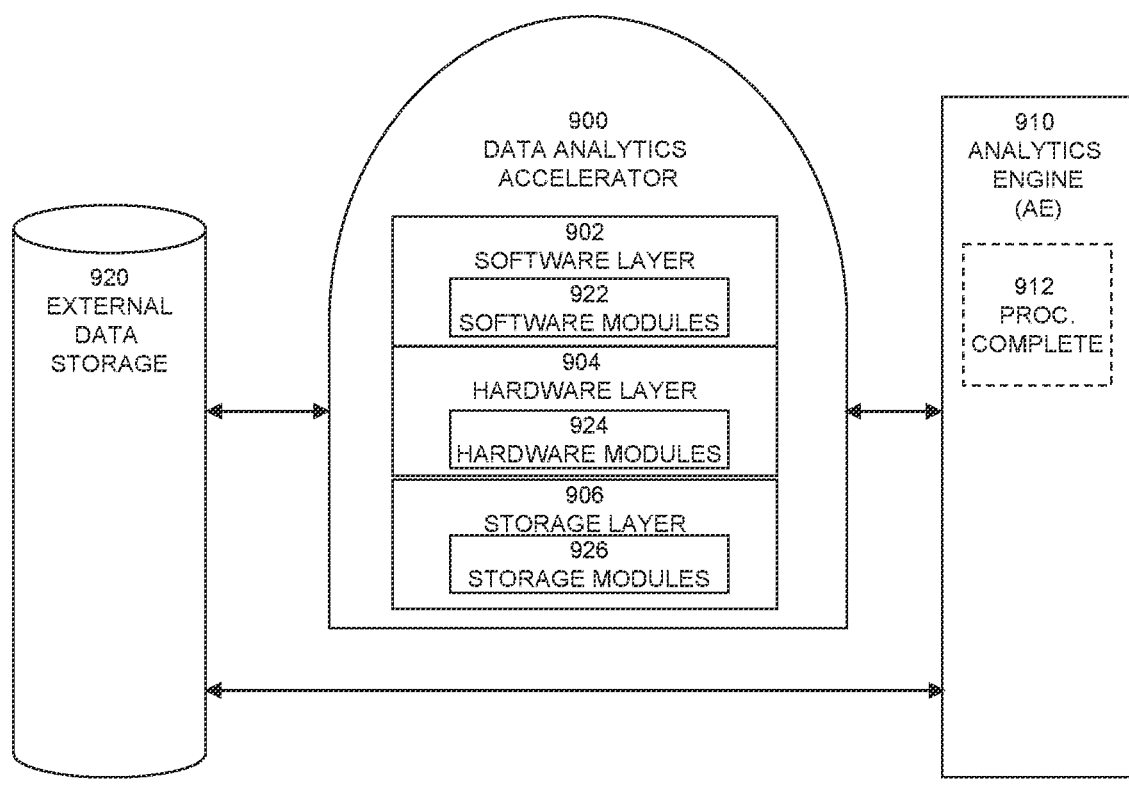
FIG. 9 is an example of a high-level architecture for a data analytics accelerator.

FIG. 9 is an example of a high-level architecture for a data analytics accelerator. A data analytics accelerator 900 is configured between an external data storage 920 and an analytics engine (AE) 910 optionally followed by completion processing 912, for example, on the analytics engine 910. The external data storage 920 may be deployed external to the data analytics accelerator 900, with access via an external computer network. The analytics engine (AE) 910 may be deployed on a general-purpose computer. The accelerator may include a software layer 902, a hardware layer 904, a storage layer 906, and networking (not shown). Each layer may include modules such as software modules 922, hardware modules 924, and storage modules 926. The layers and modules are connected within, between, and external to each of the layers. Acceleration may be done at least in part by applying one or more innovative operations, data reduction, and partial processing operations between the external data storage 920 and the analytics engine 910 (or general-purpose compute 810). Implementations of our solutions may include, but are not limited to, features such as, in-line, high parallelism computation, and data reduction. In an alternative operation, (only) a portion of data is processed by the data analytics accelerator 900 and a portion of the data bypasses the data analytics accelerator 900.

The data analytics accelerator 900 may provide at least in part a streaming processor, and is particularly suited, but not limited to, accelerating data analytics. The data analytics accelerator 900 may drastically reduce (for example, by several orders of magnitude) the amount of data which is transferred over the network to the analytics engine 910 (and/or the general-purpose compute 810), reduces the workload of the CPU, and reduces the required memory which the CPU needs to use. The accelerator 900 may include one or more data analytics processing engines which are tailor-made for data analytics tasks, such as scan, join, filter, aggregate etc., doing these tasks much more efficiently than analytics engine 910 (and/or the general-purpose compute 810). An implementation of the data analytics accelerator 900 is the Hardware Enhanced Query System (HEQS), which may include a Xiphos Data Analytics Accelerator (available from NeuroBlade Ltd., Tel Aviv, Israel).

Figure 10:
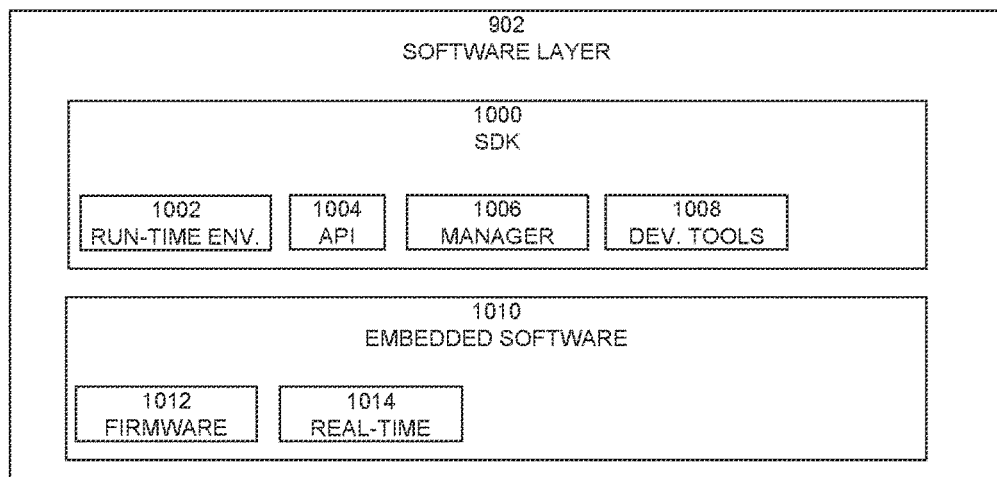
FIG. 10 is an example of a software layer for a data analytics accelerator.

FIG. 10 is an example of the software layer for the data analytics accelerator. The software layer 902 may include, but is not limited to, two main components: a software development kit (SDK) 1000 and embedded software 1010. The SDK provides abstraction of the accelerator capabilities through well-defined and easy to use data-analytics oriented software APIs for the data analytics accelerator. A feature of the SDK is enabling users of the data analytics accelerator to maintain the users' own DBMS, while adding the data analytics accelerator capabilities, for example, as part of the users' DBMS's planner optimization. The SDK may include modules such as:

A run-time environment 1002 may expose hardware capabilities to above layers. The run-time environment may manage the programming, execution, synchronization, and monitoring of underlying hardware engines and processing elements.

A Fast Data I/O providing an efficient API 1004 for injection of data into the data analytics accelerator hardware and storage layers, such as an NVMe array and memories, and for interaction with the data. The Fast Data I/O may also be responsible for forwarding data from the data analytics accelerator to another device (such as the analytics engine 910, an external host, or server) for processing and/or completion processing 912.

A manager 1006 (data analytics accelerator manager) may handle administration of the data analytics accelerator.

A toolchain may include development tools 1008, for example, to help developers enhance the performance of the data analytics accelerator, eliminate bottlenecks, and optimize query execution. The toolchain may include a simulator and profiler, as well as a LLVM compiler.

Embedded software component 1010 may include code running on the data analytics accelerator itself. Embedded software component 1010 may include firmware 1012 that controls the operation of the accelerator's various components, as well as real-time software 1014 that runs on the processing elements. At least a portion of the embedded software component code may be generated, such as auto generated, by the (data analytics accelerator) SDK.

Figure 11:
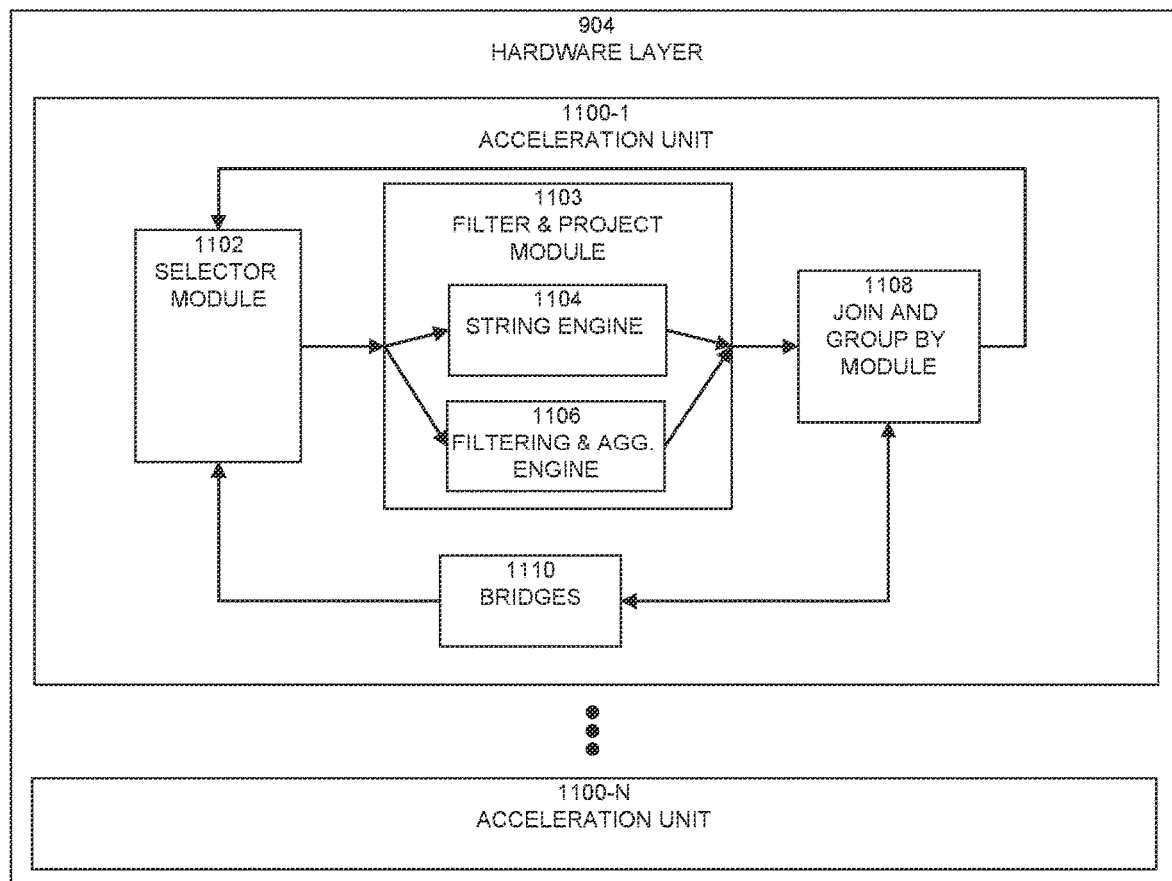
FIG. 11 is an example of the hardware layer for a data analytics accelerator.

FIG. 11 is an example of the hardware layer for the data analytics accelerator. The hardware layer 904 includes one or more acceleration units 1100. Each acceleration unit 1100 includes one or more of a variety of elements (modules), which may include a selector module 1102, filter and projection module (FPE) 1103, JOIN and Group By (JaGB) module 1108, and bridges 1110. Each module may contain one or more sub-modules, for example, the FPE 1103 which may include a string engine (SE) 1104 and a filtering and aggregation engine (FAE) 1106.

In FIG. 11, a plurality of acceleration units 1100 are shown as first acceleration unit 1100-1 to $n^{th}$ acceleration unit 1100-N. In the context of this description, the element number suffix "-N", where "N" is an integer, generally refers to an exemplary one of the elements, and the element number without a suffix refers to the element in general or the group of elements. One or more acceleration units 1100, individually or in combination, may be implemented using one or more individual or combination of FPGAs, ASICs, PCBs, and similar. Acceleration units 1100 may have the same or similar hardware configurations. However, this is not limiting, and modules may vary from one to another of the acceleration units 1100.

An example of element configuration will be used in this description. As noted above, element configuration may vary. Similarly, an example of networking and communication will be used. However, alternative and additional connections between elements, feed forward, and feedback data may be used. Input and output from elements may include data and alternatively or additionally includes signaling and similar information.

The selector module 1102 is configured to receive input from any of the other acceleration elements, such as, for example, from at least from the bridges 1110 and the JOIN and Group By engine (JaGB) 1108 (shown in the current figure), and optionally/alternatively/in addition from the filtering and projection module (FPE) 1103, the string engine (SE) 1104, and the filtering and aggregation engine (FAE) 1106. Similarly, the selector module 1102 can be configured to output to any of the other acceleration elements, such as, for example, to the FPE 1103.

The FPE 1103 may include a variety of elements (sub-elements). Input and output from the FPE 1103 may be to the FPE 1103 for distribution to sub-elements, or directly to and from one or more of the sub-elements. The FPE 1103 is configured to receive input from any of the other acceleration elements, such as, for example, from the selector module 1102. FPE input may be communicated to one or more of the string engine 1104 and FAE 1106. Similarly, the FPE 1103 is configured to output from any of the sub-elements to any of the other acceleration elements, such as, for example, to the JaGB 1108.

The JOIN and Group By (JaGB) engine 1108 may be configured to receive input from any of the other acceleration elements, such as, for example, from the FPE 1103 and the bridges 1110. The JaGB 1108 may be configured to output to any of the acceleration unit elements, for example, to the selector module 1102 and the bridges 1110.

Figure 12:
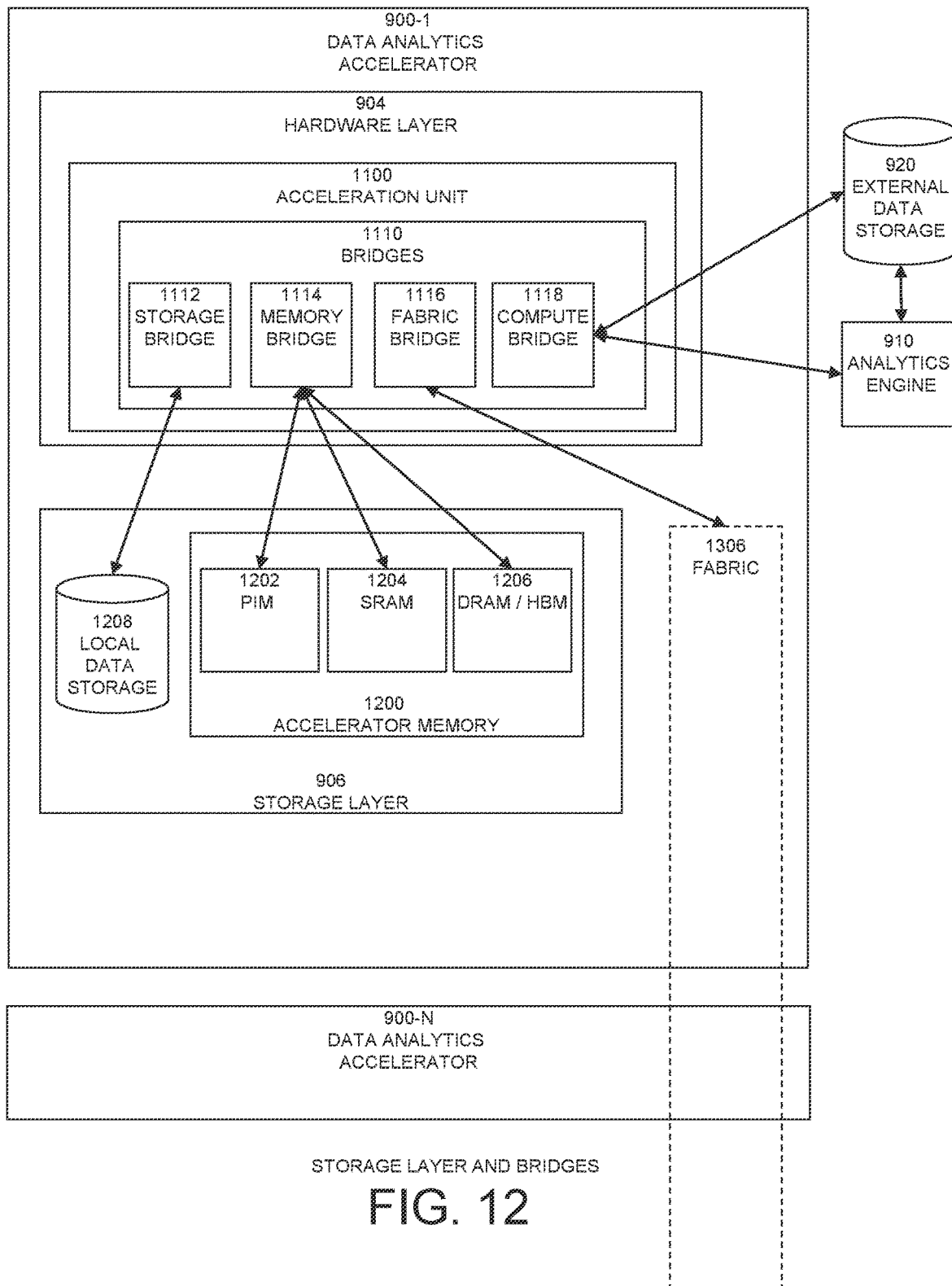
FIG. 12 is an example of the storage layer and bridges for a data analytics accelerator.

FIG. 12 is an example of the storage layer and bridges for the data analytics accelerator. The storage layer 906 may include one or more types of storage deployed locally, remotely, or distributed within and/or external to one or more of the acceleration units 1100 and one or more of the data analytics accelerators 900. The storage layer 906 may include non-volatile memory (such as local data storage 1208) and volatile memory (such as an accelerator memory 1200) deployed local to the hardware layer 904. Non-limiting examples of the local data storage 1208 include, but are not limited to solid state drives (SSD) deployed local and internal to the data analytics accelerator 900. Non-limiting examples of the accelerator memory 1200 include, but are not limited to FPGA memory (for example, of the hardware layer 904 implementation of the acceleration unit 1100 using an FPGA), processing in memory (PIM) 1202 memory for example, banks 600 of memory 602 in a memory processing module 610, and SRAM, DRAM, and HBM (for example, deployed on a PCB with the acceleration unit 1100). The storage layer 906 may also use and/or distribute memory and data via the bridges 1110 (such as, for example, the memory bridge 1114) via a fabric 1306 (described below in reference to FIG. 13), for example, to other acceleration units 1100 and/or other acceleration processors 900. In some embodiments, storage elements may be implemented by one or more elements or sub-elements.

One or more bridges 1110 provide interfaces to and from the hardware layer 904. Each of the bridges 1110 may send and/or receive data directly or indirectly to/from elements of the acceleration unit 1100. Bridges 1110 may include storage 1112, memory 1114, fabric 1116, and compute 1118.

Bridges configuration may include the storage bridge 1112 interfaces with the local data storage 1208. The memory bridge interfaces with memory elements, for example the PIM 1202, SRAM 1204, and DRAM/HBM 1206. The fabric bridge 116 interfaces with the fabric 1306. The compute bridge 1118 may interface with the external data storage 920 and the analytics engine 910. A data input bridge (not shown) may be configured to receive input from any of the other acceleration elements, including from other bridges, and to output to any of the acceleration unit elements, such as, for example, to the selector module 1102.

Figure 13:
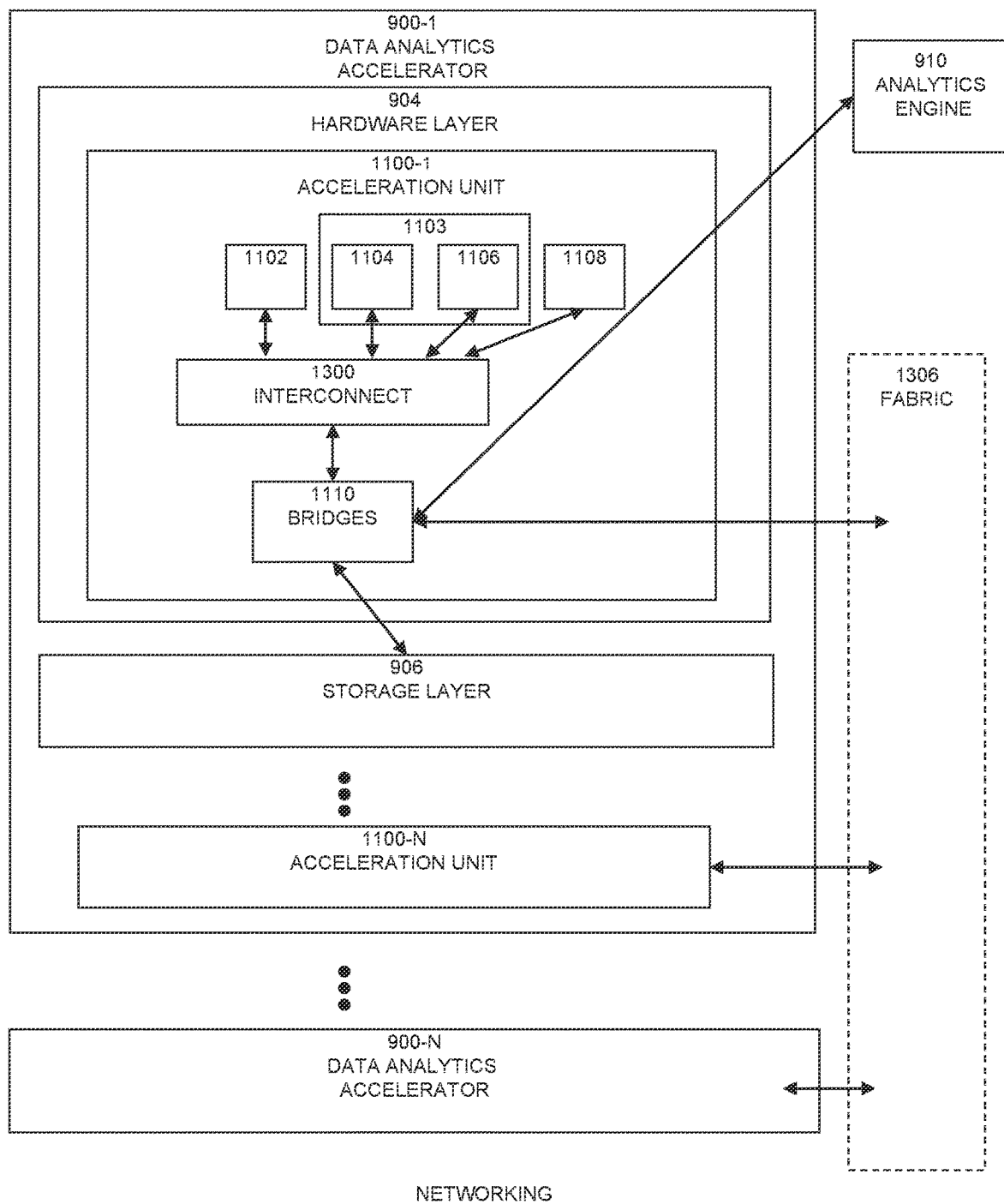
FIG. 13 is an example of networking for a data analytics accelerator.

FIG. 13 is an example of networking for the data analytics accelerator. An interconnect 1300 may include an element deployed within each of the acceleration units 1100. The interconnect 1300 may be operationally connected to elements within the acceleration unit 1100, providing communications within the acceleration unit 1100 between elements. In FIG. 13, exemplary elements (1102, 1104, 1106, 1108, 1110) are shown connected to the interconnect 1300. The interconnect 1300 may be implemented using one or more sub-connection systems using one or more of a variety of networking connections and protocols between two or more of the elements, including, but not limited to, dedicated circuits and PCI switching. The interconnect 1300 may facilitate alternative and additional connections feed forward, and feedback between elements, including but not limited to looping, multi-pass processing, and bypassing one or more elements. The interconnect can be configured for communication of data, signaling, and other information.

Bridges 1110 may be deployed and configured to provide connectivity from the acceleration unit 1100-1 (from the interconnect 1300) to external layers and elements. For example, connectivity may be provided as described above via the memory bridge 1114 with the storage layer 906, via the fabric bridge 1116 with the fabric 1306, and via the compute bridge 1118 with the external data storage 920 and the analytics engine 910. Other bridges (not shown) may include NVME, PCIe, high-speed, low-speed, high-bandwidth, low-bandwidth, and so forth. The fabric 1306 may provide connectivity internal to the data analytics accelerator 900-1 and, for example, between layers like hardware 904 and storage 906, and between acceleration units, for example between a first acceleration unit 1100-1 to additional acceleration units 1100-N. The fabric 1306 may also provide external connectivity from the data analytics accelerator 900, for example between the first data analytics accelerator 900-1 to additional data analytics accelerators 900-N.

The data analytics accelerator 900 may use a columnar data structure. The columnar data structure can be provided as input and received as output from elements of the data analytics accelerator 900. In particular, elements of the acceleration units 1100 can be configured to receive input data in the columnar data structure format and generate output data in the columnar data structure format. For example, the selector module 1102 may generate output data in the columnar data structure format that is input by the FPE 1103. Similarly, the interconnect 1300 may receive and transfer columnar data between elements, and the fabric 1306 between acceleration units 1100 and accelerators 900.

Streaming processing avoids memory bounded operations which can limit communication bandwidth of memory mapped systems. The accelerator processing may include techniques such as columnar processing, that is, processing data while in columnar format to improve processing efficiency and reduce context switching as compared to row-based processing. The accelerator processing may also include techniques such as single instruction multiple data (SIMD) to apply the same processing on multiple data elements, increasing processing speed, facilitating "real-time" or "line-speed" processing of data. The fabric 1306 may facilitate large scale systems implementation.

Accelerator memory 1200, such as PIM 1202 and HBM 1206 may provide support for high bandwidth random access to memory. Partial processing may produce data output from the data analytics accelerator 900 that may be orders of magnitude less than the original data from storage 920. Thus, facilitating the completion of processing on analytics engine 910 or general-purpose compute with a significantly reduced data scale. Thus, computer performance is improved, for example, increasing processing speeds, decreasing latency, decreasing variation of latency, and reducing power consumption.

Consistent with the examples described in this disclosure, in an embodiment, a system includes a hardware based, programmable data analytics processor configured to reside between a data storage unit and one or more hosts, wherein the programmable data analytics processor includes: a selector module configured to input a first set of data and, based on a selection indicator, output a first subset of the first set of data; a filter and project module configured to input a second set of data and, based on a function, output an updated second set of data; a join and group module configured to combine data from one or more third data sets into a combined data set; and a communications fabric configured to transfer data between any of the selector module, the filter and project module, and the join and group module. The modules may correspond to the modules discussed above in connection with, for example, FIGS. 8-13.

In some embodiments, the first set of data has a columnar structure. For example, the first set of data may include one or more data tables. In some embodiments, the second set of data has a columnar structure. For example, the second set of data may include one or more data tables. In some embodiments, the one or more third data sets have a columnar structure. For example, the one or more data sets may include one or more data tables.

In some embodiments, the second set of data includes the first subset. In some embodiments, the one or more third data sets include the updated second set of data. In some embodiments, the first subset includes a number of values equal to or less than the number of values in the first set of data.

In some embodiments, the one more third data sets include structured data. For example, the structured data may include table data in column and row format. In some embodiments, the one or more third data sets include one or more tables and the combined data set includes at least one table based on combining columns from the one or more tables. In some embodiments, the one or more third data sets include one or more tables, and the combined data set includes at least one table based on combining rows from the one or more tables.

In some embodiments, the selection indicator is based on a previous filter value. In some embodiments, the selection indicator may specify a memory address associated with at least a portion of the first set of data. In some embodiments, the selector module is configured to input the first set of data as a block of data in parallel and use SIMD processing of the block of data to generate the first subset.

In some embodiments, the filter and project module includes at least one function configured to modify the second set of data. In some embodiments, the filter and projection module is configured to input the second set of data as a block of data in parallel and execute a SIMD processing function of the block of data to generate the second set of data.

In some embodiments, the join and group module is configured to combine columns from one or more tables. In some embodiments, the join and group module is configured to combine rows from one or more tables. In some embodiments, the modules are configured for line rate processing.

In some embodiments, the communications fabric is configured to transfer data by streaming the data between modules. Streaming (or stream processing or distributed stream processing) of data may facilitate parallel processing of data transferred to/from any of the modules discussed herein.

In some embodiments, the programmable data analytics processor is configured to perform at least one of SIMD processing, context switching, and streaming processing. Context switching may include switching from one thread to another thread and may include storing the context of the current thread and restoring the context of another thread.

Consistent with the examples described in this disclosure, in an embodiment, a system includes a hardware based, programmable data analytics processor configured to reside between a data storage unit and one or more hosts, wherein the programmable data analytics processor includes: a selector module configured to input a first set of data and, based on a selection indicator, output a first subset of the first set of data; a filter and project module configured to input a second set of data and, based on a function, output an updated second set of data; a communications fabric configured to transfer data between any of the modules. The modules may correspond to the modules discussed above in connection with, for example, FIGS. 8-13.

Consistent with the examples described in this disclosure, in an embodiment, a system includes a hardware based, programmable data analytics processor configured to reside between a data storage unit and one or more hosts, wherein the programmable data analytics processor includes: a selector module configured to input a first set of data and, based on a selection indicator, output a first subset of the first set of data; a join and group module configured to combine data from one or more third data sets into a combined data set; and a communications fabric configured to transfer data between any of the modules. The modules may correspond to the modules discussed above in connection with, for example, FIGS. 8-13.

Consistent with the examples described in this disclosure, in an embodiment, a system includes a hardware based, programmable data analytics processor configured to reside between a data storage unit and one or more hosts, wherein the programmable data analytics processor includes: a filter and project module configured to input a second set of data and, based on a function, output an updated second set of data; a join and group module configured to combine data from one or more third data sets into a combined data set; and a communications fabric configured to transfer data between any of the modules. The modules may correspond to the modules discussed above in connection with, for example, FIGS. 8-13.

Pruner-Based Selector Overview and Hardware Implementations

As processor speeds and memory sizes both continue to increase, a significant limitation on effective processing speeds is the von Neumann bottleneck. The von Neumann bottleneck results from throughput limitations. In particular, data transfer from memory to the processor is often bottlenecked compared to actual computations undertaken by the processor. Moreover, the computational bandwidth of the processor is generally larger than the bandwidth of the buses that the processor uses to access the memory.

These bottlenecks are particularly pronounced for memory-intensive processes, such as neural network and other machine learning algorithms; database construction, indexing searching, and querying; and other tasks that include more reading and writing operations than data processing operations.

To facilitate the manipulation of large data sets, there is a need to improve data processing techniques. The use of general-purpose processors for demanding applications may no longer be viable in a future where new data resources may be massive, and the growth rate of these data resources may exceed data processing capabilities, especially for companies that are considering a move into big data platforms. The combination of general-purpose processors with fully customized hardware is often termed hardware acceleration. GPUs (graphics processing units), ASICs (application-specific integrated circuits) or FPGAs (field-programmable gate arrays) are part of this new generation of hardware solutions designed to run intensive processes at higher speeds. However, hardware acceleration is not just about buying these new specialized components, it is also about programming them. The skill set required to program these advanced hardware components is not available to any data scientist. Hardware engineers can perform these tasks, but due to the high demand and low supply, they are usually priced high. For this reason, most companies are not able to use hardware acceleration and increase their performance. The present disclosure describes solutions for mitigating or overcoming one or more of the problems set forth above, among other problems in the prior art.

A pre-processing architecture with specialized and fully customized hardware components can reduce data transfers compared to other systems. Instead of directly implementing customized hardware components in association with an existing host processor (e.g., a central processing unit (CPU)), the disclosed embodiments may act as an intermediary between a host processor (e.g., a query processor, analytics engine) and a data storage to accelerate interactions with data included in the data storage. For example, where a host initiates a data query, the disclosed embodiments may respond to the host-initiated data query by performing tasks related to the data query and delivering data query results as output (e.g., to the host or along another output path). Such a flow may avoid bottlenecks and inefficiencies associated with loading data directly from the data storage to the host, memory reads/writes between the host and the data storage, and/or software-based processing by the host of data retrieved from the data storage. In certain situations, the disclosed embodiments can receive a query from a host and return to the host (or some other destination) the query results. With circuitry designed to accelerate certain data filtering (or other data manipulation) processes, the disclosed embodiments may be equipped to return query results more quickly than a host may achieve on its own. The disclosed embodiments may be useful for assisting with a variety of data-intensive tasks. In one example, the disclosed embodiments may assist with table filtering, and may eliminate the need for transferring an entire table of data from memory to a remote CPU to be processed by the CPU for selection of data from the table.

An embodiment of a selector is referred to in the context of this description as "Pruner," "Pruner selector," "Pruner-based selector," "Pruner module," "Pruning logic," and similar terms. A feature of the Pruner-based selector is an interface configured to transfer at least one filter value from a host processor. A pruning logic is then configured to receive the filter value via the interface and use the at least one filter value to scan rows or columns of a data table stored in a memory; generate a selection indicator identifying a set of rows or columns of the data table where the at least one filter value resides, and provide to the host processor a filtered output based on the selection indicator. In this description, a non-limiting example is used where the data is structured as data table in row-column format, other types of data, including unstructured data, may be used and filtered. Examples of unstructured data includes text, messages videos, photos, webpages, audio signals, etc.

Note that in database technology the words "pruner" and "pruning" may be used to refer to functions that are unrelated to the field of current embodiments. Some examples of "pruning" functions include removing unwanted historical data from a database, reducing database size prior to migration, determining, and extracting a dataset with desired properties, and removing unwanted data from a database. While these functions might use one or more of the disclosed embodiments, without limiting the scope of the embodiments, the problems to be solved by the disclosed embodiments includes faster and more efficient filtering of a table.

Pruner-Based Selector Implemented in a Data Analysis Processor

A system for multi pass data processing can significantly reduce data transfers compared to other selection systems. A feature of the Pruner-based selector is a first processor configured for generation of a selection indicator based on a first subset of data from a data set. A processing module is configured for selecting (filtering/consuming) selected data from a second subset of data from the data set, the selecting based on the selection indicator.

In this description, a non-limiting example is used of the data set being structured table data in row-column format and the selection indicator being a selection vector. In this case, a feature of the Pruner-based selector is working on columns and initial handling of the predicates followed by processing (consuming, filtering) table data. The first processor initially runs filters on a first set of one or more columns of table data to generate the selection vector. The selection vector includes one or more flags indicating existence (matching) of predicates in corresponding rows of the first set of columns. Preferably, the processing module consumes a second set of one or more columns of table data and based on the selection vector outputs the corresponding rows from the second set of columns. In an alternative embodiment, the selection vector can be output.

The disclosed embodiments are particularly useful in solving problems with table filtering, for example, eliminating the need for transferring an entire table of data from memory to a remote CPU to be processed by the CPU for selection of data from the table. A table includes a set of rows which are filtered based on predicates.

Figure 14:
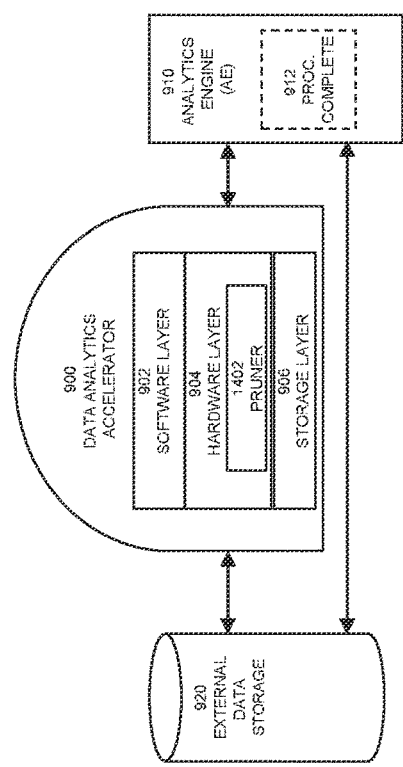
FIG. 14 is a high-level example of a data analytics architecture.

FIG. 14 is a high-level example of the data analytics architecture. Acceleration, such as the data analytics accelerator 900, can be done at least in part by applying innovative operations between the external data storage 920 and the analytics engine 910 (e.g., a CPU), optionally followed by completion processing 912. The Pruner selector 1402 may be implemented as a module in the hardware layer 904.

Figure 15:
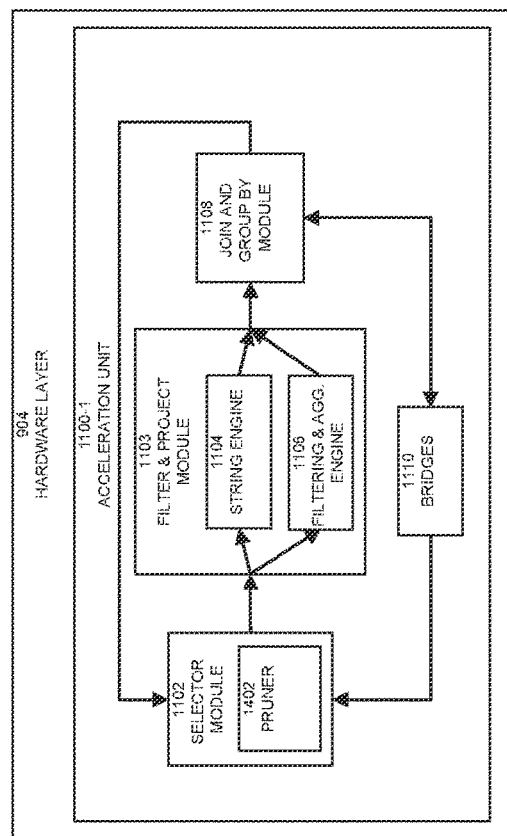
FIG. 15 is an example of a data analytics accelerator.

FIG. 15 is an example of the data analytics accelerator 900 including implementation of the selector module 1102 with embodiments of the Pruner selector 1402. The Pruner selector 1402 may be implemented as part of the hardware layer 904 in the acceleration unit 1100. As described above in reference to the general acceleration architecture and configuration, the Pruner selector 1402 can be configured to receive input from any of the other acceleration elements, e.g., at least data from one of the bridges 1110, and optionally/alternatively/in addition from the filtering and projection module (FPE) 1103, the string engine (SE) 1104, the filtering and aggregation engine (FAE) 1106, and the join and group by module 1108. Similarly, the Pruner selector can be configured to output to any of the other acceleration elements, for example to the FPE 1103 or to the bridges 1110.

Figure 16A:
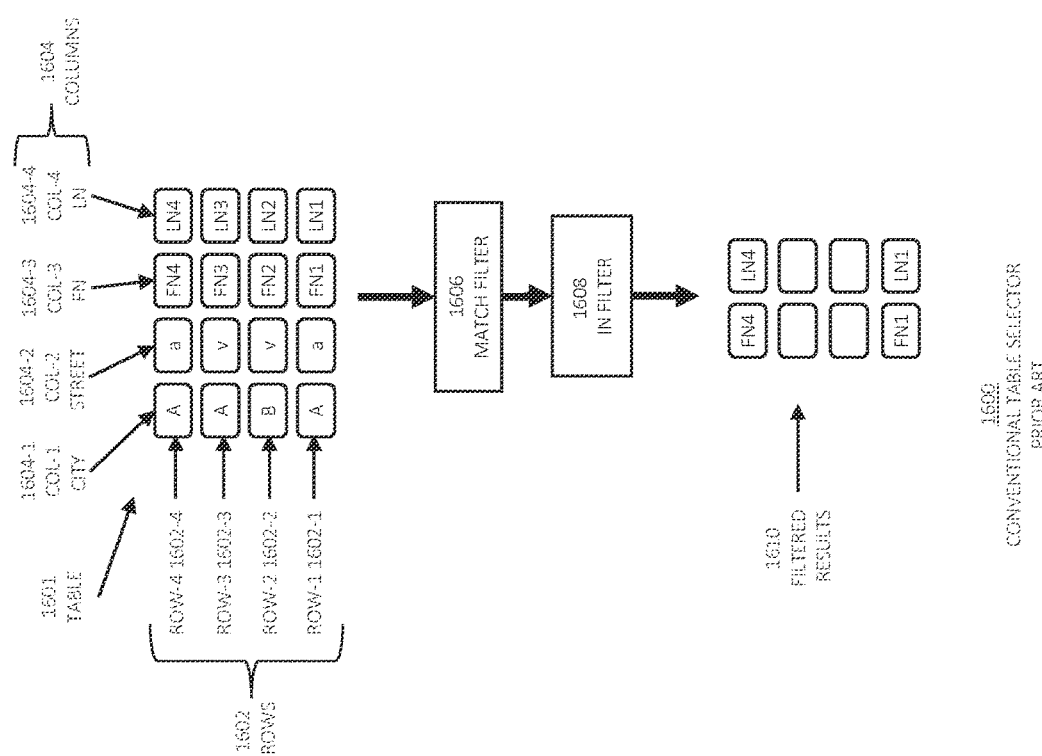
FIG. 16A is an example of a method relating to a table selector.

FIG. 16A is an example of a method of a table selector 1600. In the context of this document, the term "table selector" is also referred to as filtering or querying the table to extract data from the table, and also referred to as selection and/or selection from the table. An exemplary table 1601 in the current example includes 4 rows 1602 of data, each with 4 values: City, Street, First Name (FN), and Last Name (LN). The data rows 1602 include row-1 1602-1, row-2 1602-2, row-3 1602-3, and row-4 1602-4. The values 1604 are shown corresponding to columns 1604 including column-1 (col-1) 1604-1, column-2 (col-2) 1604-2, column-3 (col-3) 1604-3, and column-4 (col-4) 1604-4. A match-filter 1606 and an IN-filter 1608 are used to produce filtered results 1610. Exemplary table data is shown for City {A, B}, Street {a, v}, FN one to four respectively {FN1, FN2, FN3, FN4}, and corresponding LN one to four {LN1, LN2, LN3, LN4}. An exemplary selector method picks the first and last name (FN, LN) of people that live in City A (1st predicate) and Street IN group {a, b, c, d} (2nd predicate). This query can be represented, for example, in SQL:

select t.fn, t.ln
from table as t
where t.city=A and t.street=a

Traditional querying 1600 is based on row filtering, and the following method is used:

1. The data in the rows 1602 are scanned by the match-filter 1606. As the data in each of the rows 1602 are scanned by the match-filter 1606, the row being scanned is filtered based on the first predicate (City, col-1 1604-1) to produce first filtered results.

2. The first filtered results from the match-filter 1606 (filtered rows) are sent to the IN-filter 1608. As each of the filtered rows (rows of the first filtered results) is received by the IN-filter 1608, the IN-filter 1608 filters based on the IN-group, which is the second predicate ({a, b, c, d}), and outputs the filtered results 1610.

As is known in the art, a predicate is a condition that is applied to rows in a table. The logical condition results in TRUE or FALSE. Exemplary operations used in predicates (with predicates) include:

IN operator.
Exist function.
Match operator.
Range operator.
Like operator.
ANY/ALL operators.

Figure 16B:
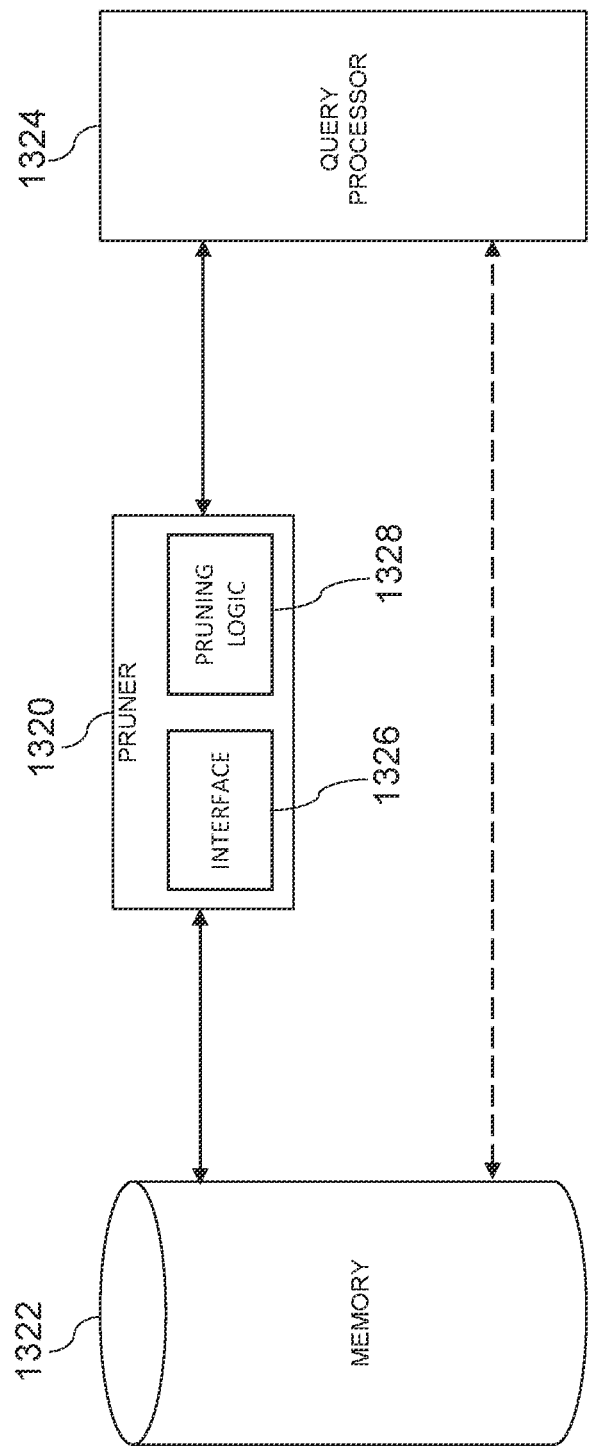
FIG. 16B is a diagrammatic representation of a data pre-processing architecture consistent with the disclosed embodiments.

FIG. 16B is a diagrammatic representation of a pre-processing architecture (e.g., a hardware pruner) consistent with the disclosed embodiments. Reducing data transfers using a pruner 1320, may be performed at least in part using pruning circuitry and/or by applying pruning operations between the memory 1322 and the query processor 1324 (e.g., a CPU). In some embodiments, the query processor 1324 may include any logic-based circuitry capable of initiating an interaction with data stored in a memory (e.g., a data query). Examples of logic-based circuitry may include combinational circuitry, state circuitry, processors, ASICs, FPGAs, CPUs, or GPUs. In some other embodiments, the query processor 1324 (e.g., a host processor, as described above) may issue a signal that causes the pruning logic 1328 to perform a preset filtering task relative to data in the memory 1322. For example, a signal may correspond to a particular voltage value, a logical value, a text string, or a bit string. Additionally, filtered results may be sent to the query processor 1324 or any other suitable location such as a register or data storage.

The pruner 1320 may comprise an interface 1326 and pruning logic 1328. A query, including at least one filter value, may be sent by the query processor 1324. The query may be received at the pruner 1320 via the interface 1326. The query may be executed by the pruning logic 1328. An interface may include one or more structures (e.g., an ASIC pin, circuit node, logic block, etc.) into which at least one data value associated with a query may be received. Above and throughout this description the term "query" refers to a request for data stored in a data source (e.g. a memory), this request may comprise at least one filter value to reduce the number of data retrieved from the data source. In some embodiments, a query may comprise at least one additional data manipulation operation other than retrieving data. For example, a query may include operations such as, inserting, updating, or deleting data. For illustrative purposes, a query expressed in SQL language is provided below:

SELECT t.street
FROM table as t
WHERE t.city=A.

The goal of this query is to retrieve from a data table "t" street names of people living in city "A". For ease of understanding, the disclosed embodiments are described relative to a data table including rows and columns. It should be understood, however, that the disclosed embodiments may be used in conjunction with any suitable data set including searchable data elements. In some cases, such data sets may be structured data elements.

In an alternative operation, a portion of data may be processed by the pruner 1320 (as represented by solid bi-directional arrows in the current figure) and another portion of the data may bypass the pruner 1320 (as represented by the dashed bi-directional arrow in FIG. 16B).

In some embodiments, the query processor 1324 may include a CPU. For example, the query processor may be deployed on a general-purpose computer, so that when query operations are required by the general-purpose computer, data is not transferred directly from memory 1322 to the central processing unit of the general-purpose computer, but rather is processed and filtered by the pruner 1320. In general, the query processor may include any logic-based circuitry configured to operate on, process, condition, etc. data retrieved from a memory. Such query processors can include a CPU, a GPU, an FPGA, In certain cases, the disclosed pruner 1320, including pruner logic 1328, may assist in reducing or eliminating bottleneck effects associated with transferring large of volumes of data from a data storage unit to a query processor, for example, as part of an operation by the query processor to generate results to a query.

In some embodiments, the memory 1322 may include one or more non-volatile storage units. Examples of non-volatile storage units may include flash memory storage, hard disk drives (HDD) or solid-state drives (SSD). In some other embodiments, memory 1322 may include one or more volatile memory modules. For instance, memory 1322 may include one or more dynamic random access memory (DRAM) modules, static RAM modules (SRAM), cache memory modules, synchronous dynamic RAM (SDRAM) modules, DDR4 SDRAM modules, semiconductor memory chips, and/or computational memory. In yet another embodiment, memory 1322 may include one or more dual inline memory modules (DIMMs).

The pruning logic 1328 may include any type of hardware-based circuitry suitable for performing one or more data filtering operations. In some embodiments, the pruning logic 1328 may include an FPGA programmed to filter data retrieved from a memory. For example, in some cases, data from a data table is streamed to an FPGA. Data values that satisfy certain filtering criteria provided to the FPGA may be streamed as output from the FPGA implemented pruning logic. Data values that do not satisfy the filtering criteria may be omitted from the output of the FPGA. In this way, the pruning logic can quickly and efficiently generate filtered data outputs from even very large databases (e.g., data tables with millions of rows), and these filtered data outputs can be provided to one or more query processors. Such an operation using the disclosed pruning logic may eliminate the need for a query processor to load large data tables or portions of data tables from a data storage unit (e.g., through a memory bottleneck) and perform its own filtering operations relative to the large data tables/blocks. The pruning logic may also include other structures. In some cases, pruning logic 1328 may be implemented on one or more ASICs. Additionally, or alternatively, the pruning logic may include one or more comparators configured to receive at least two input values in a digital or binary form and generate an output indicative of whether one input is equal to, less than, or greater than the other. Examples of comparator-based logic structures include string filters, string comparators, counters, sorting networks, etc. In some cases, comparators may include one or more functions programmed on processing devices using a specific language (e.g., MATCH, IN, EXIST, RANGE, LIKE, ANY/ALL functions in SQL language, etc.)

In the example of FIG. 16B, pruner 1320 is located external to memory 1322. Different configurations, however, may be used. For example, in some embodiments, the pruning logic 1328 may be local to memory 1322. In other embodiments, the pruning logic 1328 may be deployed on an interface or controller associated with memory 1322. In some embodiments, the pruner 1320 may include an internal memory and may copy into the internal memory a data table or portion(s) of one or more data tables stored in memory 1322.

In some embodiments, pruner 1320 may be included as part of a more sophisticated data analytics accelerator architecture (FIG. 14) configured to accelerate various data analytics functions. The data analytics accelerator may be configured as an intermediary between the memory 1322 and the query processor 1324. In one example, the data analytics accelerator 900 may comprise a plurality of modules, both hardware and software, as well as some storage components, wherein the modules may be interconnected with one another. The pruner 1320 may be implemented by one or more modules among the plurality of modules of the data analytics accelerator. Any processor deployed in one module of the plurality of modules may send a query comprising at least one filter value which may be received, via the interface 1326, by the pruning logic 1328. In some embodiments, the query processor 1324 may refer to a section of the accelerator itself, wherein a section of the accelerator may comprise one or more processor subunits that cause a data request.

Table Filtering Based on a Single Filter Value

Figure 16C:
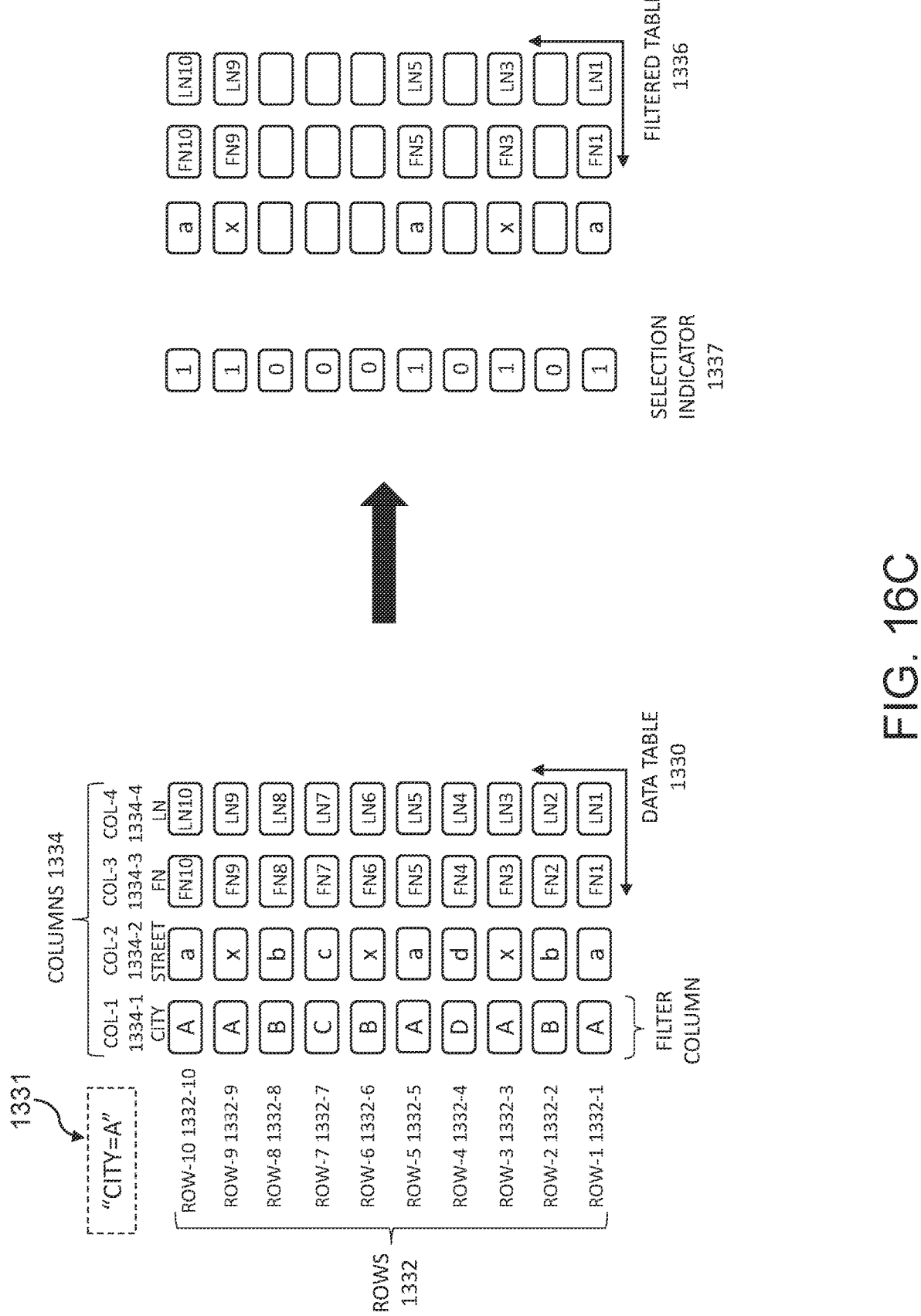
FIG. 16C is a sketch of an exemplary implementation of a table filtering operation performed by pruning logic consistent with the disclosed embodiments.

FIG. 16C provides a diagrammatic representation of an example filtering operation that may be performed by pruner 1320 relative to an exemplary data table 1330. For example, query processor 1324 may initiate a data query and, as part of the data query, may transfer to pruner 1320 at least one filter value, such as filter value 1331 (i.e., a value representative of City "A"). The filter value may include a number (e.g., an integer value), text string, binary representation of a number and/or text, etc. In response, pruner 1320 may scan data (e.g., one or more data tables) stored in memory 1322 and generate a filtered output including data satisfying the at least one filter value. The filtered output may be provided to query processor 1324, alleviating the need for query processor 1324 to generate query results on its own (a process that may involve one or more bottlenecks that can contribute to inefficiencies associated with the data query process).

Pruner 1320 may employ various techniques for scanning data from memory 1322. For example, in response to filter value 1331, pruner 1320 may identify column 1334-1 as including data relevant to the scan. In some embodiments, values from column 1334-1 may be loaded into a memory layer associated with pruner 1320. The values can be loaded one at a time and sequentially scanned. That is, row values in column 1334-1 may be sequentially compared to the filter value 1331 to determine whether each row value matches or includes the filter value 1331. In other cases, the values from column 1334-1 may be loaded in blocks of a predetermined size, such that the row values (or column values in some examples) from column 1334-1 are scanned by sequentially accessing blocks of values stored in the rows (or columns) of data table 1330. The blocks of values loaded for scanning may include a single row of values or a single column of values. In other cases, the blocks of values loaded for scanning may include values from a plurality of rows or a plurality of columns. The blocks of values may have any suitable size. In some cases, the blocks of values may represent 256 bits, 2, 8, 32, 64, 128, 256 kbits, or 10 MB of data. In some cases, all of the values included in column 1334-1 may be loaded together and then subsequently scanned.

In the context of this description, a logical match may be the result of a Boolean operation between the filter value and another test value to be analyzed (e.g., a data value from data table 1330, or a value derived from one or more values associated with data table 1330). The Boolean operation may be performed by a program stored in at least one processor of pruning logic 1328. Additionally or alternatively, the Boolean operation may be performed using one or more hardware components included in the pruning logic 1328 (e.g., comparators, etc.). The Boolean operation can take place at different levels. For example, the Boolean operation may consist of comparing the filter value to a test value in the form of a text string or an integer value. In some embodiments, the filter value may be binary, blobs, decimal, time, etc. Alternatively, the operation can be performed directly with a binary representation of the filter and test values.

Using pruning logic 1328, which may include one or more filters, string comparators, etc., pruner 1320 scans values from column 1334-1 and compares values from column 1334-1 to the filter value 1331 (e.g., "A" in this case). As part of the scan of the values of column 1334-1, pruning logic 1328 of pruner 1320 generates a selection indicator 1337 identifying a set of rows in the example of FIG. 16C (the identification can also be made relative to columns in other cases) where the filter value "A" resides.

The selection indicator 1337 may include any structure suitable for identifying rows or columns (or any other data structure location) that include the values matching at least one data query filter value. In some cases, selection indicator 1337 may be implemented using one or more registers configured to store values of a bit vector. In the example of FIG. 16C, for each row value from column 1334-1 that matches the filter value ("A"), pruner 1320, including pruning logic 1328, may set a bit (e.g., to a value of "1") in a bit vector stored in one or more registers.

Pruner 1320 may be configured to provide various types of filtered output to query processor 1324 either upon conclusion of the scan or, in some cases, as the scan of the relevant data locations is ongoing. In one example, the filtered output provided to query processor 1324 includes the selection indicator 1337 generated by the pruning logic 1328 of pruner 1320. This bit vector of 1's and 0's can then be used by the query processor 1324 as a map to data satisfying the data query. Using the selection indicator, the query processor 1324 can selectively load values from only those rows of data table 1330 that satisfy the data query (e.g., City=A). In other words, the query processor 1324 may be configured to use the selection indicator provided by the pruning logic 1328 to retrieve from the memory 1322 a subset of the data table 1330 including a set of identified rows or columns of the data table where the at least one filter value (e.g., "A") resides.

In another example, pruner 1320 can output to query processor 1324 a subset of the data table 1330 including at least a portion of the set of identified rows or columns of the data table where the at least one filter value resides. This subset will correspond to the "true" values represented by the selection indicator bit vector and should exclude values from rows (or columns, in some embodiments) that do not include the at least one filter value "A".

Returning to the example of FIG. 16C, data table 1330 may comprise a plurality of rows 1332 and columns 1334. In this example, data table 1330 includes ten rows (1332-1 through 1332-10) and four columns (1334-1 through 1334-4), where column 1334-1 stores City values, column 1334-2 stored Street values, column 1334-3 stores First Name (FN) values, and column 1334-4 stores Last Name (LN) values.

Data table 1330 may be configured to store any type of data accessible by a data query. For example, data tables such as data table 1330 may be used to store various types of records (e.g., customer records, purchase order records, biographical information, or any type of information representative of entity characteristics). In the example of FIG. 16C, the objective of the filtering operation associated with the data query is to retrieve information from data table 1330 characteristic of individuals living in city "A."

In data table 1330, the filter column corresponds to the first column 1334-1 ("City" column). During scanning of the row values associated with column 1334-1, pruning logic 1328 compares each row value of the first column 1334-1 against the filter value "A" or a representation of filter value "A." In the example of FIG. 16C, five of the row values (i.e., 1332-1, 1332-3, 1332-5, 1332-9 and 1332-10) include values that match the filter value "A." As a result, the selection indicator bit vector will be generated to include "true" values associated with indices 1, 3, 5, 9, and 10. Other indices of the bit vector will indicate "false" results. As noted above, various outputs may be provided to query processor 1324 from pruner 1320. In some cases, the selection indicator 1337 (e.g., [1, 0, 1, 0, 1, 0, 0, 0, 1, 1] in FIG. 16C) may be provided to query processor 1324 as output. In other cases, a subset of data table 1330 may be provided to query processor 1324 as filtered output (e.g., together with or as an alternative to the selection indicator 1337). For example, as shown in FIG. 16C, a filtered data table 1336 may be generated as output. In this case, filtered data table 1336 includes values from only those rows where City=A. It should be noted that empty rows of filtered table 1336 are shown in FIG. 16C only to clarify the relationship to corresponding rows of data table 1330 and to indicate that data from rows that do not include the data query filter value is omitted from filtered table 1336. It should also be noted that the filtered table does not need to include data values from column 1334-1, as those values (i.e., "A") are implicitly represented in filtered table 1336. That is, filtered table 1336 includes values only from rows where the row values of column 1334-1 indicated City=A.

As described above, pruning logic 1328 may output to the query processor 1324 the filtered table 1336 (or values of the filtered table 1336) either after scanning of data table 1330 is complete or while scanning of data table 1330 is ongoing. For example, in the example of FIG. 16C, assuming that the scan of the filter column row values begins with the first row 1332-1, the pruning logic may set to "1" the first bit of the selection indicator and send all row values of row 1332-1 (e.g., other than the filter column row value) to the query processor 1324. In this case, the row values transferred to query processor 1324 as part of the filtered output include values, "a", "FN1", and "LN1". In some cases, these values can be transferred to the query processor before scanning the second row 1332-2, while scanning of the second (and/or subsequent rows) is ongoing, or after scanning of the data table 1330 is complete. In other cases, as described above, the pruner may output the selection indicator 1337 alone or together with filtered table 1336.

Table Filtering Based on More Than One Filter Value

Figure 16D:
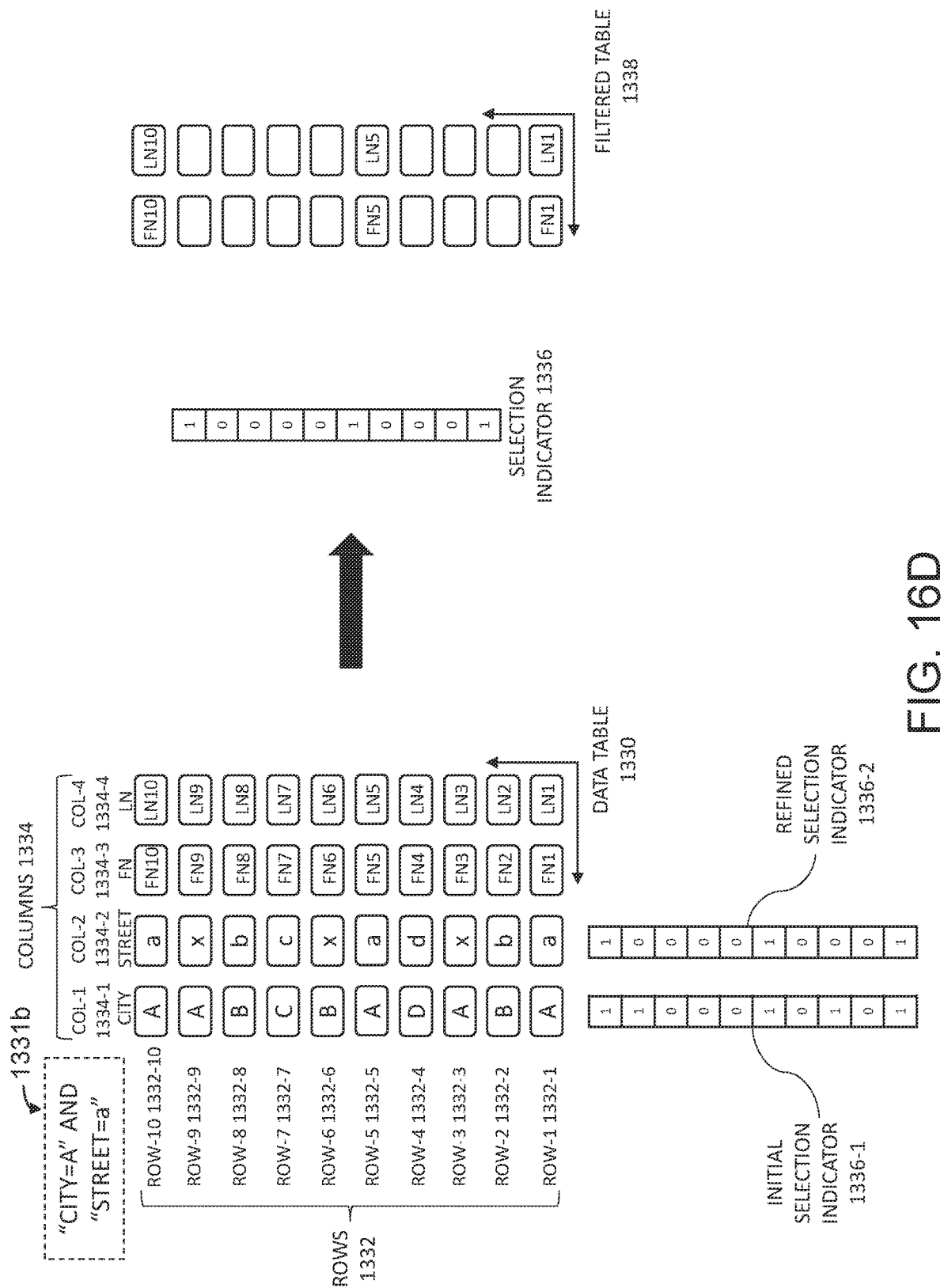
FIG. 16D is a sketch of another exemplary implementation of a table filtering operation performed by pruning logic consistent with the disclosed embodiments.

FIG. 16D provides a diagrammatic representation of one example of how pruner 1320 may assist in generating data query results in response to a data query involving more than one filter value. Similar to the example of FIG. 16C, here data table 1330 includes a plurality of rows 1332 and columns 1334. Specifically, data table 1330 in FIG. 16D includes ten rows (1332-1 through 1332-10) and four columns (1334-1 through 1334-4), where the four columns include values associated with: City (1334-1), Street (1334-2), First Name (FN) (1334-3), and Last Name (LN) (1334-4). In the example of FIG. 16D, a data query received from or generated by query processor 1324 may include two filter values 1331b, associated with a data query seeking data (e.g., first names (FNs) and last names (LNs)) associated with people living in city "A" and on street "a". Such a query may be associated with an SQL statement such as:

SELECT t.First Name, t. Last Name
FROM table as t
WHERE t.city=A AND t.street=a.
which will retrieve from a data table "t" the first names and last names of individuals living on street "a" of city "A."

As in the FIG. 16C example above, in this example, the pruner operations may include: pruning logic 1328 receiving, via interface 1326, at least one filter value from a query processor 1324. In this example, the filter values include Street=a and City=A. These filter values are used by the pruning logic 1328 to scan rows 1332 (or columns 1334 depending on the table structure) of a data table 1330 stored in a memory 1322. As a result of the scanning, pruning logic 1328 generates a selection indicator 1336 identifying a set of rows (or columns) of the data table 1330 where the at least one filter value resides. In other words, the selection indicator identifies as subset of data from table 1330 that satisfies the received filter values (i.e., City=A and street=a, in the example of FIG. 16D). As will be described in detail below, the selection indicator can be refined based on results of the scanning process and one or more refined versions of the selection indicator may be used to accelerate scanning of information in table 1330 relevant to the received filter values. Pruner 1320 can provide to the query processor 1324 a filtered output based on the selection indicator 1336. In some cases, the filtered output may include the selection indicator 1336. In other cases, a filtered subset of data from table 1330, corresponding to a refined selection indicator (e.g., 1336-2), may be provided to query processor 1324 in the form of a filtered table 1338. Filtered table 1338 may be provided to query processor 1324 either with or without selection indicator 1336.

Returning to FIG. 16D, an exemplary process for scanning data table 1330 based on the received filter values, City=A and street=a, will be described in further detail. The scanning process may begin using either of two received filter values. In one example, pruning logic 1328 may begin the scan based on the filter value of City=A. Using techniques similar to those described above relative to the FIG. 16C example, pruning logic may scan the row values 1332-1 through 1332-10 in column 1334-1, where "City" values are stored. For each row that includes a value of "A," pruning logic 1328 will set a designator of a corresponding selection indicator 1336. As noted above, the selection indicator may include any data structure configured to track scan results of pruning logic 1328. In some cases, the selection indicator includes a bit vector stored in one or more registers. In such examples, for each row value of City column 1334-1 that includes a value of "A," pruning logic 1328 will set a bit of the selection indicator to "true" or "1" (or to any other indicator of a logical match with the first filter value). As a result of the scan of City column 1334-1 based on filter value "A," pruning logic may generate an initial selection indicator 1336-1, which includes bit vector [1, 0, 1, 0, 1, 0, 0, 0, 1, 1] indicating that logical matches for values of "A" were identified in rows 1332-1, -3, -5, -9, and -10 (and conversely, that logical matches for values of "A" were not identified in rows 1332-2, -4, -6, -7, or -8).

Scanning of data table 1330 may continue based on a second filter value, street= "a." Rather than repeating the scanning process described above relative to the first filter value, City="A," however, the initial selection indicator 1336-1 may be used to expedite the second filter scan. For example, if the data query of interest seeks first and last names of individuals that live in City "A" AND live on street "a," there is no need to scan rows of data table 1330 that do not include a City value in column 1334-1 logically matching "A." Initial selection indicator 1336-1 includes this information and can be used by pruning logic 1328 to guide second (and) subsequent scans of data table 1330. For example, after generating initial selection indicator 1336-1, pruning logic 1328 needs to scan only those rows of Street column 1334-2 that also include a City value="A," as designated by bits="1" in initial selection indicator 1336-1.

Thus, rather than scanning all values of Street column 1334-2, pruning logic can rely upon initial selection indicator 1336-1 and scan only rows 1332-1, -3, -5, -9, and -10 of Street column 1334-2 to test for values of "a" at those row locations. In this particular example, reliance upon initial selection indicator 1336-1 allows pruning logic 1328 to skip over rows 1332-2, -4, -6, -7, or -8 in its scan of Street column 1334-2 looking for street values="a" (i.e., a 50% reduction in this example in the number of rows pruning logic 1328 needs to scan relative to the second filter value). In this example, scanning of rows 1332-1, -3, -5, -9, and -10 of Street column 1334-2 will result in logical matches for street value "a" in rows 1332-1, -5, and -10 only. Based on these results, a refined selection indicator 1336-2 may be generated, indicating that only rows 1332-1, -5, and -10 of data table 1330 represent individuals that both live in City "A" and reside on street "a."

The refined selection indicator 1336-2 may be output to query processor 1324. Alternatively, or additionally, pruner 1320 can output a filtered table 1338 including results of the data query. As shown in FIG. 16D, filtered table 1338 includes first name and last name values only from rows 1332-1, -5, and -10.

The use of selection indicators in the presently disclosed embodiments has the potential to significantly expedite scanning of data structures, which in turn, may result in significant reductions in time required for generating results to a data query. The degree to which data structure scanning is expedited may even increase as the complexity of the data query increases. For example, as the number of filter values associated with a data query increases, the use of selection indicators and refined selection indicators in the disclosed embodiments has the potential to greatly reduce the amount of data required to be scanned in order to return results to the data query. The particular example of FIG. 16D involved only two filter values. In some cases, however, a data query may involve 3, 10, 50, or 100+ filter values and may be made relative to a data table with potentially thousands or millions of rows and/or columns, or more. An initial scan of the data table relative to a first filter value will result in an initial selection indicator. A reduced second scan of the data table relative to a second filter value and involving only those rows identified by the initial selection indicator will result in a first refined selection indicator. A further reduced third scan of the data table relative to a third filter value and involving only those rows identified by the first refined selection indicator will result in a second refined selection indicator. A further reduced fourth scan of the data table relative to a fourth filter value and involving only those rows identified by the second refined selection indicator will result in a third refined selection indicator. A further reduced fifth scan of the data table relative to a fifth filter value and involving only those rows identified by the third refined selection indicator will result in a fourth refined selection indicator. This process can continue until all filter values associated with a particular data query have been addressed through scans of relevant locations in a data structure, such as a data table. As the example of FIG. 16D illustrates, use of a selection indicator in the presently disclosed embodiments can significantly reduce the amount of data required to be scanned relative to a second filter value. Use of refined selection indicators can further reduce the amount of data required to be scanned relative to third filter values, and so on. For data queries involving multiple filter values, it would not be unexpected for a scan made relative to an n-th filter value to involve a small fraction of the amount of data scanned relative to a first filter value. As a result, the disclosed embodiments may generate filtered data output to a data query more expeditiously than traditional techniques.

It should be noted that while the examples above refer to selection indicators implemented using bit vectors, in some embodiments, selection indicator 1336 may take a form different from a bit vector. For example, the selection indicator may be implemented using a selection bitmap, token, data structure, function, and/or dictionary, including an indicator or flag representative of data matches corresponding to at least one filter value. Each value in the data structure can indicate whether a corresponding data unit should be selected. A selection indicator can include any number of entries needed for evaluating a relevant portion of a data structure, such as data table 1330. For example, a selection indicator may include a 1×n bit vector, where n is greater than or equal to a number of rows (or columns) included in data table 1330. In other cases, a selection indicator may have a fixed length (e.g., dependent on a size of one or more associated registers), and the scanning of data table 1330 and outputting of filtered results may be performed in a step-wise fashion to work within any size constraints on the selection indicator structure size. For example, a first portion of data table 1330 can be scanned against one or multiple filter values. Initial and, where applicable, refined selection indicators may be generated, and filtered output may be provided to query processor 1324. Such a process could then be repeated for a second and, as applicable, subsequent portions of data table 1330, where the portions of data table 1330 are sized for compatibility with any size constraints on, e.g., registers used to implement selection indicators associated with a particular data query.

Returning to the example of FIG. 16D, pruner 1320 may return various types of filtered output based on the generated selection indicators/refined selection indicators. In some cases, a selection indicator 1336 may be provided (e.g., to query processor 1324) as a filtered output. The selection indicator 1336 may include an initial selection indicator or a refined selection indicator, as shown in FIG. 16D. Query processor 1324, or any other processor, may use the selection indicator output by pruner 1320 to retrieve from memory 1322, for example, data values indicated by the selection indicator received from pruner 1320. For example, in the example of FIG. 16D, the data values retrieved based on selection indicator 1336 output from pruner 1320 would include just the first and last name values located in rows 1332-1, -5, and -10 of data table 1330.

Alternatively or additionally, pruner 1320 can stream filtered data output during or after completion of its scanning operations. For example, during or after an N-th scan of a data structure in response to a data query involving N filter values, pruner 1320 can stream filtered data output results to query processor 1324.

The filtered output may include a subset of the data table including at least a portion of the set of identified rows or columns of the data table where the at least one filter value resides. The subset of the data table may exclude rows or columns that do not include the at least one filter value. The subset of the data table returned as filtered output may also exclude the filter values themselves, as those values are implied as associated with the returned results, as only values from rows (or columns) including logical matches to the filter values are returned by the pruner 1320 as filtered output.

In some embodiments, one or more selection indicators generated relative to a particular data query may be stored for later use. In the example of FIG. 16D, the initial selection indicator 1336-1 and/or refined selection indicator 1336-2 (which may or may not be output from the pruner 1320 as part of the filtered results) could be stored (e.g., in memory 1322 or any other storage unit). These stored selection indicators may be leveraged to even more expeditiously generate filtered search results in response to data queries that involve filter values used in previous scans of a data table. Such leveraging may be used in cases where the source data (e.g., data table 1330 of FIG. 16D) has not been updated between a first data query and a subsequent data query or where updates to the data source between data queries are tracked or known. Subsequent scans of columns (or rows) of data involving updated data values can leverage stored selection indicators (e.g., initial selection indicator 1336-1 of FIG. 16D) in performing updated scans to account for new data. For example, if only row value 1332-4 was changed subsequent to a scan of City column 1334-1 relative to filter value "A," then in response to a subsequent data query involving City="A," pruner 1320 could start with a previously stored initial selection indicator 1336-1. Pruner 1320 would have to scan only the updated value of row 1332-4 to test for a value of "A." Based on the results of that test, pruner 1320 could store an updated version of initial selection indicator 1336-1 (i.e., City="A" results) and use that updated version to complete the data query. Pruner 1320 would not need to repeat the entire scan of City column 1334-1 in response to a data query involving a previously encountered filter value of "A."

To further illustrate this principle, as part of the data query represented by FIG. 16D, pruner 1320 may store initial selection indicator 1336-1 (indicating logical matches to filter value City="A") and/or refined selection indicator 1336-2 (indicating logical matches to filter value City="A" and filter value street="a"). In response to a subsequent data query requesting the last names of individuals that live in City "A" that have the first name "Carl,":

SELECT t.Last Name
FROM table as t
WHERE t.city=A AND t.First Name=Carl

Pruner 1320 does not need to repeat a scan of City column 1334-1 to identify rows including the value "A." That information is already found in initial selection indicator 1336-1. Thus, to complete the data query, pruner 1320 could rely upon a previously stored initial selection indicator 1336-1 to scan only rows 1332-1, -3, -5, -9, and -10 of First Name column 1334-3 relative to the filter value "Carl." If FN5 was the only "Carl" identified in rows 1332-1, -3, -5, -9, and -10, then pruner would return LN5 as the filtered output. Optionally, a refined selection indicator associated with the data query City="A" and FN="Carl" (e.g., [0, 0, 0, 0, 1, 0, 0, 0, 0, 0]) could be stored for future use.

In yet another example, a data query subsequent to the example of FIG. 16D may request just the last names of individuals living in City="A" on street="a."

SELECT t.Last Name
FROM table as t
WHERE t.city=A AND t.street=a.

In response to a subsequent data query requesting the last names of individuals that live in City "A" on street "a," pruner 1320 does not need to repeat a scan of City column 1334-1 or of Street column 1334-2 to identify rows including the value "A" and "a." That information is already found in refined selection indicator 1336-2. Thus, to complete the data query, pruner 1320 could rely upon a previously stored, refined selection indicator 1336-2 to immediately output the requested information, i.e., LN1, LN5, and LN10 as informed by refined selection indicator 1336-2 ([1, 0, 0, 0, 1, 0, 0, 0, 0, 1]).

In addition to the examples above, stored selection indicators can also be used in combination, where applicable, to complete subsequent data queries involving combinations of previous searched filter values. For example, pruner 1320 may be configured to logically combine two or more previously stored selection indicators (e.g., using AND or OR functions) to generated filtered output 1338 or to generate a new refined selection indicator for use in completing a newly received data query.

In some embodiments, pruning logic 1328 may be configured to scan rows 1332 or columns 1334 of a data table 1330 in parallel, wherein each row or column is scanned using a respective filter value. As a result, pruning logic 1328 may generate selection indicators in parallel, identifying a set of rows (or columns) of a data table where the relevant filter values reside. In the example of FIG. 16D, the first 1334-1 and the second 1334-2 columns of data table 1330 may be scanned in parallel using filter values "A" and "a," respectively. For each scan a specific selection indicator may be generated, the scanning of the first 1334-1 column may result in the generation of a first specific bit vector (e.g., bit vector 1336-1), and scanning of the second column 1334-2 may result in the generation of a second specific bit vector (e.g., a bit vector indicative of rows including value "a"; which in this example is equivalent to bit vector 1336-2).

Pruning logic 1328 may be configured to combine selection indicators generated for each row (or column) scanned in parallel, to generate a final selection indicator identifying a set of rows or columns of the data table where the filter values of a particular data query reside. For instance, in FIG. 16D example, pruning logic 1328 may combine bit vectors 1336-1 and 1336-2 to generate a final bit vector (which in this case would result in a final selection indicator equivalent to selection indicator 1336 of FIG. 16D). The combination of the first and second bit vectors can be performed using an "AND" operator implemented, e.g., by pruning logic 1328.

In some embodiments, pruning logic 1328 may be further configured to perform a post-processing operation on the filtered output. Examples of post-processing-operations may include at least one of reformat, compress, handle, save, or structure the selected data.

Figure 17:
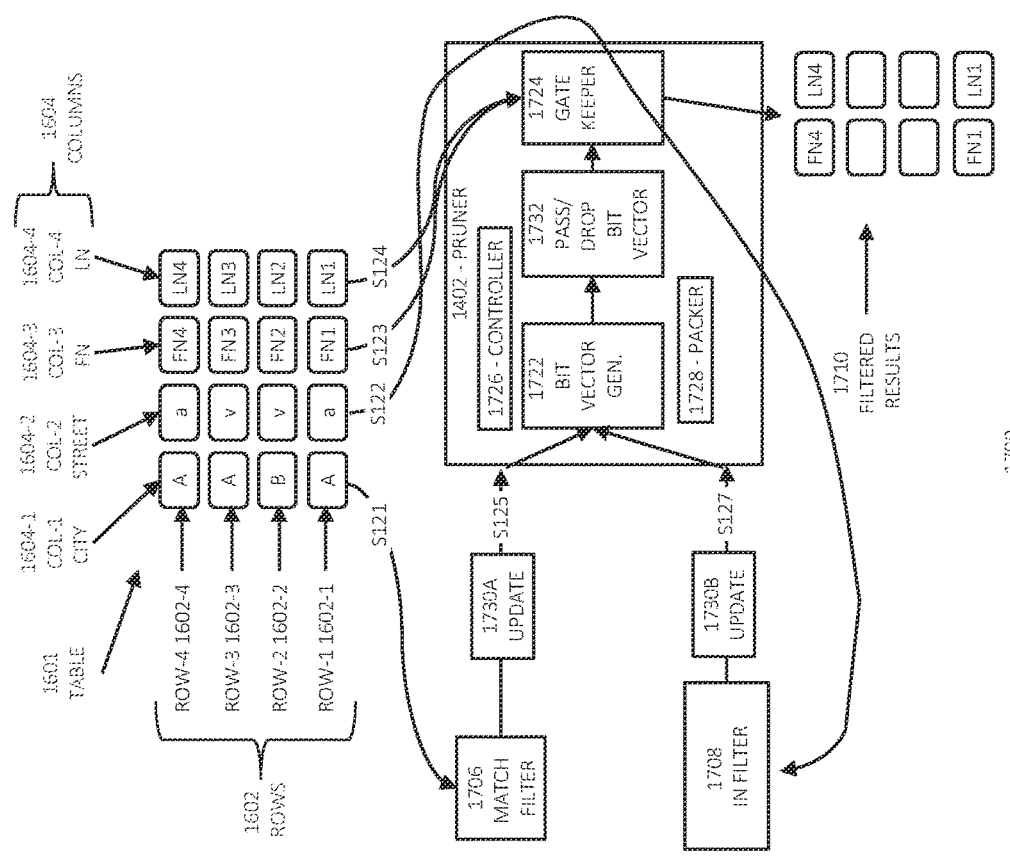
FIG. 17 an example of an exemplary implementation of a Pruner-based selector.

The sections below provide further examples and details regarding operation of the disclosed pruner. For example, FIG. 17 provides another example of an exemplary implementation of a Pruner-based selector. A feature of the Pruner-based selector 1700 is working on columns and initial handling of the predicates followed by processing (consuming, filtering) table data. The processing may be done in multiple steps, as described in the current description. Another feature of the Pruner-based selector is multi-pass processing, including multiple updates to a bit vector, followed by consuming (filtering) the table data. This implementation is not limiting and based on this description one skilled in the art will be able to implement combined and/or parallel steps, as appropriate. In some embodiments, Pruner-based selector may include a Pruner module 1402 that includes several sub-modules, such as a Pruner bit vector generation module 1722 that builds a pass/drop bit vector 1732, a gatekeeper module 1724, a Pruner controller 1726, and a Pruner packer 1728. In the context of this document the pass/drop bit vector 1732 is also referred to as the "bit vector" 1732. The Pruner module 1402 outputs filtered results 1710, comparable to the filtered results 1610.

Note, for clarity in the current figure, flows such as S121 and S122 are shown communicating table data to the acceleration elements, in this case filters (1706, 1708). However, as described below, for example in reference to FIG. 18, all input data may be processed via the selector module 1102 and selection processor 1823 where the gatekeeper 1724 can prune incoming data. Thus, the amount of incoming data is reduced prior to being processed by one of the acceleration elements, in this case filters such as 1706, 1708. In each step a single column, or group of columns is scanned and may be processed as follows:

1. Predicate columns are scanned. Optionally, columns can be scanned in parallel, and each column can be scanned by a filter for the respective column. For example, a match-filter 1706 (similar to the match filter 1606) scans (first input data step S121) column-1 1604-1 for "City". Output results of the filters include a bit vector update 1730 (in this case, match-filter output update 1730A) are sent S125 to the Pruner module 1402.

2. Based on the existence of a predicate (in the current exemplary case City A), the Pruner bit vector generation module 1722 builds the pass/drop bit vector 1732. Optionally, the pass/drop bit vector 1732 can be built in parallel from the combined results of the filters (1706, 1708). In general, the bit vector can be generated from any logical operation on one or more "child" bit vectors, where each child bit vector is generated by a different filter.

3. The method repeats, in the current example, with a second pass of the multi-pass process, using the bit vector 1732 to process incoming data column-2 1604-2 via flow S122 to reduce the amount of data sent to a second filter, in this case the IN-filter 1708 (similar to the IN-filter 1608). The IN-filter 1708 scans the reduced (pruned) column-2 1604-2 for included (IN) Street names and outputs a bit vector update 1730 (in this case, IN-filter output update 1730B) sent S127 to the Pruner module 1402.

4. Based on the existence of a predicate (in the current exemplary case Street IN group {a, b, c, d}), the Pruner bit vector generation module builds an updated pass/drop bit vector 1732. Optionally, the pass/drop bit vector 1732 can be built in parallel from the combined results of the filters (1706, 1708).

5. As there is no more filtering to do, in the current example, columns 1604 of data (in the current exemplary case Col-3 1604-3 and Col-4 1604-4), from the table 1601 may be consumed (consumed data steps S123, S124) in parallel, by the Pruner module 1402 where the gatekeeper module 1724 uses the pass/drop bit vector 1732 to allow predicate selected data from the table to pass, while dropping non-matching column data. The passed data is output from the Pruner module 1402 as the filtered results 1710.

6. Optional post-processing may be used to reformat, compress, and otherwise handle and structure the resulting data as per application requirements (not shown in the figures).

Note, the current exemplary selector method is not limiting. In particular, for simplicity and clarity only one column is filtered by each of one filter (col-1 by the match-filter 1706 and col-2 by the IN-filter 1708) and the remaining two columns (col-3 and col-4) are then consumed to select and drop data for the filtered results 1710. The first predicate is other than the second predicate. Based on this description, one skilled in the art will be able to implement additional queries using and/or reusing multiple columns. For example, in an alternative embodiment, doing a match-filter on more than one column, such as col-1 and col-2. In another alternative embodiment outputting a column that is also used as a filter, such as col-1 with col-3, and col-4. In another alternative embodiment predicates may include other predicates that have or have not already been used.

Also note that the flow in the current figure is for clarity, and details of the configuration and interaction of elements of the Pruner selector are described in more detail, below.

Figure 18:
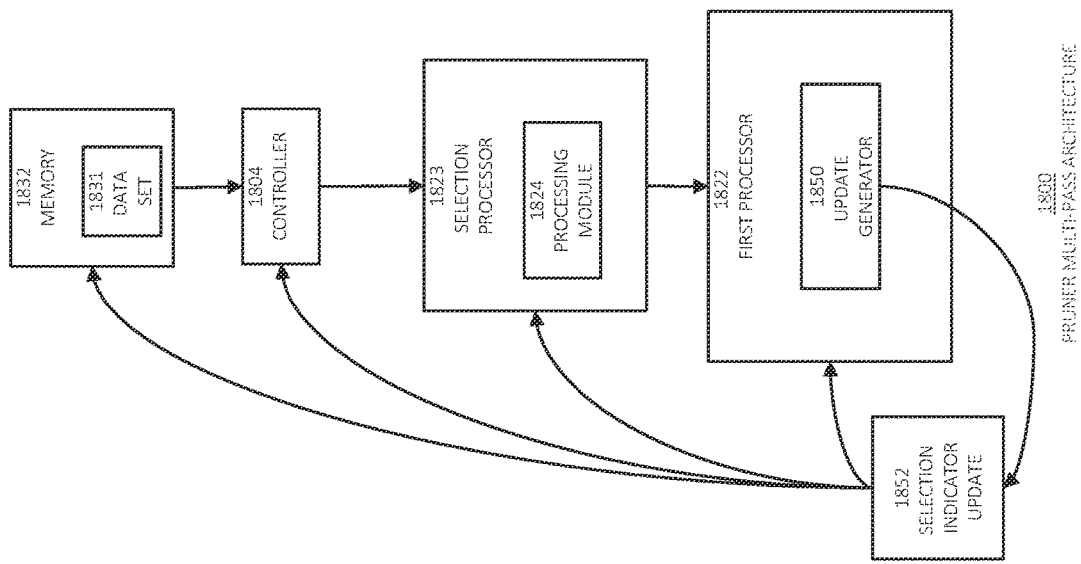
FIG. 18 is a flowchart of a Pruner multi-pass architecture.

FIG. 18 is a flowchart of the Pruner multi-pass architecture. In some embodiments Pruner multi-pass architecture 1800 may include a memory 1832 storing a data set 1831. A first subset of data from a data set 1831 may be sent, via a controller 1804 (such as a memory controller) and via a selection processor 1823 to one or more first processors 1822. For clarity in this description, a single first processor 1822 is generally described. Each of the one or more first processors 1822 may include one or more update generator modules 1850 configured for generation of a selection indicator update 1852 based on the first subset of data from the data set 1831.

The selection indicator update 1852 (such as 1730) may be fed back, to the selection processor 1823 that is configured to receive the selection indicator update 1852. In the current figure, one processing module 1824 is shown in an exemplary deployment on the selection processor 1823. These exemplary implementations are not limiting, and the selection indicator update 1852 may be fed back to alternative locations including, but not limited to the first processor 1822, one or more of the controllers 1804, and one or more of the memory modules 1832.

The processing module 1824 is configured for updating the bit vector 1732 based on the selection indicator update 1852. The selection indicator update 1852 may include an indication of how to update the current bit vector 1732, however, this is not limiting, and the selection indicator update may be an updated bit vector (in which case the processing module simply uses the selection indicator as a new/updated bit vector 1732).

The method may repeat with additional passes via the first processor 1822 and additional generations of respective additional selection indicators update 1852, based on the same or other data from the data set 1831.

In the current description, an exemplary implementation of the bit vector 1732 has been used. This implementation is not limiting, and based on this description, one skilled in the art will be able to design and implement a selection indicator update 1852, other than the exemplary bit vector 1732, to facilitate selection, such as table filtering. Without limiting the scope of the current embodiment, the bit vector selecting (filtering/consuming) selected data from a second subset of data from the data set 1831, the selecting based on the selection indicator update 1852. As described elsewhere in this document, processing the second subset for selection is not limiting, and alternative processing functions are possible.

The selection indicator update 1852 and the bit vector 1732 can alternatively be implemented using a selection bitmap, token, data structure, function, and dictionary, including an indicator or flag for selection (validity) of corresponding data (e.g., corresponding to desired predicate (s) and rows to be selected during column processing). Each value in the data structure can indicate whether a corresponding data unit should be selected. The bit vector 1732/ data structure can include a plurality of bits/flags. In one embodiment, the Pruner packer 1728 uses the selection indicator update 1852 to reduce (compress) the size of the bit vector 1732. For example, to only retain elements of the vector that indicate rows to be processed in the next pass.

Correspondingly, the Pruner controller may save mapping data to indicate to which rows each element of the bit vector correspond.

In the current description the processing module 1824 implements an exemplary selection function where consumed columns of data are pruned (filtered, data reduction) using the bit vector 1732 to select data to pass. This implementation is not limiting, and based on this description, one skilled in the art will be able to design and implement alternative functions, such as computation, manipulation (transformation of data), and so forth based on the selection indicator update 1852 and the bit vector 1732.

Figure 19:
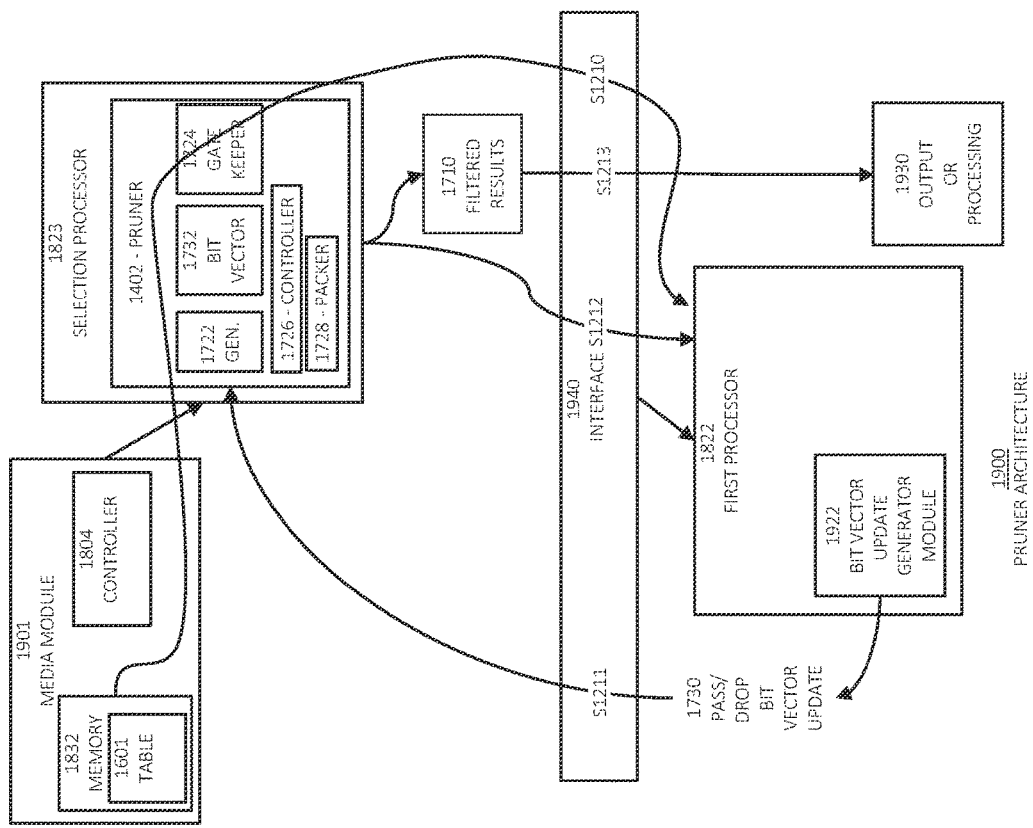
FIG. 19 is an example of a Pruner architecture.

FIG. 19 is an example of a Pruner architecture. The Pruner multi-pass architecture 1800 is shown in the current figure's exemplary implementation of the Pruner architecture 1900. In the current example, the Pruner architecture 1900 includes a media module 1901 including a memory 1832 for storing a data set 1831 such as the table 1601. The media module 1901 may be a DIMM, XDIMM™, SSD (solid state drive), computational memory or other storage media, including volatile and/or non-volatile memory components. The memory 1832 can be implemented by the storage layer 906.

Media module 1901 may have an associated controller 1804, such as a memory controller. The first subset of data from the table 1601 in the memory 1832 is sent via channel S1210 to the first processor 1822. As noted above, any or all input data may be processed via the selection processor 1823 where the gatekeeper 1724 can prune incoming data.

The selection processor 1823 may be implemented by the selector 1102. The selection processor 1823 is operationally connected, via an interface 1940 to the media module 1901 and to at least one first processor 1822. The selection processor 1823 includes the processing module 1824 that may be implemented by the Pruner module 1402. The selection processor 1823 may also include a Pruner controller 1726 and a packer ("Pruner packer", "packer core") 1728, which may be deployed as part of the Pruner module 1402. The first processor 1822 may be deployed and/or one or more first processor capabilities may be implemented in the selection processor 1823.

The interface 1940 may be implemented by the fabric 1306, connecting one or more elements, most of the elements, or preferably all of the elements for flexible communication, routing, and multi-pass communication of data.

The first processor 1822 includes/hosts the update generator 1850, shown in the current figure as being implemented by a bit vector update generator module 1922. The first processor may be implemented by any one or more of the acceleration unit 1100 elements, such as the filter and project module 1103, join and group by module 1108, etc. Thus, each acceleration unit element is associated with an update generator 1850 that may be implemented as the bit vector update generator module 1922. Each of the bit vector update generator modules 1922 may be sub-modules respectively of each of the accelerator elements, configured to generate a bit vector update based on the processing of the associated element. The first processor 1822 does an initial processing of the data, and based on the processing, the bit vector update generation module 1922 outputs via channel S1211 the bit vector update 1730. Note that in this example the data is being processed for the first time, the bit vector update 1730 is/represents an initial bit vector.

The bit vector update generation module 1922 generates the selection indicator update 1852, such as the bit vector update 1730 that may be sent to the selection processor 1823. The bit vector update 1730 is sent via feed-back channel S1211 to one or more processing modules 1824 on one or more components, such as the Pruner 1402 on the selector module 1102.

In the selection processor 1823 the processing module 1824 in this case the Pruner module 1402 is configured to receive the bit vector update 1730. As described elsewhere in this document, the selection indicator/bit vector update 1730 is used by the Pruner bit vector generation module 1722 to build/update the bit vector 1732. The gatekeeper 1724 is configured for selecting (consuming) selected data from a second subset of data from the table 1601 based on the bit vector 1732. The selected data is output from the gatekeeper 1724 via channel S1212 to the same or another of the first processors 1822. Alternatively, a second subset of data from the table 1601 may be input via channel S1210 to the first processor 1822 for generating the next update of the bit vector. As noted above, the second subset (and potentially all subsets) may be sent via channel S1210 for processing and data reduction (pruning) by the selection processor 1823 and the gatekeeper 1724, and then the reduced data is sent to the first processor 1822 for filtering by one or more acceleration elements.

The final bit vector 1732 may be used by the gatekeeper 1724 to generate the filtered results 1710, output via channel S1213. Optionally the filtered results 1710 are sent for further processing 1930.

The selection processor 1823 may be physically close to the memory 1832, as compared to the first processor 1822. One skilled in the art will realize that elements such as the memory 1832 can be implemented as one or more modules, in a variety of configurations, and the use of the singular in this description is for clarity in this description and is not limiting. A controller may be implemented as a single module or two or more modules with corresponding functionality consolidated or distributed in the selection processor 1823, as part of the controller 1804, in another location in the media module 1901, in the first processor 1822, and similar.

The local selection processor 1823 may be relatively less powerful as compared to the first processor 1822. For example, the selector module 1102 may implement a subset of functions, and/or simple functions, as compared to the first processor 1822. As such, the first processor 1822 may be better suited than the selection processor 1823 for intense, complex, and/or "heavy" calculations, while the selector module can implement a relatively lightweight and fast (line speed) consumption and output of desired data.

A feature of the Pruner architecture (1800, 1900) is multi-pass generation and processing. Data (data set 1831) is used to generate (update generator 1850) a selection indicator update 1852 which is then used for processing (processing module 1824). The architecture is particularly useful for using the first processor 1822 for implementing a more intensive processing task computing (an update for) the selection indicator update 1852, while using a resource closer to the memory 1832/data set 1831, for example the selection processor 1823 for implementing a relatively less intense processing task of the processing module 1824/the gate keeper 1724 to perform fast selection from the memory 1832 to produce the filtered results 1710.

Exemplary implementations may include:

The data set 1831 is on a computational memory (the memory 1832), the processing module 1824 is deployed on the same substrate with the computational memory, and the selected data 1710 is output from the computational memory.

The data set 1831 is on a DDR4 (volatile storage RAM) 1832 and the processing module 1824 is deployed on an interface or controller.

The data set 1831 is on a non-volatile storage (disk, SSD) 1832 and the processing module 1824 is implemented on a processor in the storage.

The data set 1831 is on a non-volatile storage (disk, SSD) 1832 and the processing module 1824 is implemented on an interface or controller.

The data set 1831 is in a memory 1832 on a host and the processing module 1824 is implemented on an interface or controller.

Figure 20:
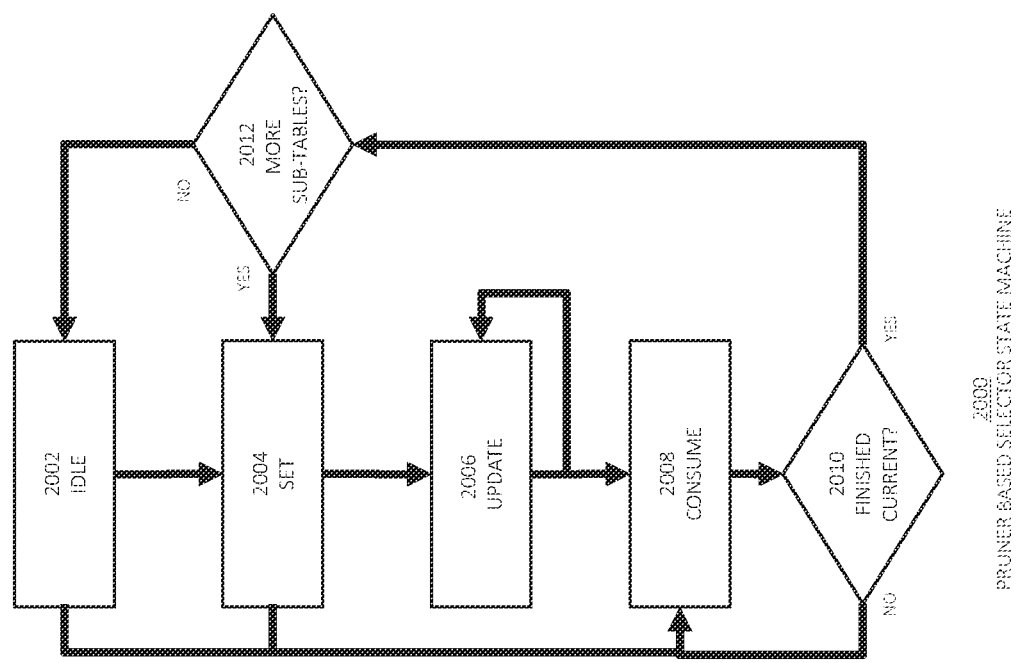
FIG. 20 is an example of transitions between states.

FIG. 20 is an example of transitions between states. A Pruner based exemplary selector state machine 2000 includes an idle state 2002, a set state 2004, an update state 2006, and a consume state 2008. The "states" are also referred to in the context of this document as "steps". The state machine 2000 is an exemplary method of implementing selection.

In the Pruner based state machine 2000, the Pruner bit vector (the pass/drop bit vector 1732) build may be split into two steps: A single "set step" or "set state", followed by optionally one or more "update steps" or "update states". Once the build of the bit vector 1732 is done, the Pruner module 1402 is ready to filter the consumed columns.

From the idle state 2002, the state machine 2000 can transition to the set state 2004 to begin building a bit vector 1732. If a bit vector 1732 has already been built, then when data is ready to be filtered the idle state 2002 can transition to the consume state 2008.

The set state 2004 does an initial setting of the bit vector 1732 based on a first predicate and column processing. In a case where there is only one predicate, building of the bit vector 1732 is now complete, and the set state 2004 may transition to the consume state 2008 to start processing data. Alternatively, (not shown in the current diagram) if there is not yet data ready to process the set state 2004 can transition to the idle state 2002. In a case where there is more than one predicate, the set state 2004 transitions to the update state 2006 to handle the remaining predicates. The remaining predicates are other than the first predicate. In the example of FIG. 17, the match-filter 1706 implements the set state 2004 processing of the first predicate City A.

In the update state 2006, for every remaining predicate the bit vector 1732 is updated based on the predicate and associated column processing. The update state 2006 repeats until all of the remaining predicates have been handled. Note, the handling of remaining predicates and updating of the bit vector 1732 is not limited to serial implementation as shown in the current figure for simplicity. Based on this description, one skilled in the art will be able to implement an update state 2006 with parallel processing of predicates. After the update state 2006 finishes building the bit vector 1732, the update state 2006 transitions to the consume state 2008. Alternatively, (not shown in the current diagram) if there is not yet data ready to process the update state 2006 can transition to the idle state 2002. In the example of FIG. 17, the IN-filter 1708 implements the update state 2006 processing of the remaining predicates, in this case the second predicate Street IN group {a, b, c, d}.

In the consume state 2008, consumed columns of data are filtered using the bit vector 1732 to select data to pass (while dropping non-matching column data). Each bit in the bit vector 1732 corresponds to a row (value) in the consumed column. As the order of the bits in the bit vector 1732 can be set identical to the order of the consume column rows (values), the bits of the bit vector 1732 can be used to select (keep, allow to pass) the corresponding row data. The consume state 2008 may stay active and/or repeat until all of the columns/data is processed, shown in the current figure as step 2010 of determining if processing of the current data is finished. In a case where the data is not yet ready for processing, or additional data is not yet ready for processing, the consume state 2008 may transition to the idle state 2002 (not shown in the current figure).

The transition from the consume state 2008 to the set state 2004 enables pruning of large tables. The bit vector size may be a limited number of bits, and in particular the number of bits in the vector size may be smaller than the number of tables rows. In a non-limiting example, if the bit vector 1732 used is 2K bits, and the table 1601 has millions of rows, then the table 1601 can be broken into multiple sub-tables, each sub table being 2K rows. These sub tables can also be thought of as "raw chunks" or "row chunks" of data. In this case, the pruning process can be done in "bit vector size" table chunks (that is, portions of a table, sub-portions, sub-tables). When the processing of a chunk (a sub-portion of the table) is completed (finished current block 2010 is "yes"), yet the table processing is not done (additional portions of the table remain that have not yet been pruned, more sub-tables block 2012 is "yes"), the state machine transitions from the consume state 2008 to the set state 2004 to build a next bit vector and continue pruning the additional portions of the table. This repetition of looping through states (the set state 2004 to the updated state 2006 to the consume state 2008) can continue and be repeated until the whole table processing is completed (more sub-tables block 2012 is "no"). Once processing of all desired portions of the table is completed, the method returns to wait for a next filtering task, with the state machine transitioning from the consume state 2008 to the idle state 2002 (via the blocks 2010 and 2012).

In the example of FIG. 17, the Pruner module 1402 implements the consume state 13308, consumes (inputs) columns of data from the table 1601, and processes (filters) the column data in the gatekeeper module 1724.

FIG. 21 is a representation of the Pruner deployed in the hardware layer. As shown, hardware layer 1402 may include pruner 1402.

FIG. 22 is a representation of the Pruner deployed in the selector module. As shown, selector module 1102 may include pruner 1402.

FIG. 23 is a representation of Pruner components. As shown, pruner 1402 may include bit vector generator 1722, pass/drop bit vector 1732, and gate keeper 1724.

FIG. 24 is a representation of Pruner components deployed on the selection processor. As shown, selection processor 1823 may include pruner 1402. Further, as shown, pruner 1402 may include bit vector generator 1722, bit vector 1732, gate keeper 1724, controller 1726, and packer 1728.

In the current description an exemplary consume state 2008 has been used where consumed columns of data are filtered using the bit vector 1732 to select data to pass. This implementation is not limiting, and based on this description, one skilled in the art will be able to design and implement a consume state to implement alternative functions, such as computation, manipulation (transformation of data), as so forth.

Query Planner

Various types of databases may be used for organizing stored data, and various interfaces may be employed for allowing a user (e.g., an end user) to access data maintained in a database. Access to data stored in a database may be provided by a database management system (DBMS). Database management systems may use a database programming language, such as Structured Query Language (SQL) or other query language, to allow users to interact with one or more databases and to access to data contained within those databases. A DBMS may enable various database-related functions that allow entry, storage, organization, and/or retrieval of data or information with respect to available databases. DBMSs may employ various different structures or techniques for performing database related tasks. For example, DBMSs may include components, including query engines (QE), planners (query engine planners, QEP), and execution modules.

Most modern DBMS implementations (Oracle, IBM DB2, Microsoft SQL, Sybase, MySQL, PostgreSQL, Ingress, etc.) are relational databases. These DBMSs use database query languages that allow users to functionally express a desired result, known as a "query", "statement", or "query statement". These database query languages hide details of how the database system processes the query and accesses the data to compute results of the query. For example, in response to a high-level task or request associated with a user query, a DBMS may perform one or more operations to optimize the statements provided by the users (i.e., to convert or alter the user query into one or more different statements such that the user query can be executed (or more efficiently executed)). In many cases, a DBMS has a client side where applications or users submit their queries and a server side that executes the queries. On the server side, most enterprises employ one or more general-purpose servers.

While many DBMS implementations have been developed, certain needs remain. For example, DBMS implementations tend to be specific to the particular software and hardware components of their associated computer systems and/or to the particular structures or organization of the databases with which the DBMSs are designed to operate. Thus, significant effort in redesign or customization may be required to implement a DBMS with updated systems including new components and/or database structure modifications.

For example, as described herein, the disclosed embodiments may include innovative accelerators or acceleration techniques aimed at increasing the speed and efficiency with which data-intensive operations (e.g., data queries, among others) are performed. Methods of integrating new capabilities (such as the use of the disclosed accelerators or acceleration techniques) into legacy DBMSs, however, require a large amount of customized work. For example, redesigning a DBMS to operate with or take advantage of the capabilities of the disclosed accelerator(s) and/or acceleration techniques may require, among other things, a complete redesign and rebuild of the QE or various components of the QE just to work with and manage an accelerator module. To be used with certain accelerator modules, a QE may require significant alteration to accommodate additional "menu" choices associated with pre-set capabilities available to a QEP. Without such alteration, a QEP would be unable to push portions of a query plan to the accelerator module. In another example, a "description" including platform dependent information can be read by the query engine and used to generate a query plan using the accelerator module. In each of these examples, significant effort would be needed to alter the QE and/or write and integrate menus and/or add descriptors for every QE, QEP, and/or accelerator module associated with a particular system implementation. Solutions are needed for integrating additional and optional capabilities such as the disclosed accelerator modules and/or acceleration techniques with existing DBMSs.

Figure 25:
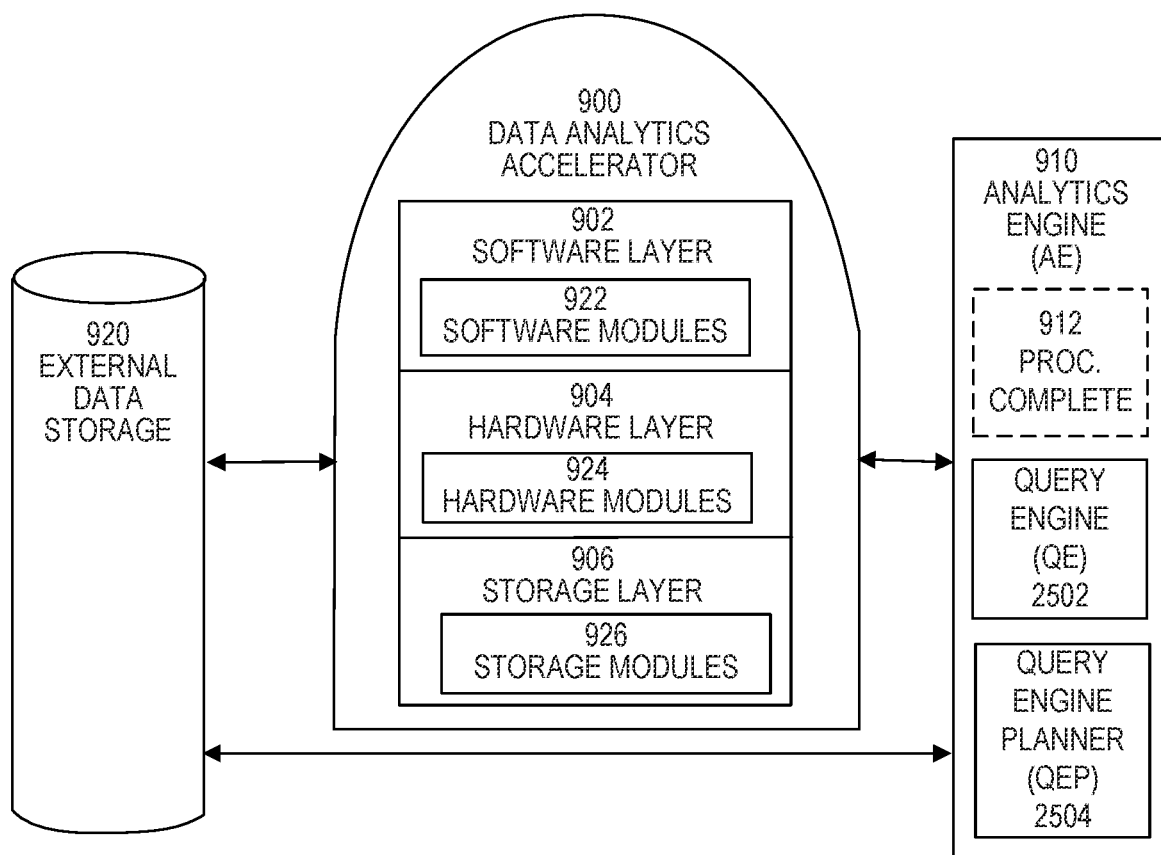
FIG. 25 is a high-level sketch of a data analytics architecture with an accelerator agnostic extension to query planning.

FIG. 25 provides a diagrammatic representation of one example of a data analytics architecture including an accelerator-agnostic extension to query planning. Acceleration, such as may be provided by the data analytics accelerator 900, can be done at least in part by employing one or more acceleration components and/or by performing one or more acceleration operations between the external data storage 920 and the analytics engine 910 (e.g., a CPU; host), optionally followed by completion processing 912. In current embodiments, query engines (QE) 2502 and query engine planners (QEP) 2504 may be implemented internal to accelerator 900, external to the accelerator 900 (e.g., on analytics engine 910), or may be implemented partial internal to and partially external to accelerator 900 (e.g., divided between accelerator 900 and analytics engine 910). The QEs and QEPs interface with the accelerator 900 via the software layer 902, including software modules 922, such as the SDK 1000 API 1004 component. Processing may include the hardware layer 904 using one or more hardware modules 924. Data can be from, and stored to, for example, locations including the external data storage 920, storage layer 906, storage modules 926, the accelerator memory 1200, and/or data on the analytics engine 910 or a general-purpose computer. One or more portions of a database may be stored using the storage layer 906. For example, the database (2640C, FIG. 27), among others, may be stored in accelerator memory 1200.

Figure 26A:
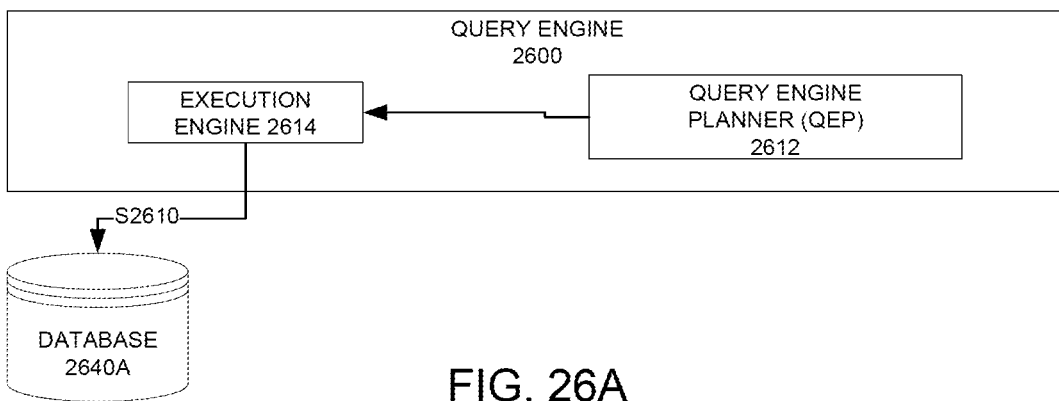
FIG. 26A is a representation of the operation of a database query engine (QE).

FIG. 26A is a diagrammatic representation of a database query engine (QE) 2600. The QE 2600 includes a query engine planner QEP 2612 to input a query from a user and generate an optimized query plan for execution by an execution engine 2614 (also known as an "execution module"). The QE 2600 communicates via an operational connection S2610 with a database (DB) 2640A. Note, in the context of this document, general references to databases use element number "2640", and specific instances (such as deployment and configuration) of the database 2640 include a suffix, such as "2640A", "2640", and "2640C".

Figure 26B:
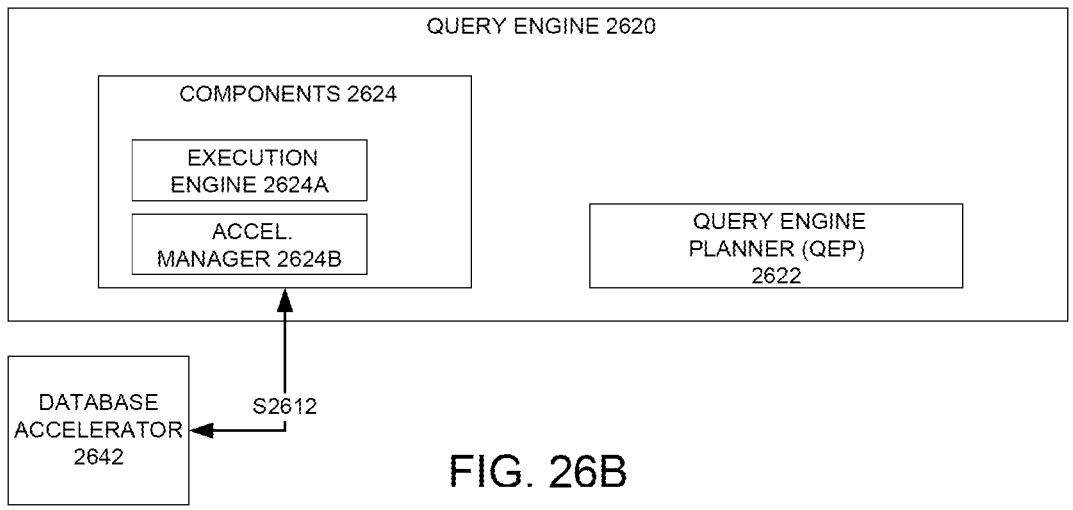
FIG. 26B is a representation of the operation of a database new query engine (QE) 2620 using a database accelerator.

FIG. 26B provides a diagrammatic representation of an example query engine (QE) 2620 for use with a database accelerator 2642. As compared with the QE 2600, the QE 2620 includes a new query engine planner (QEP) 2622 and many new components 2624 such as a new execution engine 2624A and a new accelerator manager 2624B. QEP 2622 may be modified to implement "pushdown," in which the QEP is modified to recognize the capabilities of a remote data source (such as the database accelerator 2642), extract parts of the plan that the data source can execute, and push down the extracted portion of the plan to the accelerator 2642. The new components 2624 may communicate with the database accelerator 2642 via an operational connection S2612. Such an approach may be implemented based on an existing DBMS/QE. For example, the existing system's QE could be rewritten, and new modules could be added to plan, manage, and execute using the database accelerator 2642. Such implementations would need modification of QEP 2622 to configure QEP 2622 for recognition of an operation with the capabilities offered by database accelerator 2642. Moreover, QEP 2622 would need to be rewritten or updated each time a capability is added or changed in the database accelerator 2642.

Figure 27:
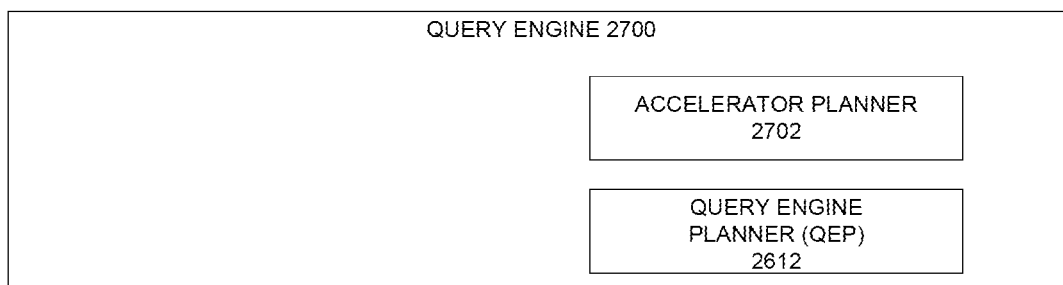
FIG. 27 is a representation of the operation of query engine and accelerator module consistent with exemplary disclosed embodiments.
Figure 27:

FIG. 27 is a diagrammatic representation of another query engine 2700 for use with an accelerator module 2740. QE 2700 may take advantage of unaltered portions of QE 2600, while minimizing impact to QE 2600. In this embodiment, the accelerator 2740 uses a database 2640C stored in one or more locations internal and/or external to the accelerator 2740. An accelerator planner 2702 (one or more accelerator planners) processes a query to generate, e.g., two sets of queries. A first set of the two sets of queries may be executed by the accelerator 2740 to generate at least one partial result. A second set of the two sets of queries may be processed by QE components, such as the QEP 2612 and database 2640A, in combination with the partial result from the accelerator 2740.

Figure 28:
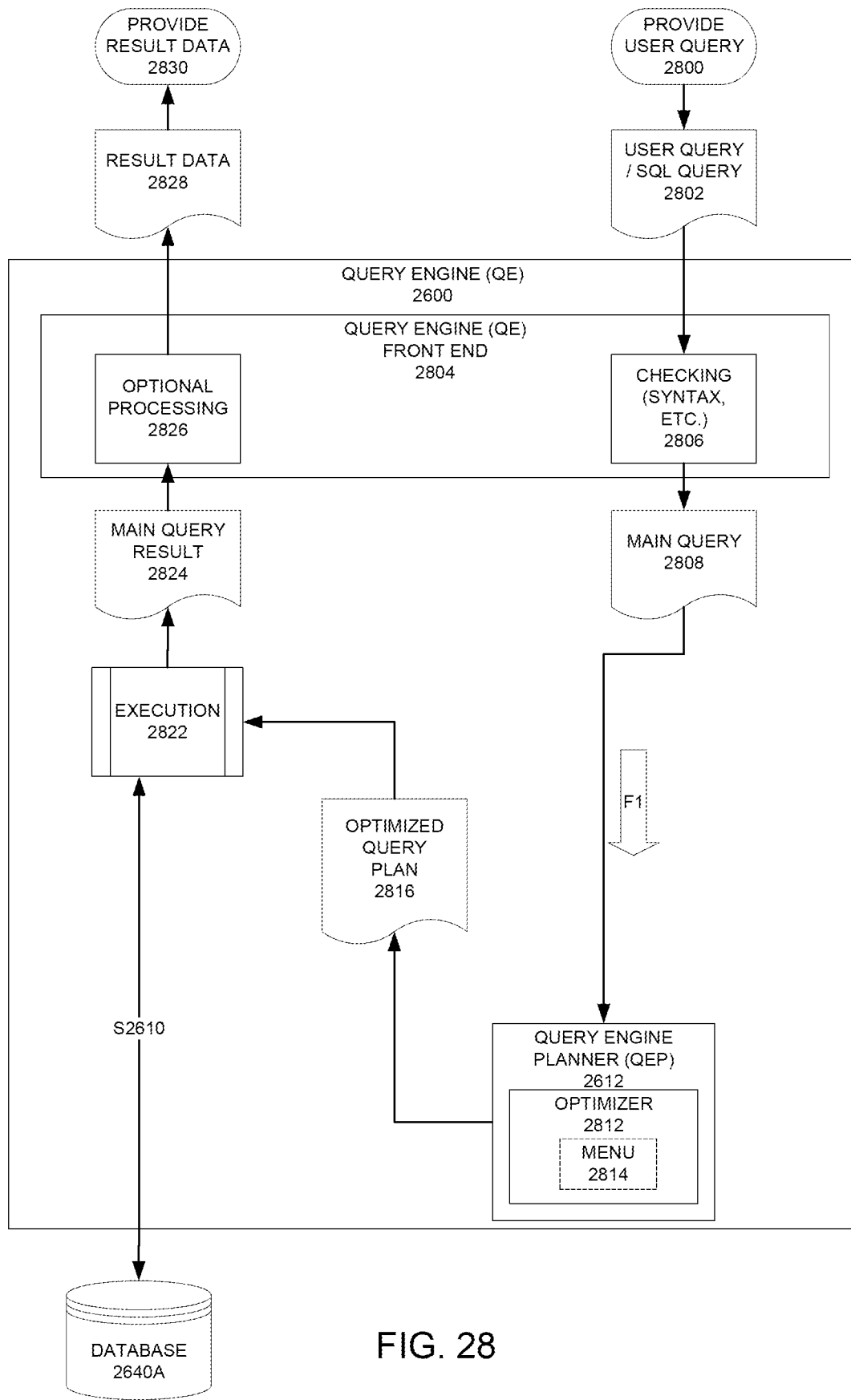
FIG. 28 is a sketch of another query engine configuration and operation.

FIG. 28 represents another query engine configuration and associated query operations. At an initial step 2800, a user provides a database query 2802. QE 2600 includes a query engine front end 2804 that performs functions such as checking 2806 (e.g., syntax checking of the input initial database query 2802) to generate a main query 2808.

The main query 2808 is processed by a first flow F1 including the QEP 2612, execution module 2822, and the database (2640, 2640A). The main query 2808 is input to a query engine planner QEP 2612. QEP 2612 may include an optimizer 2812 to parse and structure the main query 2808. Optionally, QEP 2612 may include a "menu" 2814 of choices of pre-set capabilities of the execution module 2822 from which the QEP can choose. Based on the main query 2808, the QEP generates an optimized query plan 2816 that is input to an execution module 2822.

The execution module 2822 executes the optimized query plan 2816 using data from database 2640A via the operational connection S2610. Execution module 2822 generates a main query result 2824.

The main query result 2824 is optionally processed at step 2826 by the QE front end 2804 to generate result data 2828 that is output from the QE 2600. The result data 2828 is provided 2830 to a designated recipient.

The initial database query 2802 is provided 2800 by a user, however, this is not limiting, and the query may be provided by a source other than a user. The initial database query 2802 may be provided in a structured query language (SQL) format, but may also be provided partially, or entirely in a format other than SQL. Similarly, other queries such as the main query 2808, the first sub-query 2908, and the second sub-query 2904 may be in an SQL format, other formats, and/or custom formats.

The query engine front end 2804 interfaces between components external to the QE 2600 (e.g., via inputs/outputs such as those associated with the initial database query 2802 and the result data 2828) and components internal to the QE 2600 (e.g., QEP 2612 and the execution module 2822).

The checking 2806 function/module can include a variety of functions to check and/or process inputs to the QE 2600. Such checking may include syntax checking, pre-processing of the query, etc. Depending on what checking and/or processing is performed, the generated main query 2808 may be the same as the initial database query 2802. In other cases, main query 2808 may be similar to or more substantially altered relative to initial database query 2802.

The menu 2814 can provide menu choices so the QEP 2612 can link into modules based on the content of the main query 2808. The menu 2814 may refer to a list of operations and capabilities provided by the execution module 2822, along with properties associated with the operations and capabilities (e.g., memory requirements, CPU requirements, networking footprints, supported datatypes, supported parallelism, distribution options, etc.). Each QEP may have an associated menu corresponding to the execution modules the QEP was built to work with.

In some embodiments, the result data 2828 is provided to a user at step 2830. However, this is not limiting. QE 2600 may provide output, such as the result data 2828 to a destination other than a user. For example, a generated result, such as result data 2828, may be provided to a computer process and/or to storage (e.g., for storing the result data 2828 in database 2640). Optional processing at step 2826 may provide result data 2828 from the QE 2804, that also contains the 2806 checking function/module that may include a variety of functions to check and/or process inputs to QE 2600.

Figure 29:
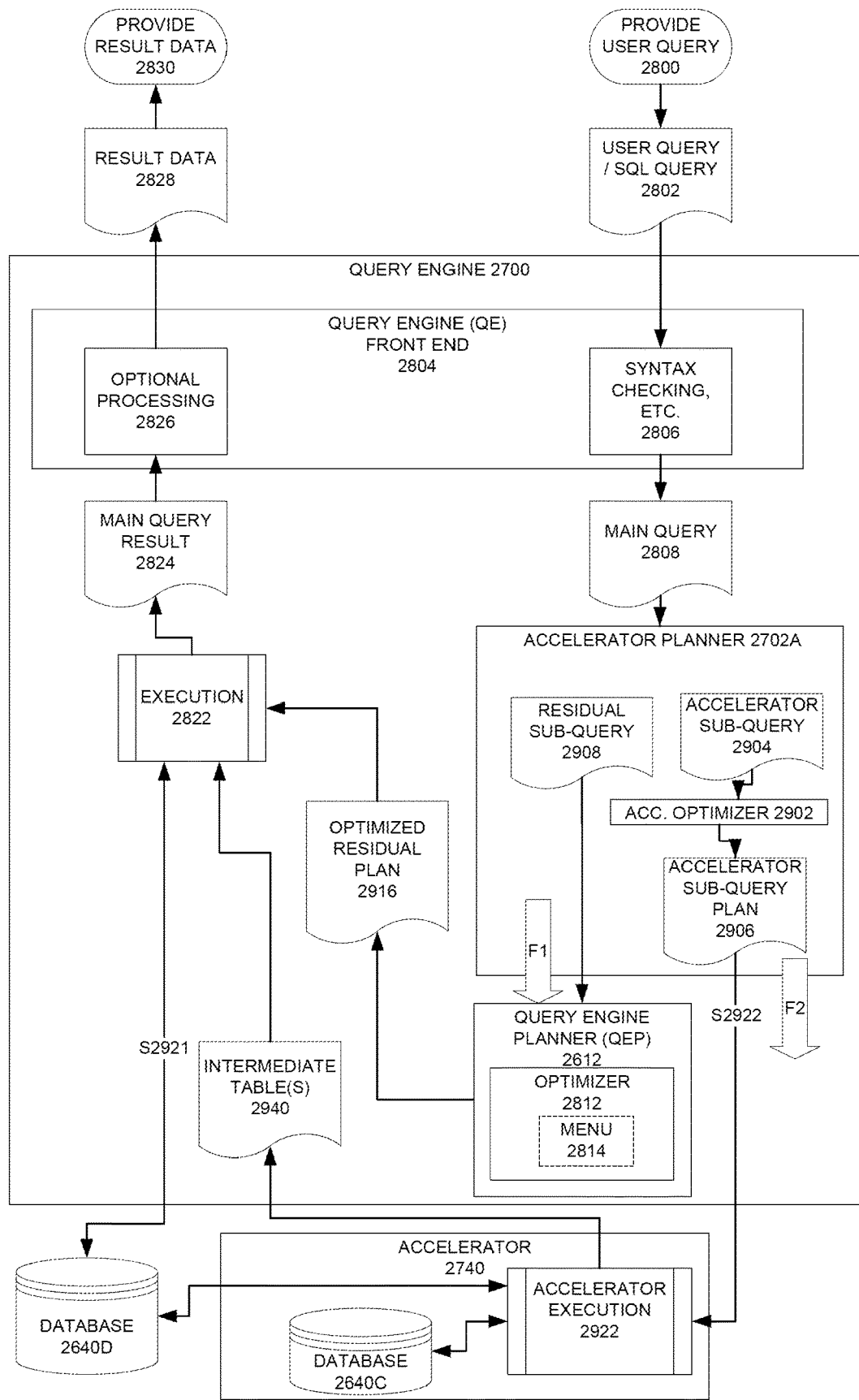
FIG. 29 is a sketch of a query engine configuration and operation consistent with exemplary disclosed embodiments.

FIG. 29 provides a diagrammatic representation of query engine 2700 and associated operations. QE 2700 includes some components, inputs, and outputs similar to QE 2600, described above. QE 2700 includes one or more accelerator planners 2702, which may incorporate "pulldown." As used herein, pulldown may occur when the accelerator planner 2702A retrieves the main query 2808. In response, the accelerator planner 2702A may determine which functions of the query may be accelerated (e.g., pulling from the query) and, in turn, which functions (the remaining functions) are not suitable for acceleration. Accelerator planner 2702A may proceed to send the remaining functions to QEP 2612.

In the FIG. 29 example, a first accelerator planner 2702A is shown. The first accelerator planner 2702A receives main query 2808 as input and generates at least one set of accelerator sub-queries 2904 and optionally at least one set of residual sub-queries 2908. The at least one set of accelerator sub-queries 2904 may be referred to as a "second sub-query 2904" or an "accelerator sub-query 2904." The at least one set of residual sub-queries 2908 may be referred to as a "first sub-query 2908" or a "residual sub-query 2908."

As a second processing path, the second sub-query 2904 may be processed by an accelerator optimizer 2902 to generate a second sub-query plan 2906 that is sent via an operational connection S2922 to the accelerator module 2740. The accelerator module 2740 includes an accelerator execution module (engine) 2922 and at least a portion of a database 2640C. Optionally, the accelerator execution module 2922 may use at least a portion of a database located external to the accelerator 2740. Based on the second sub-query plan 2906 and the database 2640C (and/or another database portion), the accelerator (execution) module 2922 generates one or more intermediate tables 2940 (e.g., partial query results). The intermediate tables 2940 may be used temporarily in an intermediate step where both accelerated and legacy (residual) processing are performed in QE 2700.

As another, first processing path, the first sub-query 2908 may be input to QEP 2612. Based on the first sub-query 2908, the QEP 2612 generates an optimized plan, in this case an optimized residual plan 2916 that is provided as input to the execution module 2822. The execution module 2822 executes the optimized residual plan 2916 using the one or more intermediate tables 2940 and database 2640 (e.g., database 2640D) via a first operational connection S2921. Based on the one or more intermediate tables 2940 and database 2640, execution module 2822 generates the main query result 2824. The database 2640 may be deployed with at least a portion of the database 2640C stored on the accelerator 2740 and at least a portion of the database 2640D at a location other than the accelerator 2740. The portion of the database 2640D at the other location may be used by the execution module 2822 for execution of the optimized residual plan 2916.

One feature of the presently disclosed embodiments is the ability to rely upon query engines dedicated for non-accelerated functions (e.g., query engines not modified and not requiring modification to provide accelerated query operations). Thus, the disclosed embodiments may incorporate query engines, such as query engines structured similar to QE 2600, with little or no modification to the components or operation of those query engines.

In the current description, the one or more accelerator planners are referred to as element 2702, and exemplary specific accelerator planners are referred to as 2702A, 27020B, etc. Based on this description, one skilled in the art will be able to implement the one or more accelerator planners 2702 as one or more modules. For example, as a single module, as two separate modules, or with one module being a sub-module to another module.

Generally, the accelerator planner (the first accelerator planner 2702A) processes the main query 2808 and determines which portions of the main query 2808 can be processed by the first flow F1, and which portions of the main query 2808 can be processed by a second flow F2. The second flow F2 includes the accelerator 2740. The first accelerator planner 2702A determines which portions of the main query 2808 can benefit by being processed other than in the first QE flow F1. This determination may be based on the capabilities of the second flow F2 (in this case the accelerator 2740) as compared to the capabilities of the first flow F1. This determination may also be based on a menu of capabilities of the accelerator execution engine 2922. Where processing of at least a portion of the main query 2808 via the second flow F2 is desired or available as an alternative to the first flow F1, those determined portions of the main query 2808 may be used to generate second sub-query 2904, and the remaining portions to be processed by the first flow F1 are used to generate first sub-query 2908.

In the current exemplary case, an accelerator module 2740 may be used to augment the capabilities of QEs. One of the exemplary capabilities, and hence benefits, of the accelerator module 2740 is increased processing speed, and hence decreased processing time, of one or more pre-defined functions (e.g., query related functions). The accelerator planner 2702 may process the main query 2808 by parsing and analyzing the functions in the query to determine if any of the main query 2808 portions/functions can be handled by the accelerator module 2740 (pre-defined functions/operations that are implemented by the accelerator module). Determined portions of the main query 2808 appropriate for acceleration are used to generate second sub-query 2904 to be processed by the second flow F2. The remaining portions of the main query 2808 are used to generate the first sub-query 2908 to be processed by the first flow F1.

Thus, accelerator planner 2702 may be configured to generate two sub-queries: the second sub-query 2904 and the first sub-query 2908. However, this implementation is not limiting, and the accelerator planner 2702 may generate a single sub-query, at least one sub-query, at least two sub-queries, three or more sub-queries, etc. For example, in a case where the main query 2808 would not benefit from acceleration (or where acceleration of a portion of main query 2808 is not possible or available), only one sub-query, in this case the first sub-query 2908, may be generated. Similarly, in a case where the entire main query 2808 can be accelerated, only one sub-query, in this case the second sub-query 2904, may be generated. In other cases, main query 2808 may include two or more portions that may be individually accelerated. In such cases, two or more accelerator sub-queries 2904 may be generated.

Similar to operation of the first accelerator planner 2702A, one or more other accelerator planners (not shown) may receive as input one or more accelerator sub-queries 2904 and output one or more second sub-query plans 2906. A number of accelerator sub-queries 2904 may be the same or different from a number of generated second sub-query plans 2906.

When the accelerator planner 2702 generates sub-queries (2908, 2904), the generation may account for the subsequent processing and (future) interaction, for example, of each of the sub-queries (2908, 2904) and resulting sub-query plans (2916, 2906), execution modules (2822, 2922), tables (2940), and databases (2640). For example, the above description of generating a single second sub-query 2904 may include generating a second sub-query 2904 that is a "null" or "pass-through" query, for the purpose of maintaining processing and operation of the unneeded flow (the first flow F1). For example, if the entire main-query 2808 can be accelerated, and only the second sub-query 2904 is generated, a null query may also be generated as the first sub-query 2908 to maintain the residual flow of the QE/components including the QEP 2612 and optimized residual plan 2916. In such cases, the execution module 2822 may output the intermediate tables 2940 as the main query 2808 result 2824. The null query may be a "pass-through" plan that has an output table that may be identical to an input table (without doing any relational operation, filtering, or transformation on the data). Thus, zero or more sets of accelerator sub-queries 2904, zero or more sets of residual sub-queries 2908, and zero or more intermediate tables 2940 may be generated.

The accelerator planner 2702 may generate a first sub-query 2908 including reference to the intermediate tables 2940. Such a reference can be used, for example, to alert any of the components included in the residual flow F1 (e.g., execution 2822) to the usage of the accelerated flow F2. For example, in some cases, the reference to the intermediate tables 2940 may trigger execution 2822 to use intermediate tables 2940.

In the context of this document, the "accelerator module 2740" is also referred to as the "accelerator 2740," which is a hardware-based device. One implementation is to use the NeuroBlade Ltd. (Tel Aviv, Israel) Xiphos™ data analytics accelerator. In an exemplary implementation, the accelerator 2740 is implemented in hardware and will be configured with at least a portion of the database 2640, shown as database 2640C that has been imported onto the accelerator 2740 hardware. In an alternative implementation, the accelerator 2740 may be implemented at least partially in software. In another alternative implementation, the accelerator may access the data storage, for example, the storage layer 906 or the database 2640.

The accelerator execution module 2922 may execute the second sub-query plan 2906 using the database 2640C to generate intermediate tables 2940. In the context of this document the "intermediate tables" 2940 are also referred to as "virtual tables" and "partial tables". The intermediate tables 2940 may be stored, for example, in a temporary memory, stored in the database 2640, and/or stored on the accelerator 2740 for future access by the execution module 2822. The intermediate tables 2940 may represent a transformation of the tables from the data source (e.g., from the database 2640C) generated by the accelerated execution of the accelerator execution module 2922 based on the determined second sub-query 2904 plan 2906. Depending on the implementation of storage of the database 2640, the first operational connection S2921 can be similar to operational connection S2811 to database 2640A. Alternatively, the first operational connection S2921 may be implemented to also communicate with at least a portion of the database 2640D, for example if the database 2640C has been loaded into the accelerator 2740.

Figure 30:
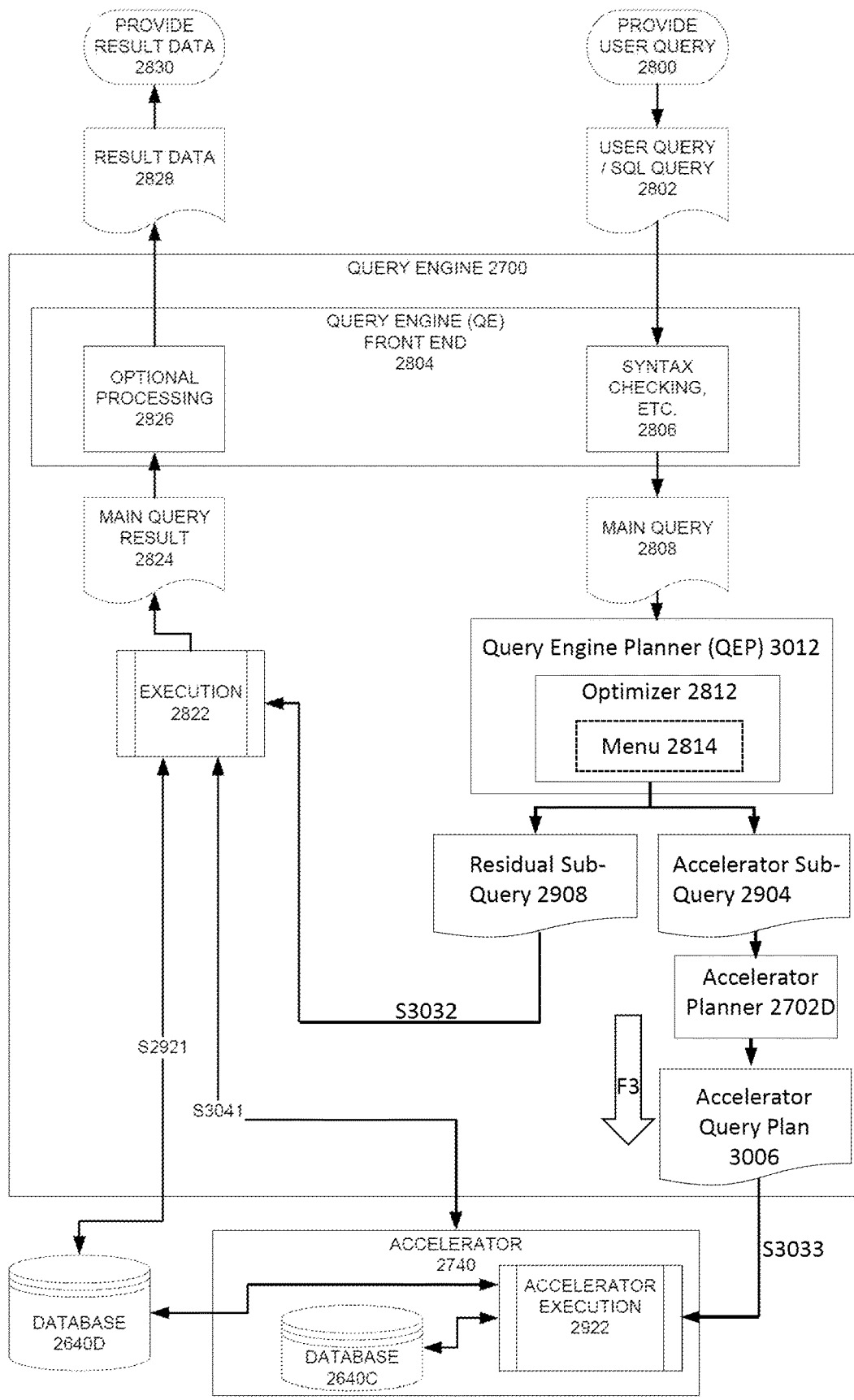
FIG. 30 is a sketch of another query engine configuration and operation consistent with exemplary disclosed embodiments.

FIG. 30 provides a diagrammatic representation of an alternative configuration of query engine 2700 and associated operations. In this example, the accelerator execution module (engine) 2922 may include or expose an API (application programming interface) for use by the accelerator planner 2702D. In this case, the accelerator planner 2702D may choose functions provided by the accelerator module API and incorporate these functions (API calls) when processing the main query 2808 to generate one or more queries. A query engine planner 3012 similar to QEP 2612 (FIG. 29) may be incorporated to assist with residual sub-query generation and planning. An optimizer module 2812 contains menu 2814, which in this embodiment, may output both a first/residual sub-query 2908 and a second/accelerator sub-query 2904. The residual sub-query may be provided to execution module 2822 (via connection S3032) for execution. The accelerator sub-query 2904 may be provided to accelerator planner 2702D, which is configured to generate an accelerator query plan 3006 based on the accelerator sub-query 2904. The accelerator query plan 3006 may be provided to accelerator execution module 2922 via connection S3033.

Within the accelerator 2740, the API calls are directed to and executed as appropriate by the accelerator module 2922. Results data is returned from the accelerator 2740 to the execution module 2822 via connection S3041. Execution 2822 may access database 2640D via connection S2921 (e.g., to execute portions of the query plan associated with first sub-query 2908). Based on the inputs received via connections S3032 and S3041, execution module 2822 may generate a main query result 2824, which may be subjected to optional processing 2826 before being output as result data 2828 at step 2830.

Figure 31:
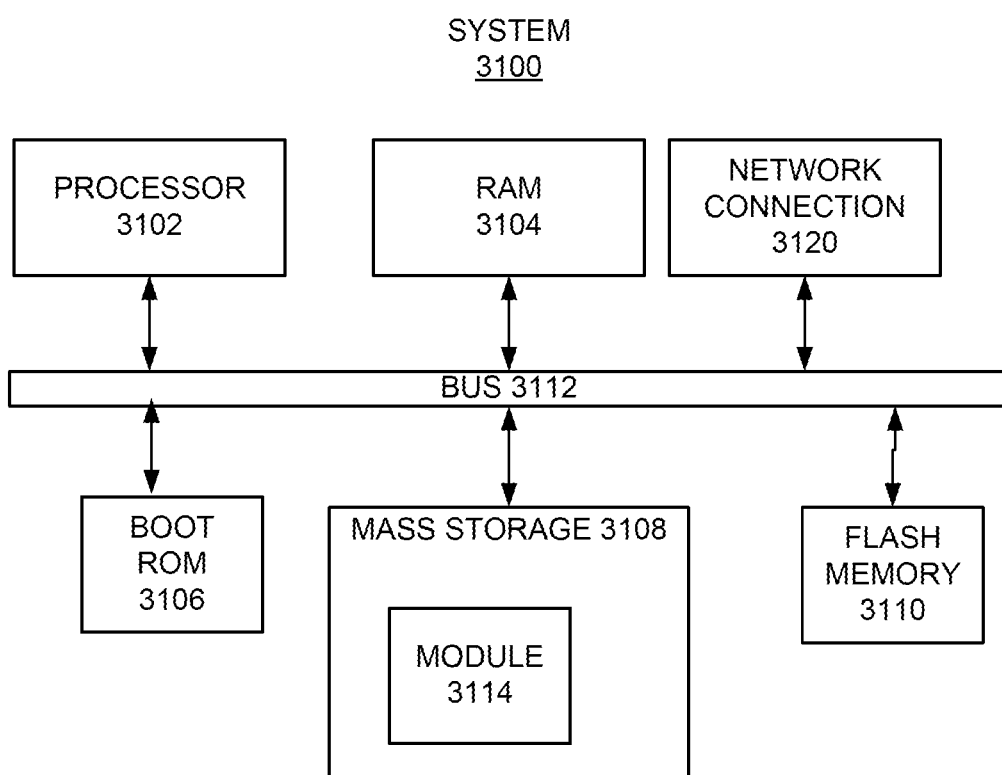
FIG. 31 is a partial block diagram of an exemplary system configured to implement an accelerator planner, consistent with exemplary disclosed embodiments.

FIG. 31 is diagrammatic representation of an exemplary system 3100 configured to implement an accelerator planner, consistent with disclosed embodiments. System (processing system) 3100 includes a processor 3102 (one or more) and four exemplary memory devices: a random-access memory (RAM) 3104, a boot read only memory (ROM) 3106, a mass storage device (hard disk) 3108, and a flash memory 3110, all communicating via a common bus 3112. Processing and memory can include any computer readable medium storing software and/or firmware and/or any hardware element(s) including but not limited to field programmable logic array (FPLA) element(s), hard-wired logic element(s), field programmable gate array (FPGA) element(s), and application-specific integrated circuit (ASIC) element(s). The processor 3102 is formed of one or more processors, for example, hardware processors, including microprocessors, for performing functions and operations detailed herein. The processors may include, for example, processors, such as those used in servers, computers, and other computerized devices. For example, the processors may include x86 Processors from AMD and Intel, Xenon® and Pentium® processors from Intel, as well as any combinations thereof. Any instruction set architecture may be used in processor 3102 including but not limited to reduced instruction set computer (RISC) architecture and/or complex instruction set computer (CISC) architecture. A module (processing module) 3114 is shown on mass storage 3108, but as will be obvious to one skilled in the art, could be located on any of the memory devices.

Mass storage device 3108 is a non-limiting example of a non-transitory computer-readable storage medium bearing computer-readable code for implementing the accelerator planner described herein. Other examples of such non-transitory computer-readable storage media include read-only memories such as CDs bearing such code.

System 3100 may have an operating system stored on the memory devices, the ROM may include boot code for the system, and the processor may be configured for executing the boot code to load the operating system to RAM 3104, executing the operating system to copy computer-readable code to RAM 3104 and execute the code.

Network connection 3120 provides communications to and from system 3100. For example, a single network connection provides one or more links, including virtual connections, to other devices on local and/or remote networks. Alternatively, system 3100 can include more than one network connection (not shown), each network connection providing one or more links to other devices and/or networks.

System 3100 can be implemented as a server or client respectively connected through a network to a client or server.

Returning to FIG. 29, additional details relating to the disclosed accelerated database management system will be provided. For example, the disclosed accelerated database management system may include at least one processor including circuitry and a memory, wherein the memory includes instructions that when executed by the circuitry cause the at least one processor to perform the functions shown in FIG. 29. For example, one or more processors associated with query engine 2700 may receive an initial database query 2802 generated by a user as an SQL query or as a query in any other suitable format. Query engine 2700, e.g., using query front end 2804 may generate a main query 2808 based on the initial database query. Main query 2808 may be the same as or different from initial query 2802. For example, syntax checking 2806 may result in one or more modifications (e.g., syntax changes) relative to initial query 2802. Main query 2808 may then be analyzed, e.g., by accelerator planner 2702A, and based on the analysis of the main query, at least a first sub-query 2908 and at least a second sub-query 2904 may be generated based on main query 2808. Second sub-query 2904 may differ from first sub-query 2908 in at least one respect.

The first and second sub-queries generated by accelerator planner 2702A may be processed along different processing paths, where each processing path is associated with a different input to execution module 2822. For example, first sub-query 2908 (e.g., a non-accelerated or residual sub-query) may be processed along a first processing path including QEP 2612 to provide an optimized residual query plan 2916 as a first input to the execution module 2822. Second sub-query 2904 (e.g., an accelerated sub-query) may be processed along a second processing path, different from the first processing path and including, e.g., accelerator 2740, to generate intermediate tables 2940, which may be provided as a second input to the execution module 2822. Based on the optimized residual plan 2916 and the intermediate tables 2940, received as first and second inputs to the execution module, the execution module 2822 may generate a main query result 2824.

Any suitable trigger may be used to alert execution module 2822 that at least one accelerator sub-query 2904 has been generated based on the main query 2808. In some cases, the receipt of one or more intermediate tables 2940 may cause execution module 2822 to output main query result 2824 based on both the optimized residual plan 2916 generated in response to the first/residual sub-query 2908 and the intermediate tables 2940 generated in response to the second/accelerator sub-query 2904. In other cases, the residual sub-query 2908 may include a reference to the second sub-query to alert the execution module, or any components along the first processing path, of the presence of a non-null second sub-query 2904. In some cases, the reference to the second sub-query may include an indication of an accelerator output to be received by the execution module as the second input.

As noted above, in generating the first and second sub-queries, a planner module, such as accelerator planner 2702A may determine whether a portion of the main query 2808 can be performed by an accelerator unit (e.g., accelerator 2740). If so, the second sub-query 2904 is referred to as an accelerator sub-query, and may be generated in order to the perform that portion of the main query using the accelerator unit. In some cases, the accelerator unit 2740 may be configured to perform one or more predetermined functions or operations (e.g., data filtering, data selection, sorting, etc.) that may benefit from acceleration. Accelerator planner 2702A may make the determination of whether a portion of the main query 2808 can be performed by an accelerator unit based on the one or more predetermined functions or operations offered by the accelerator 2740.

Additionally, accelerator planner 2702A may generate one or multiple accelerator sub-queries 2904 based on available accelerator functions and/or hardware. For example, in some cases, multiple accelerator sub-queries 2904 may be generated, where each accelerator sub-query is associated with a predetermined function to be performed by accelerator 2740. In other cases, multiple accelerator sub-queries 2904 may be generated, where each accelerator sub-query is associated with a same or different accelerator unit (e.g., where two or more accelerator units are available). Where the second sub-query 2904 includes a set of more than one sub-query, each query of the set of queries may result in generation of one or more intermediate tables 2940. In some cases, the first sub-query 2908 may include a single query that results in usage of one or more intermediate tables generated from at least one of the queries of the set of queries.

In some cases, accelerator 2740 may be configured to perform one or more predetermined database functions or database operations. Accelerator planner 2702A may further make the determination of whether a portion of the main query 2808 can be performed by an accelerator unit based on the one or more predetermined database functions or database operations offered by the accelerator 2740.

As previously noted, accelerator unit 2740 may be configured to output one or more intermediate data tables 2940, which may be provided as input to the execution module 2822. The one or more intermediate data tables may include intermediate data results generated by the at least one accelerator unit based on operations relative to data stored in an accelerator unit database. In some cases, as in the example of FIG. 29, the one or more intermediate data tables may be generated by at least one accelerator execution module 2922 associated with the at least one accelerator unit and operating on data associated with database 2640C, which may be local to accelerator 2740.

Returning to execution module 2822, a first input to the execution module may include a residual query plan 2916 based on the first sub-query 2908, and the second input to the execution module may include an output (e.g., intermediate tables 2940) from an accelerator unit 2740. A residual sub-query may include a query based at least in part on portions of the main query 2808 other than portions of the main query included in the accelerator sub-query 2904. Execution module 2822 may be configured to execute the residual plan 2916 relative to a database 2640D separate from a database 2640C associated with the acceleration unit. In some cases, execution module 2822 may be configured to execute the residual plan 2916 relative to the output from the accelerator unit. In other cases, execution module 2822 may be configured to execute the residual plan 2916 without reliance upon the output from the accelerator unit. And in still other cases, execution module 2822 may be configured to execute the residual plan 2916 relative to a database 2640D to provide a residual plan result and combine the residual plan result with the output from the accelerator unit (e.g., intermediate tables 2940) to provide the main query result 2824.

Accelerator 2740 may be implemented on any suitable platform. In some embodiments, accelerator 2740 may be implemented on or to include computational memory. Such a computational memory may include a plurality of processor subunits for executing one or more of the accelerated functions associated with accelerator 2740. The plurality of processor subunits may be disposed on a memory chip (e.g., disposed on a common substrate with a plurality of memory banks associated with the memory chip). The plurality of processor subunits may be spatially dispersed among the plurality of memory banks. In some cases, accelerator database 2640C may be stored in the computational memory of the acceleration unit.

Optionally, one or more post processing operations 2826 may be performed relative to the main query result 2824 to provide resultant data 2828 as a response to receipt of the initial database query 2802. Such processing may include, among other things, formatting, sorting, or any other suitable post process.

Inline Data Reduction

As described in the sections above, traditional architectures including a host compute (e.g., a CPU) configured to load data from a data storage unit into memory and then operate on that data can result in computational delays, especially for data/memory intensive operations. For example, certain types of operations, including data queries, may require the CPU to load large amounts of data into memory and perform many memory accesses relative to the data in order to generate a result for the operation/query. Such operations may be highly inefficient for data intensive operations, such as data queries, as loading the data and accessing the loaded data may suffer from traditional bottlenecks associated with limited network bandwidth, memory access bandwidth, memory latency, etc. This negative impact of these inefficiencies may be particularly acute in cases where a desired operation/data query implicates a large body of data (e.g., implicating may include associating, accessing, communicating, and/or operating on a body of data in a database or databases that a host processor would be required to review in order to determine a result to a particular operation/data query), but the result to the operation/query involves a relatively small amount of data from within the implicated large body of data.

An example of one such situation may arise in response to a "top" query, where a user may request the top X elements relative to a particular characteristic represented in one or more databases. In one particular example (among many), a user may request data records associated with the top ten consumer products purchasers (in dollars spent) living in Bend, Oregon. The body of data implicated by such a query may involve millions (or even billions) of records included within a database or distributed across multiple databases (e.g., consumer records stored for individuals located throughout the United States or around the world). The query, however, seeks a very small number of results (i.e., top ten consumer spenders) from among a relatively small group of individuals (i.e., consumers living in Bend, Oregon) represented in the implicated body of data.

For the host to execute this query, the entire body of implicated data would need to be loaded into memory from one or more external storage units, and the host would proceed to operate on the entire body of data to produce the requested results. The host operations may require multiple accesses to memory and multiple associated logical operations, which can be time consuming. The complexity of the process (and the potential time delays) may be compounded where the entire body of implicated data is too large to fit within the available memory. In such cases, the loading and logic operations would need to be performed in stages, and intermediate results from each stage would need to be compared in order to produce the final results.

The disclosed embodiments, at least in part, are aimed at addressing inefficiencies associated with data intensive operations performed by a traditional host processor. In some examples, discussed in further detail below, the disclosed accelerator-based embodiments may provide a coarse data filter operation, for example, in response to a user generated query. For example, a portion of a body of data implicated by a particular data query may be loaded into local memory associated with one or more accelerator units. As the portion of the body of data is received at the memory access line rate, the received portion may be scanned to identify at least some values/records from among the loaded data that do not (or cannot) satisfy the data query. Such values/records may be eliminated from intermediate, filtered data results provided from the accelerator unit(s) to a host compute. As a result, the host compute has less data to review (and in some cases, far less data than the source implicated body of data to review) to determine the final data query result. The disclosed embodiments, therefore, may significantly speed certain data query processes, e.g., where a relatively small number of records are sought from among a relatively large database, among other scenarios. In such cases, the disclosed coarse inline data filter architecture and operations may reduce the data needed to be reviewed by the host processor by 50% or more. In some cases, the amount of data needed to be reviewed may be reduced by 75%, 90%, or even more than 95%.

One source of acceleration provided by the disclosed embodiments is that, in contrast to data query processes performed by a host compute, the initial data loaded from an external data storage to the one or more acceleration units may represent a small fraction of a body of data implicated by a particular data query. In the top function example above, full records associated with each consumer need not be loaded to perform the initial coarse filtering operation. For example, in one example, the filtering process may begin with loading and scanning of a column of data representative of a residence location for each consumer. The residence column alone may be loaded into local accelerator memory and scanned for individuals that live in Bend, Oregon. Once those individuals have been identified (e.g., using the pruner-based feature and selection indicator disclosed herein), a second load of data from the data storage unit into the local accelerator memory may be limited to a single column of information representative of the total spend of the represented consumers. And, because the accelerator unit previously determined the location in the relevant database of individuals living in Bend, Oregon (as indicated by the selection indicator, for example), the entire column representative of spend amounts need not be loaded into local accelerator memory. Rather, only the spend data associated with Bend, Oregon residents would need to be loaded, which from a database that tracks consumer spending across the entire United States or around the world, may represent a tiny fraction of the total records stored in the database.

Next, the accelerator may quickly scan the refined data (e.g., at memory access line rate) and discard in one scan through the relevant data those records identified as unable to satisfy the data query. For example, as discussed in more detail below, performance of the coarse filter operation in one scan through the relevant data (e.g., at memory access line rate) may result in passage of some quantity of data that does not satisfy the data query (e.g., data associated with individuals from Bend, Oregon that fall outside of the top ten highest spending consumers in that location). The coarse filter operation, however, may eliminate large numbers of records that can be identified during the single pass through the relevant data as not satisfying the data query. For example, after ten consumers from Bend, Oregon have been identified and passed on as filtered data results, if an 11th record from a Bend, Oregon consumer indicates a total spend less than the spend associated with the ten already recorded, the 11th can be eliminated by the coarse filtering operation. By this process, only those individuals encountered later in the data scan that have total spends greater than the initial ten (or greater than a group of ten previously encountered individuals) will be passed on in the filtered data results. Note that the filtered results may include scanned data (e.g., consumer spending amounts) as well as non-scanned data (e.g., row values associated with individuals passed on or identified by the coarse filter operation).

As a result of the coarse filter operation, the host compute may be provided with a highly targeted group of data to review that may represent an orders of magnitude reduction in data to be reviewed to generate final data query results. In the Bend, Oregon example, rather than loading and reviewing an entire database representing millions or billions of records and then methodically and arduously searching through those records to locate the top ten consumers living in Bend, Oregon, the host compute may receive for review a focused data set representative of ten plus consumers from Bend, Oregon, for example, a few thousands of records. In cases where the filtered results exceed the ten requested by the data query, the host compute may need to review, compare, sort, etc. a small number of records to identify the results of the data query. In this way, the disclosed embodiments offer the potential to significantly relieve processing burden from the host compute and eliminate large sources of time delay associated with memory access times/memory bottlenecks.

In other words, a lightweight processing module (e.g., coarse, fast filtering performed by any of the disclosed accelerator units) may drastically reduce the amount of data transferred for processing by a host compute that implements heavyweight processing. As is known in the art, a lightweight process may include faster execution, fewer operations, and use fewer resources as compared to a heavyweight process. For example, a lightweight operation may be a smaller, quicker task, as compared to a heavyweight operation that takes relatively longer time to perform a larger task. A query can be distributed and executed using a multi-stage stage approach including a coarse filtering stage (e.g., involving a large data reduction performed by a first process such as the lightweight processing module)

close to an origin of the data. The approach may also include a fine operation stage (e.g., sorting and/or final data filtering) performed, e.g., as a heavyweight process performed by the host compute. The fine operation stage, by design, may involve a significantly reduced dataset, as a result of operation and coarse filtering by the lightweight processing module, and, therefore, may require less data reduction by a second process such as the heavyweight processing of the host compute. Data reduction can be done inline, that is, continuously with processing running concurrently, as each stage of the multi-stage implementation is executing.

Figure 32:
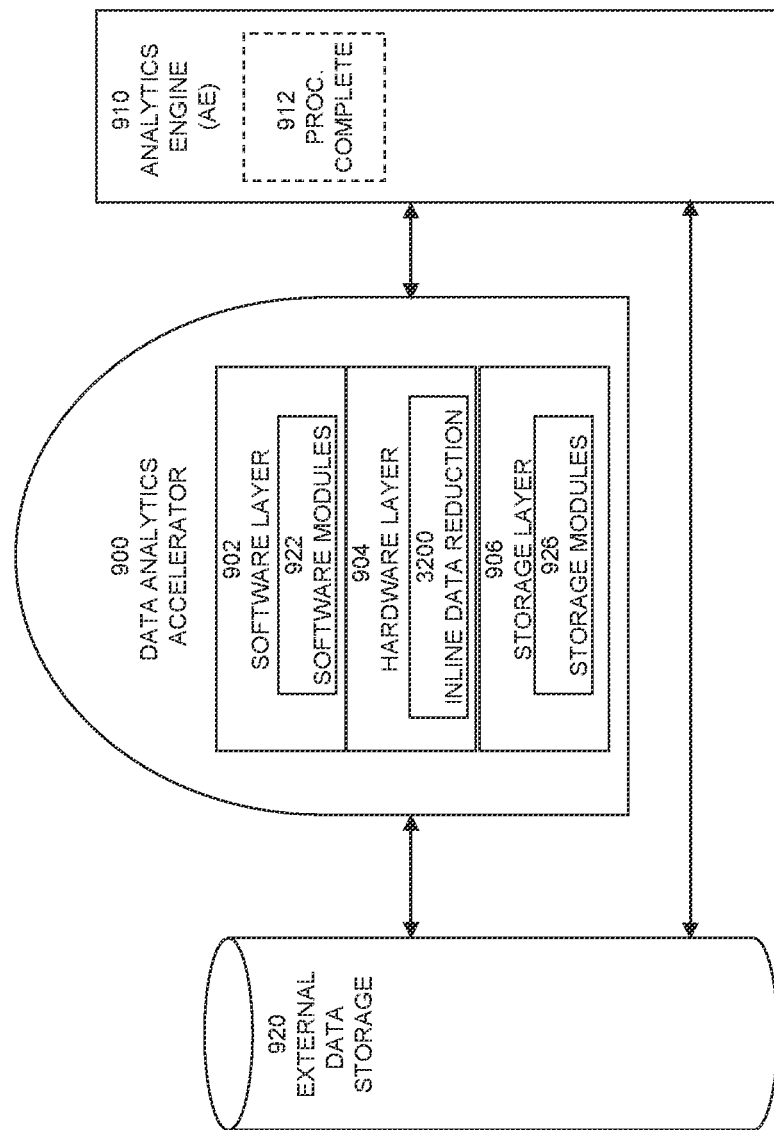
FIG. 32 provides a diagrammatic representation of a data analytics architecture configured to implement inline data reduction, according to exemplary disclosed embodiments.

FIG. 32 provides a diagrammatic representation of a data analytics architecture configured to implement inline data reduction, according to exemplary disclosed embodiments. Acceleration, performed, e.g., by the data analytics accelerator 900, can be done at least in part by applying innovative operations between the external data storage 920 and the analytics engine 910 (e.g., a CPU/host), optionally followed by completion processing 912. In current embodiments, inline data reduction 3200 may be implemented in the hardware layer 904 as one or more of the hardware modules 924. For example, an FPGA in the hardware layer 904 may be configured with one or more portions of the disclosed inline data reduction system. This configuration is not limiting, and one or more portions of the inline data reduction may be implemented using the software layer 902, software modules 922, storage layer 906, storage modules 926, and/or analytics engine 910. Data can be retrieved from and stored to various locations, including the external data storage 920, storage layer 906, storage modules 926, the accelerator memory 1200, and/or data on the analytics engine 910 or a general-purpose computer, among other locations. In a preferred implementation, data is streamed at line speed from the external storage 920 or accelerator memory 1200, through the data analytics accelerator 900 and then to the analytics engine for process completion 912.

Figure 33:
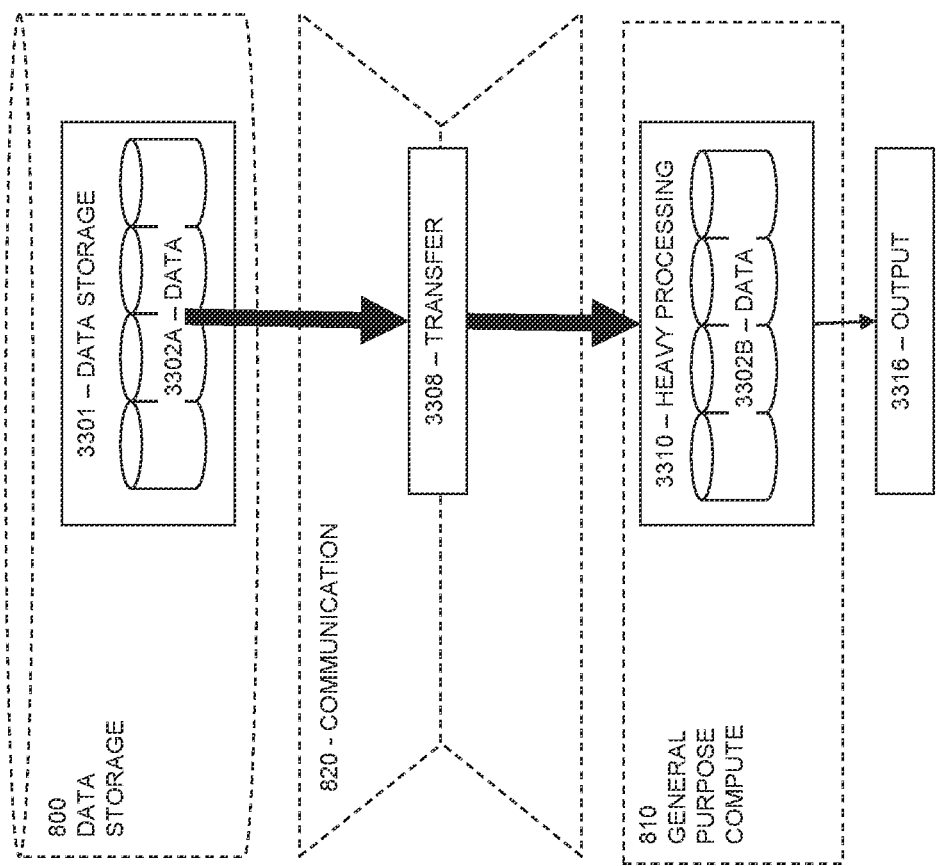
FIG. 33 represents an example approach to data processing.

FIG. 33 represents an example approach to data processing. A set of data, shown as data 3302A, from a data storage 3301 is transferred 3308 to a location where heavy processing 3310 is performed on the data 3302B to produce a desired output 3316. Such architectures transfer a large amount of data 3302 from storage to another location for processing. Note, for clarity in the current description the data 3302 element number is shown with a different suffix (3302A, 3302B) when the data is in different locations. Data storage 3301 includes data storage 800, the transfer is via a communication channel 820, and the heavy processing is implemented on the general-purpose compute 810.

Figure 34:
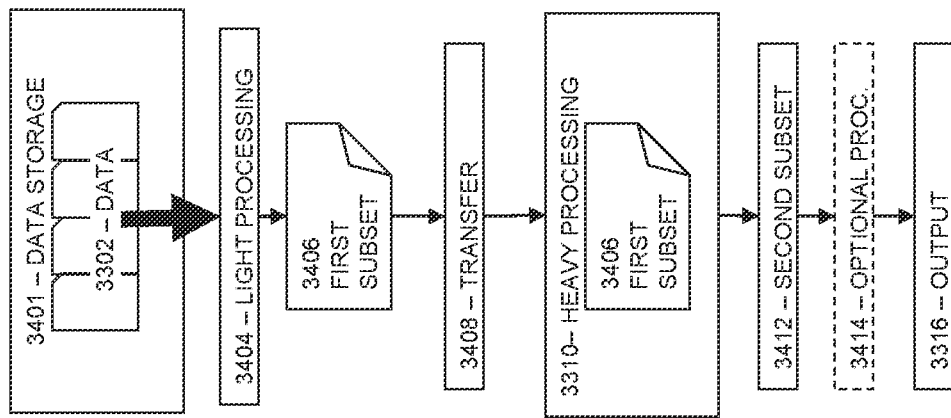
FIG. 34 provides a diagrammatic representation of an inline data reduction system and method, according to exemplary disclosed embodiments.

FIG. 34 provides a diagrammatic representation of an inline data reduction system and method, according to exemplary disclosed embodiments. In this case, and consistent with the description above, the data 3302 from a data storage 3401 is processed by a lightweight first process (shown as light processing 3404) to generate a first subset 3406 of data. Alternatively, a first set of partial results (described below, 3724) from the data 3302 may be processed to generate the first subset 3406. The first subset 3406 is transferred 3408 to a location where a heavyweight second process (shown as heavy processing 3310) processes the first subset 3406 to generate a second subset 3412 of data, the second subset 3412 based on particular criteria. The second subset 3412 may be the same as the first subset 3406 (e.g., where processing 3310 does not result in further data reduction) or different from the first subset 3406 (e.g., where processing 3310 results in further data reduction). Optional processing 3414 may be implemented at any stage in the process, for example as shown in FIG. 34 to process the second subset 3412 to produce the desired output 3316.

As described herein, the data storage 3401 may be implemented using the external data storage 920 or the storage layer 906 (e.g., storage module(s) 926) of the data analytics processor 900. The light processing 3404 may be implemented in the hardware layer 904 by one or more hardware modules 924 relatively close to the data storage 3401, as compared to the analytics engine 910. The first subset 3406 may be transferred 3408 from the data analytics processor 900 to the analytics engine 910 for heavy processing 3310. Alternatively, heavy processing can be implemented at least in part in a location other than the analytics engine 910, for example as one or more software modules 922 in the software layer 902. The second subset 3412 may then be processed by the process completion 912 as necessary.

A feature of the presently disclosed embodiments may include data reduction. For example, a first subset 3406 of a small amount of data, relative to processing, may be transferred from storage to another location for further processing. In a non-limiting implementation, an amount of data in the first subset 3406 may be two or more orders of magnitude less than an amount of data in the set of data 3302 (e.g., an amount of data implicated by a particular data query). Correspondingly, in an example implementation, an amount of data transferred (via transfer 3408) may be two or more orders of magnitude less than an amount of data transferred (via transfer 3308) in implementations. In the case of (streaming) processing by the data analytics accelerator 900, the data reduction by the data analytics accelerator 900 may be at least two orders of magnitude from the data 3302 input to the first subset 3406 output. The disclosed coarse filtering operation may also be described in terms of an initial, partial function operation followed by a full function operation.

Figure 35:
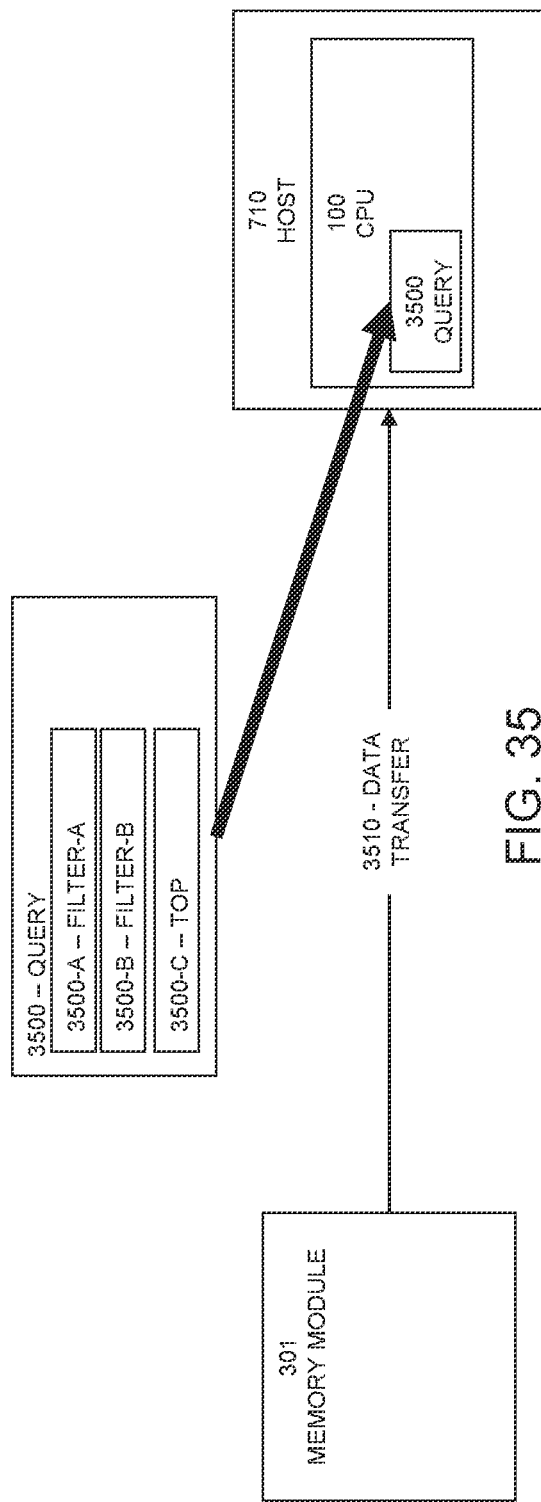
FIG. 35 represents an example approach to data processing.

FIG. 35 is an example of an implementation of query processing. A query 3500 may include one or more functions. Shown in the current figure are a first filter (filter-A, 3500-A), a second filter (filter-B, 3500-B), and a "top" function (top 3500-C). The query 3500 is run by the CPU 100 in the host (710, 810). The memory module 301 may be part of the data storage 3301 and hold the data 3302 to be transferred (via data transfer 3510) to the host 710. The CPU 100 processes the transferred data according to the query 3500.

FIG. 36A provides a diagrammatic representation of an inline data reduction system and method, according to exemplary disclosed embodiments. In this case, the lightweight first process is configured to run on the memory processing module 610. A query 3600 (similar to the query 3500) may include one or more functions. Shown in the current figure are a first filter (filter-A, 3600-A), a second filter (filter-B, 3600-B), and a "top" function (top 3600-C). The memory module 301 is replaced with one or more of the memory processing modules (MPM) 610 including one or more of the processing modules 612. The MPM 610 may be part of the data storage 3401 and hold the data 3302. In the current exemplary implementation, the first filter (filter-A, 3600-A), the second filter (filter-B, 3600-B), and a portion/partial implementation of the "top" function (3600-C) are configured on the processing module 612. The processing module 612 processes the data 3302 according to the configured portions of the query 3600 to generate the first subset 3406 of data. The first subset 3406 is then transferred 3610 to the host 710. The host 710 includes the CPU 100 configured with a full implementation of the "top" function 3600-C. The first subset 3406 is processed according to the configured portions of the query 3600 to generate the second subset 3412 of data.

FIG. 36B provides a diagrammatic representation of another inline data reduction system and method, according to exemplary disclosed embodiments. In this case, the lightweight first process may run on the data analytics accelerator 900. Data (for example from the data storage 3301) may be stored on the accelerator memory 1200. In the current exemplary implementation, the first filter (filter-A, 3600-A), the second filter (filter-B, 3600-B), and a portion/partial implementation of the "top" function (3600-C) may be configured as a portion of the inline data reduction 3200 on the data analytics accelerator 900. The data analytics accelerator 900 processes the data 3302 according to the configured portions of the query 3600 to generate the first subset 3406 of data. The first subset 3406 is then transferred 3620 to the analytics engine 910. The analytics engine 910 includes the process completion module 912 configured with at least a portion, or a full implementation of the "top" function 3600-C. The first subset 3406 is processed by the completion processing 912 according to the configured portions of the query 3600 to generate the second subset 3412 of data.

Figure 37:
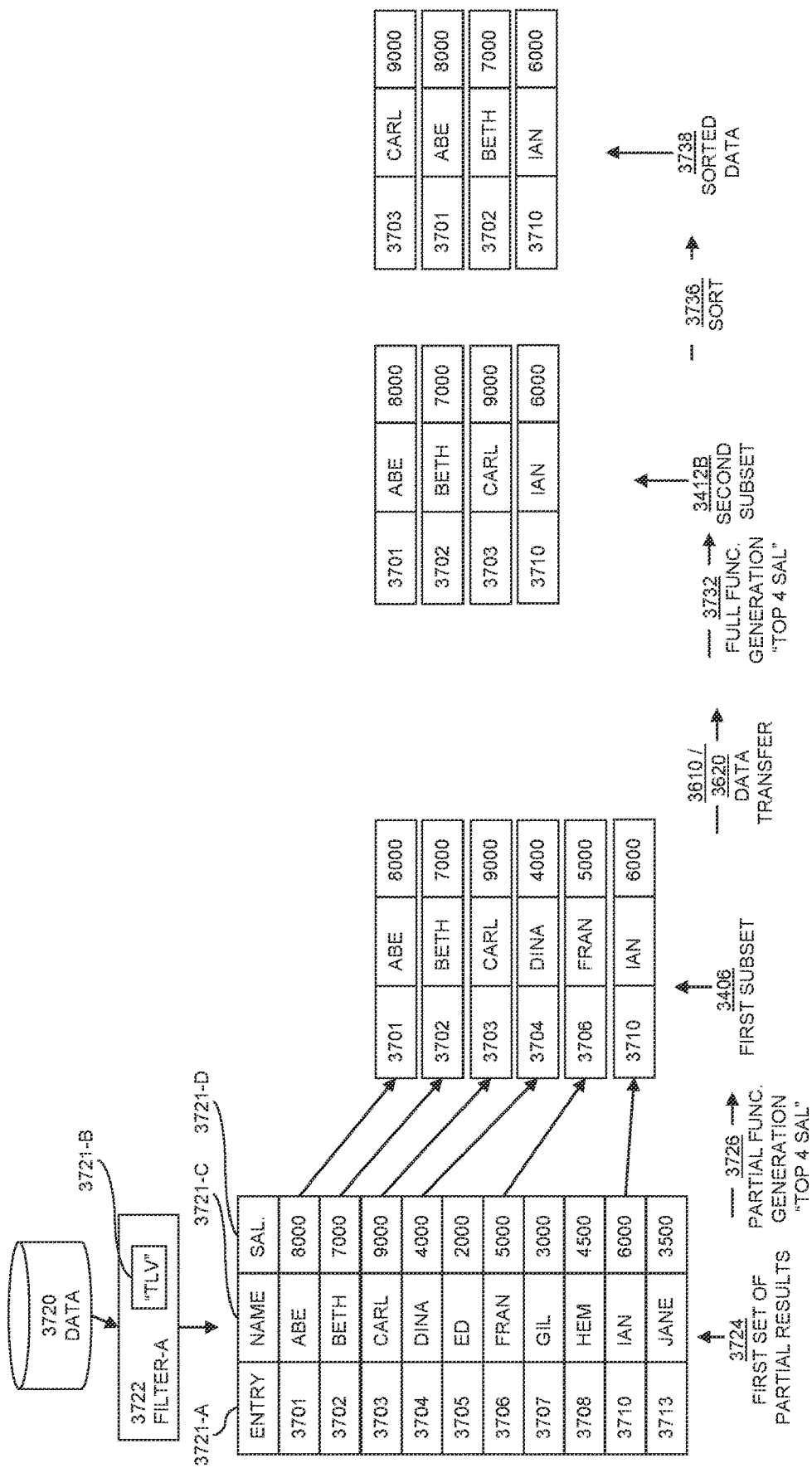
FIG. 37 provides a diagrammatic representation of an inline data reduction system flow, according to exemplary disclosed embodiments.

FIG. 37 provides a diagrammatic representation of an inline data reduction system flow, according to exemplary disclosed embodiments. The current non-limiting example uses a set of data 3720 (similar to the data 3302) from data storage (similar to the data storage 3401) having a number of entries (elements). The set of data 3720 is processed by a first filter filter-A 3722 (similar to the first filter 3600), in this case City="TLV" 3721-B to produce a first set of partial results 3724. In this case the partial results 3724 is a table having a number of elements: Entries 3721-A (3701, 3702, 3703, 3704, 3705, 3706, 3707, 3708, 3710, 3713, each entry having a column for name 3721-C and salary (SAL. 3721-D). The first subset 3406 of data is generated from the first set of partial results 3724. In this case, generation of the first subset 3406 uses a first, lightweight, partial function 3726 implementing a portion of the "top" function 3600-C, and producing equal or more data than the desired result (in the usual case where the data 3720 includes more entries than the number of desired results). This partial function 3726 results in the first subset 3406 including false positives, that is, more data than the desired result. The first subset 3406 may be transferred (3610, 3620, 3408) to a location where the first subset 3406 is processed to generate 3732 the second subset 3412 of data. Generating the second subset 3412 of data from the first subset 3406 is based on the given criteria 3721-D. In this case, generation of the second subset 3412 uses a second, heavyweight, full function 3732 implementing the "top" function 3600-C and producing the desired data.

The second subset 3412 may be ordered, or as in the current example 3412B, unordered. An optional process 3414, in this example a sort 3736 process can be implemented to produce sorted data 3738. In this case, ordering the salaries from largest to smallest and outputting the result as the desired output 3316. In addition, or alternatively to sorting, optional processing 3414 may be done at any stage.

As noted above, the partial function 3726 may include false positives, as shown by the exemplary "top" function requesting the top four salaries and the lightweight initial partial function 3726 generating the first subset 3406 with six (not four) results. The subsequent heavyweight full function 3732 processes the first subset 3406 to produce the second subset 3412 having the desired four results. The use of the term "partial function" as used herein should not be confused with "partial" being less than the desired results. As described, the first, partial function 3726 may produce a superset that includes an equal amount, or more, results than desired. Thus, the lightweight "partial function" refers to a partial implementation of the heavyweight full function.

As noted above, optional processing 3414 may be implemented at any stage in the process. For example, as shown in the current figure a sort 3736 operation is an example of optional processing 3414, in this case performed to process the second subset 3412, containing unordered results, to produce sorted data 3738 containing salaries ordered by amount.

The second subset 3412 of data may be generated from the first subset 3406 based on a given criteria 3721-D. The second subset 3412 may be different than the first subset 3406. The second subset 3412 may contain an equal amount or less data as compared to the first subset 3406.

Processing may include filtering modules. For example, the first filter (filter-A, 3600-A, 3722) filtering the data (3302, 3720) to generate the first set of partial results 3724. The data may be structured, may be in a table format (columns, rows), and/or may include a structured database, etc.

The filtering (3600-A, 3722) may be based on a set of filtering criteria (3721-B) different from the given criteria 3721-D. Alternatively, the filtering (3600-A, 3722) may be based on the given criteria 3721-D. The filtering (3600-A, 3722) may be performed concurrently with generating 3726 the first subset 3406.

Sorting (3736) the second subset may be based on the given criteria 3721-D to generate the sorted data 3738. Sorting (3736) the first subset may be based on the given criteria 3721-D to generate the sorted data 3738. Sorting (3736) the second subset may be based on the sorted data 3738 and the given criteria (3721-D).

Generating the first subset 3406 may be implemented on a first processing system and generating the second subset 3412 may be implemented on a second processing system other than the first processing system. Alternatively, generating the first 3406 and second 3412 subsets may be implemented on a single processing system, or the processing distributed on three or more processing systems. In a non-limiting example, generating the first subset 3406 may be implemented with the first processing system being the MPM 610 and generating the second subset 3412 may be implemented with the second processing system being the host 710. In another non-limiting example, generating the first subset 3406 may be implemented with the data analytics accelerator 900 hardware layer 904 and generating the second subset 3412 may be implemented with the analytics engine 910.

An amount of data in the first set of partial results 3724 may be less than or equal to an amount of data in the set of data 3302, 3720. An amount of data in the first subset 3406 may be less than an amount of data in the first set of partial results 3724. An amount of data in the first subset 3406 may be less than an amount of data in the set of data 3302, 3720. An amount of data in the second subset 3412 may be less than or equal to an amount of data in the first subset 3406. An amount of data in the first subset 3406 may be two or more orders of magnitude less than an amount of data in the set of data 3302, 3720.

Generating the first subset 3406 may be based on a partial implementation of a function, and generating the second subset 3412 may be based on a full implementation of the function. The first subset 3406 may have less data than the first set of partial results 3724 and equal to or more data than the second subset 3412. The first subset 3406 may be a superset of the second subset 3412. Generation of the first subset 3406 may be implemented by lightweight processing relative to generation of the second subset 3412 that is implemented by heavyweight processing. Generation of the first subset 3406 may be implemented by a lightweight algorithm relative to generation of the second subset 3412, which may be implemented by a heavyweight algorithm. Generating the first subset 3406 based on the first set of partial results 3724 using the lightweight algorithm may generate equal to or more data relative to generating the second subset 3412 based on the first set of partial results 3724 using the heavyweight algorithm. Generating the first subset 3406 based on the first set of partial results 3724 may generate equal to or more data relative to generating the second subset 3412 based on the first set of partial results 3724.

Figure 38:
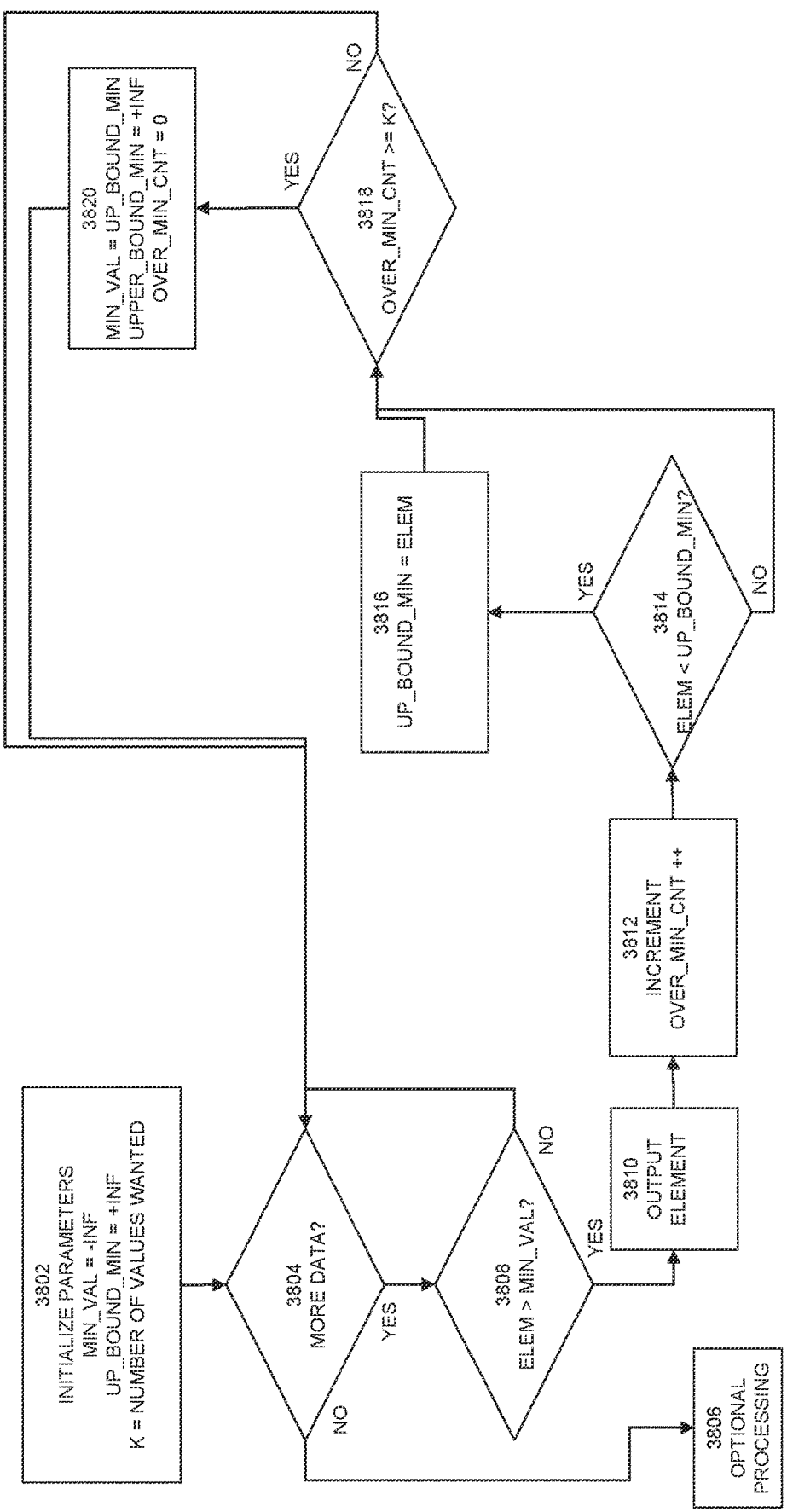
FIG. 38 provides a flowchart representing an example of a method for inline data reduction, according to exemplary disclosed embodiments.

FIG. 38 provides a flowchart representing an example of a method for inline data reduction, according to exemplary disclosed embodiments. The method may be implemented in the data analytics accelerator 900 hardware layer 904 as one or more hardware modules 924. From one aspect, to assist with understanding the method, the large amount of lightweight processing can be considered a thresholding technique. The lightweight processing portion does not need to implement a sort, operating on streaming data, and being memory-less. As is known in the art, memory-less refers to lacking use of memory for storage of data, in contrast, may use registers (e.g., a small number) for information used during processing.

In the current figure's exemplary implementation, parameters are initialized 3802 including a minimum value to minus infinity (MIN_VAL=−INF), an upper bound minimum to positive infinity (UP_BOUND_MIN=+INF), and the number of values desired (K=NUMBER OF VALUES WANTED). Other parameters are set to initial values as appropriate, for example, counts set to zero. As long as there is more data to process 3804, for each data the relevant one (or more) elements are compared 3808 to the minimum value (ELEM>MIN_VAL?). If the value of the element is not greater than the minimum value, the method continues at step 3804. If the value of the element is greater than the minimum value the method outputs 3810 the data associated with the element (possibly including the element, associated data, a tuple associated with the element, etc.).

The method now updates a number of parameters. The over minimum count is incremented 3812 (OVER_MIN_CNT++). If the element is less than the upper bound minimum 3814 (ELEM<UP_BOUND_MIN?) then the upper bound minimum is set 3816 to the element value.

In either case, the over minimum count parameter is checked 3818 to see if we have reached the number of values wanted (OVER_MIN_CNT>=K?). If yes, then parameters are updated 3820: The minimum value is set to the upper bound minimum (MIN_VAL=UP_BOUND_MIN), the upper bound minimum is then set to positive infinity (UPPER_BOUND_MIN=+INF), and the over minimum count is set to zero (OVER_MIN_CNT=0). The method continues with step 3804 to see if there is more data to process.

When there is no more data to process (3804 "no"), then the method finishes, optional processing 3806 (see 3414) may be done, etc.

Returning to FIG. 36B, additional details relative to the disclosed inline filtering embodiments will now be described. According to the disclosed embodiments, an inline data filter system may include an interface (e.g., any pin, node, bus connection, controller, or device configured to receive a data query or signal indicative of a data query) and data filter circuitry (e.g., circuitry included in inline data reduction module 3200 of the data analytics accelerator 900).

The data filter circuitry may include various hardware components, such as filters, comparators, string comparators, registers, one or more field programmable gate arrays, one or more processors, etc. for performing the coarse filtering operations associated with the disclosed inline data filter. In response to a data filter initiation signal, which may include query 3600, a derivative of query 3600, one or more filter parameters (e.g., 3600-A, -B, -C, etc.), or another suitable indicator of a received query, the data filter circuitry may perform at least one operation associated with the data query. For example, the data filter initiation signal may indicate which of a predetermined set of operations is to be performed by the data filter circuitry (e.g., via filters, functions, and associated parameters conveyed by the data filter initiation signal). The at least one operation may include retrieval of one or more subsets of a body of data implicated by the query and stored in at least one storage unit. For example, the data filter initiation signal may indicate which subset of the body of data the data filter circuitry is to use in performing the at least one operation associated with the data query. The body of data implicated by the data query may be stored in one or more databases (e.g., in data storage 920) and, in some cases, may be organized in data table format.

The at least one operation may also include analysis of the one or more subsets of retrieved data relative to query parameters (e.g., filter 3600-A, filter 3600-B, etc.). Such analysis may be designed to result in generation of a filtered data subset from the body of data implicated by the data query, wherein the filtered data subset includes less data than the body of data implicated by the data query. The filtered data subset may then be transferred to a host processor (e.g., analytics engine 910) configured to perform one or more additional operations (e.g., final filtering, sorting, formatting, etc.) relative to the data query to generate an output (e.g., output 3316) (FIG. 34) to the data query.

The at least one operation performed by the data filter circuitry of inline data reduction module 3200 may include at least one filter operation. In some cases, the at least one operation performed by the data filter circuitry includes two or more filter operations. Each of the filtering operations may be based on a set of filtering criteria associated with parameters of the data query 3600. Referring to the Bend, Oregon example described above, a first filter 3600-A associated with query 3600 (e.g., list the top ten spending consumers resident in Bend, Oregon) may include "Bend, Oregon." Using the first filter 3600-A, the data filter circuitry may identify individuals that are resident in Bend, Oregon using a selection indicator, as described in other sections of the disclosure. One or more additional filter operations may be applied using filters different from filter 3600-A. Next, the data filter circuitry of inline data reduction module 3200 may perform coarse filter operation. For example, referring to a reduced dataset representative of only those individuals residing in Bend, Oregon, the data filter circuitry may perform a partial top function, such as top function 3600-C (e.g., top ten spending consumers), to generate a filtered data subset. This filtered data subset may include less data than the body of data implicated by the data query 3600, but more data than the output to the data query (e.g., more results than analytics engine 910 outputs as final results to the data query 3600). In the Bend, Oregon example, the data filter circuitry may scan a portion of the reduced dataset identified by the selection indicator according to a method similar to the method outlined in FIG. 38. That is, the circuitry may perform a partial top function operation to screen out data that cannot satisfy a full application of the data query top function while passing candidates to analytics engine 910 that may satisfy the data query top function. In some cases, the filtered dataset 3620 will be equivalent to the data query output by analytics engine 910 (e.g., where there are only ten or less than ten consumers identified in the database). More commonly, however, the filtered dataset 3620 will include more data records than the data query output by analytics engine 910 (e.g., where there are more than ten consumers identified in the database and the filter circuitry returns a number of candidates larger than the top function parameter specified in the data query 3600). Data analytics engine 910 may receive the filtered data results from the filter circuitry and perform one or more additional tasks to generate the final results to the data query. The additional tasks may include a final application of the specified top function to eliminate any candidates transferred in the filtered dataset that fall outside the specified top function. The additional tasks may also include one or more of sorting, formatting, ranking, etc.

Described in another way, the coarse filtering operation performed by the data filter circuitry may include performance of a first task a data operation (e.g., a partial top function or other partial filtering operation). In this case, the one or more additional operations performed by data analytics engine 910 (e.g., host processor) include at least a second task (different from the first task) associated with the data operation. The second task may include performance of a full top function (on the reduced, filtered dataset transferred via data transfer 3620) or any other full filtering operation on the received reduced dataset. This operation may also be described, as noted above, as the filter circuitry generating the filtered data subset based on a partial implementation/approximate implementation of a function (e.g., a top function), and the data analytics engine 910 generating the query data output based on a full implementation/precise implementation of the function (e.g., top function).

The transfer of the filtered data subset output from the filter circuitry of inline data reduction module 3200 to analytics engine 910 may occur in a variety of ways. For example, in some cases, the data filter circuitry may be configured to scan received data from the body of data (e.g., a single column of data or portion of a column of data), and stream output values (e.g., row values associated with candidates records identified by the scanning process) to the host processor as the filtered data subset. The streaming of the output values to the host processor occurs while the filter circuitry continues to perform one or more operations (e.g., partial top function, etc.) associated with the data query. The data filter circuitry may be configured to transfer portions of the filtered data subset to the host processor in parallel with performing the at least one operation relative to the body of data. The filtered data subset may include partial results to the data query. And, the data query may be associated with at least one top function specifying a desired number of results, and wherein the filtered data subset includes more than the desired number of results.

The disclosed embodiments may include the following:

An accelerated database management system, comprising: at least one processor including circuitry and a memory, wherein the memory includes instructions that when executed by the circuitry cause the at least one processor to: receive an initial database query; generate a main query based on the initial database query; analyze the main query, and based on the analysis of the main query, generate at least a first sub-query and a second sub-query, wherein the second sub-query differs from the first sub-query; process the first sub-query along a first processing path to provide a first input to an execution module; process the second sub-query along a second processing path, different from the first processing path, to provide a second input to the execution module; and based on the first input and the second input received by the execution module, generate a main query result.

wherein the main query is equivalent to the initial database query.

wherein the main query includes one or more syntax changes relative to the initial database query.

wherein the initial database query is generated by a user.

wherein the initial database query includes an SQL query.

wherein the second sub-query includes an accelerator sub-query.

wherein the first sub-query includes a residual sub-query.

wherein the residual sub-query includes a reference to the second sub-query.

wherein the first processing path includes a query planner module configured to output a residual query plan based on the first sub-query.

wherein the residual query plan is provided to the execution module as the first input.

wherein the residual query plan is an optimized residual query plan.

wherein the residual query plan includes a reference to the second sub-query.

wherein the reference to the second sub-query includes an indication of an accelerator output to be received by the execution module as the second input.

wherein the accelerator output includes one or more intermediate data tables.

wherein the second processing path includes at least one accelerator unit.

wherein the at least one accelerator unit is configured to perform one or more predetermined database functions or database operations.

wherein the second sub-query is generated based on the one or more predetermined database functions or database operations offered by the at least one accelerator unit.

wherein the at least one accelerator unit is configured to output one or more intermediate data tables.

wherein the one or more intermediate data tables are provided to the execution module as the second input to the execution module.

wherein the one or more intermediate data tables include intermediate data results generated by the at least one accelerator unit based on operations relative to data stored in an accelerator unit database.

wherein the one or more intermediate data tables are generated by at least one accelerator execution module associated with the at least one accelerator unit.

wherein the first input to the execution module includes a residual query plan based on the first sub-query and the second input to the execution module includes an output from an accelerator unit, and wherein the execution module is configured to execute the residual plan relative to a database separate from a database associated with the acceleration unit.

wherein the first input to the execution module includes a residual query plan based on the first sub-query and the second input to the execution module includes an output from an accelerator unit, and wherein the execution module is configured to execute the residual plan relative to the output from the accelerator unit.

wherein the first input to the execution module includes a residual query plan based on the first sub-query and the second input to the execution module includes an output from an accelerator unit, and wherein the execution module is configured to execute the residual plan without reliance upon the output from the accelerator unit.

wherein the first input to the execution module includes a residual query plan based on the first sub-query and the second input to the execution module includes an output from an accelerator unit, and wherein the execution module is configured to: execute the residual plan relative to a database to provide a residual plan result; and combine the residual plan result with the output from the accelerator unit to provide the main query result.

wherein the output from the accelerator unit includes one or more intermediate data tables.

wherein the acceleration unit includes computational memory.

wherein the computational memory includes a plurality of processor subunits disposed on a memory chip.

wherein the plurality of processor subunits are disposed on a common substrate with a plurality of memory banks associated with the memory chip.

wherein an accelerator database is stored in the computational memory of the acceleration unit.

wherein in response to the main query, the at least one processor is configured to: determine, using a planner module, whether a portion of the main query can be performed by an accelerator unit; and generate the second sub-query in order to the perform the portion of the main query using the accelerator unit.

wherein the accelerator unit is configured to perform one or more predetermined functions or operations.

wherein the determination of whether a portion of the main query can be performed by an accelerator unit is based on the one or more predetermined functions or operations.

wherein the second sub-query includes two or more accelerator sub-queries to be performed by one or more acceleration units.

wherein the second sub-query includes a set of queries, each query of the set of queries resulting in generation of one or more intermediate tables.

wherein the first sub-query includes a single query using the one or more intermediate tables generated from at least one of the queries of the set of queries.

wherein the at least one processor is configured to perform one or more post processing operations relative to the main query result to provide resultant data as a response to receipt of the initial database query.

A data filter system, comprising: an interface; and data filter circuitry configured to: receive a data filter initiation signal via the interface, and in response to receipt of the data filter initiation signal, perform at least one operation associated with a data query, wherein the data query implicates a body of data stored in at least one storage unit; wherein performance of the at least one operation associated with the data query results in generation of a filtered data subset from the body of data, including less data than the body of data implicated by the data query; and transfer the filtered data subset to a host processor configured to perform one or more additional operations relative to the data query to generate an output to the data query.

wherein the at least one operation performed by the data filter circuitry includes at least one filter operation.

wherein the at least one operation performed by the data filter circuitry includes two or more filter operations.

wherein a first filter operation is based on a first set of filtering criteria and a second filtering operation is based on a second set of filtering criteria, the second set of filtering criteria being different from the first set of filtering criteria.

wherein the at least one operation performed by the data filter circuitry includes a coarse filter operation.

wherein the coarse filter operation results in a filtered data subset that includes less data than the body of data implicated by the data query, but more data than the output to the data query.

wherein the at least one operation performed by the data filter circuitry includes a partial top function operation.

wherein the partial top function operation returns more than a number of results specified by the data query.

wherein the partial top function operation is performed by the data filter circuitry after performance of one or more filter operations.

wherein the at least one operation performed by the data filter circuitry includes at least a first task associated with a data operation, and the one or more additional operations on the host processor include at least a second task, different from the first task, associated with the data operation.

wherein generating the filtered data subset is based on a partial implementation of a function, and generating the query data output is based on a full implementation of the function.

wherein generating the filtered data subset is based on an approximate implementation of a function, and generating the query data output is based on a precise implementation of the function.

wherein the data filter initiation signal is the data query.

wherein the data filter initiation signal is derived from the data query.

wherein the data filter initiation signal indicates which of a predetermined set of operations is to be performed by the data filter circuitry.

wherein the data filter initiation signal indicates which data the data filter circuitry is to use in performing the at least one operation associated with the data query.

wherein the body of data stored in the at least one storage unit is organized in one or more data tables.

wherein the body of data implicated by the data query corresponds to a complete set of data to be reviewed in response to the data query.

wherein the data filter circuitry includes a field programmable gate array.

wherein the data filter circuitry includes one or more comparators.

wherein the data filter circuitry includes one or more registers.

wherein the data filter circuitry includes one or more processors.

wherein the one or more additional operations performed by the host processor include at least one of a sort function, a top function, or a ranking function.

wherein the data filter circuitry is configured to scan received data from the body of data, and stream output values to the host processor as the filtered data subset.

wherein streaming of the output values to the host processor occurs while performing the at least one operation associated with a data query.

wherein the data filter circuitry is configured to transfer portions of the filtered data subset to the host processor in parallel with performing the at least one operation relative to the body of data.

wherein the filtered data subset includes partial results to the data query.

wherein the data query is associated with at least one top function specifying a desired number of results, and wherein the filtered data subset includes more than the desired number of results.

The embodiments disclosed herein are exemplary and any other means for facilitating memory-intensive operations and reducing data transfer may be consistent with this disclosure.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, 4K Ultra HD Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A data filter system, comprising:
an interface; and
data filter circuitry configured to:
receive a data filter initiation signal via the interface;
in response to receipt of the data filter initiation signal, perform at least one operation associated with a data query, wherein the data query implicates a body of data stored in at least one storage unit, and wherein performance of the at least one operation associated with the data query results in generation of a filtered data subset from the body of data, including less data than the body of data implicated by the data query; and
transfer the filtered data subset to a host processor configured to perform one or more additional operations relative to the data query to generate an output to the data query from the filtered data subset.

2. The data filter system of claim 1, wherein the at least one operation performed by the data filter circuitry includes at least one filter operation.

3. The data filter system of claim 1, wherein the at least one operation performed by the data filter circuitry includes two or more filter operations.

4. The data filter system of claim 3, wherein a first filter operation is based on a first set of filtering criteria and a second filtering operation is based on a second set of filtering criteria, the second set of filtering criteria being different from the first set of filtering criteria.

5. The data filter system of claim 1, wherein the at least one operation performed by the data filter circuitry includes a coarse filter operation.

6. The data filter system of claim 5, wherein the coarse filter operation results in a filtered data subset that includes less data than the body of data implicated by the data query, but more data than the output to the data query.

7. The data filter system of claim 1, wherein the at least one operation performed by the data filter circuitry includes a partial top function operation, wherein the partial top function operation returns more than a number of results specified by the data query.

8. The data filter system of claim 1, wherein the at least one operation performed by the data filter circuitry includes at least a first task associated with a data operation, and the one or more additional operations on the host processor include at least a second task, different from the first task, associated with the data operation.

9. The data filter system of claim 1, wherein generating the filtered data subset is based on a partial implementation of a function generating partial results to the data query, and generating the data query output is based on a full implementation of the function.

10. The data filter system of claim 1, wherein generating the filtered data subset is based on an approximate implementation of a function, and generating the data query output is based on a precise implementation of the function.

11. The data filter system of claim 1, wherein the data filter initiation signal is the data query.

12. The data filter system of claim 1, wherein the data filter initiation signal is derived from the data query.

13. The data filter system of claim 1, wherein the data filter initiation signal indicates which of a predetermined set of operations is to be performed by the data filter circuitry.

14. The data filter system of claim 1, wherein the data filter initiation signal indicates which data the data filter circuitry is to use in performing the at least one operation associated with the data query.

15. The data filter system of claim 1, wherein the body of data stored in the at least one storage unit is organized in one or more data tables.

16. The data filter system of claim 1, wherein the body of data implicated by the data query corresponds to a complete set of data to be reviewed in response to the data query.

17. The data filter system of claim 1, wherein the data filter circuitry includes a field programmable gate array.

18. The data filter system of claim 1, wherein the data filter circuitry is configured to scan received data from the body of data, and stream output values to the host processor as the filtered data subset.

19. The data filter system of claim 1, wherein streaming of the output values to the host processor occurs while performing the at least one operation associated with a data query.

20. The data filter system of claim 1, wherein the data filter circuitry is configured to transfer portions of the filtered data subset to the host processor in parallel with performing the at least one operation relative to the body of data.

* * * * *